United States Patent [19]
Breckman

[11] 3,803,608

[45] *Apr. 9, 1974

[54] SEPARATION CONTROL OF AIRCRAFT BY NON-SYNCHRONOUS TECHNIQUES

[75] Inventor: Jack Breckman, Haddonfield, N.J.

[73] Assignee: RCA Corporation, New York, N.Y.

[ * ] Notice: The portion of the term of the patent subsequent to Apr. 9, 1974 has been disclaimed.

[22] Filed: Apr. 10, 1970

[21] Appl. No.: 27,403

[52] U.S. Cl. ................... 343/6.5 LC, 343/112 CA
[51] Int. Cl. ............................................. G01s 9/56
[58] Field of Search ............... 343/6.5 R, 6.5 LC, 343/112 CA

[56] References Cited
UNITED STATES PATENTS 3,208,064   9/1965   Morrell ................... 343/112 CA X
3,005,194   10/1961  Goodell et al. ........... 343/112 CA X
3,025,514   3/1962   Alexander et al. ........ 343/112 CA X Primary Examiner—T. H. Tubbessing
Attorney—Edward J. Norton

[57] ABSTRACT

A comprehensive mid-air collision prevention system incorporating three types of cooperating airborne stations of varying degrees of sophistication and cost to provide practically the maximum degree of safety for all types of aircraft from a small general aviation aircraft to an SST, while being substantially immune to false alarms and to saturation under dense traffic conditions. These last two features result from both the non-synchronous techniques employed and the use of one or more other discriminants employed.

15 Claims, 36 Drawing Figures

BASIC PWI

BLOCK 228

BLOCK 224

MODIFIED PWI EMPLOYING
DIGITIZING ALTIMETER

C.A.S.

DATA CODE FORMAT

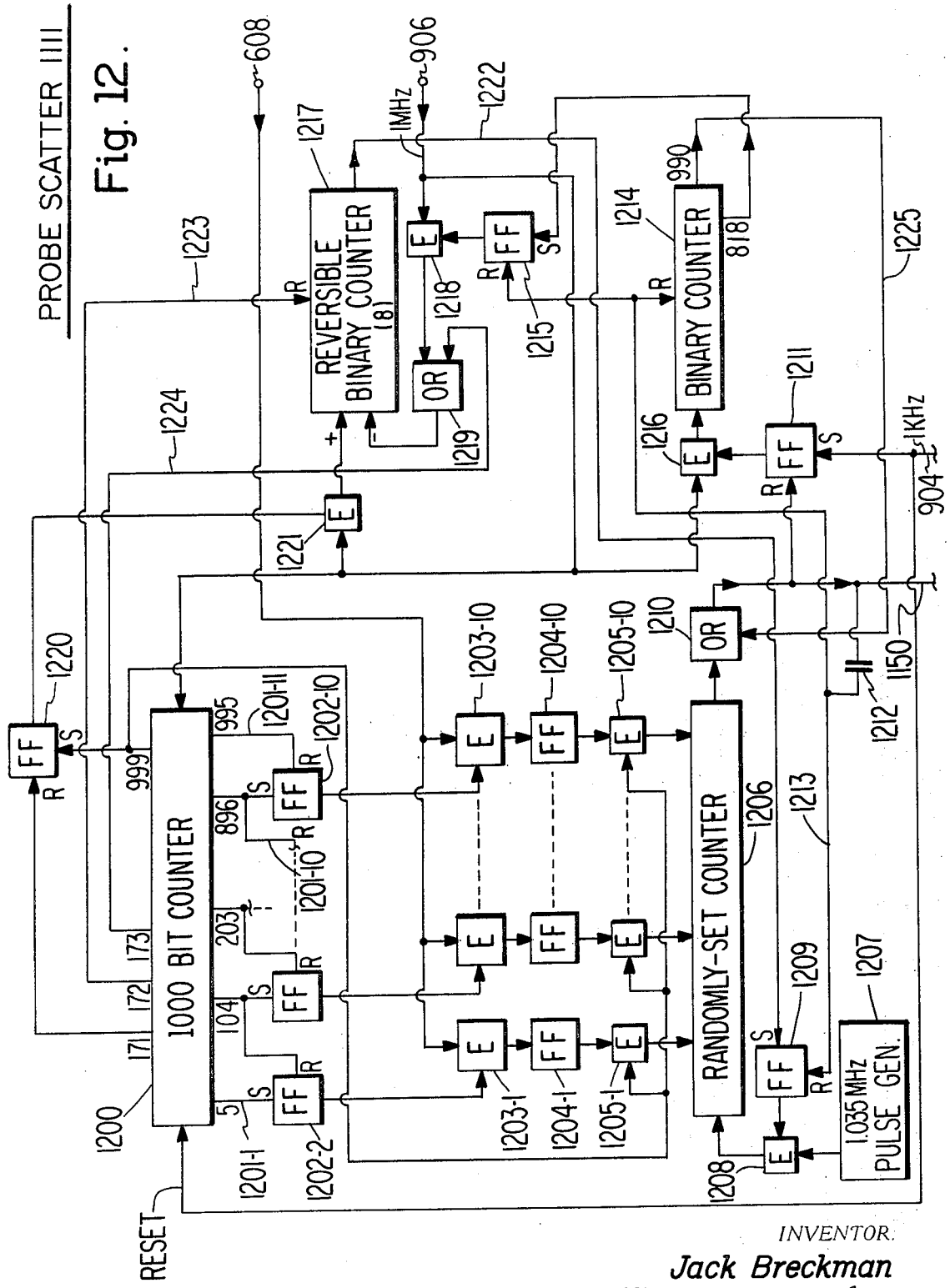

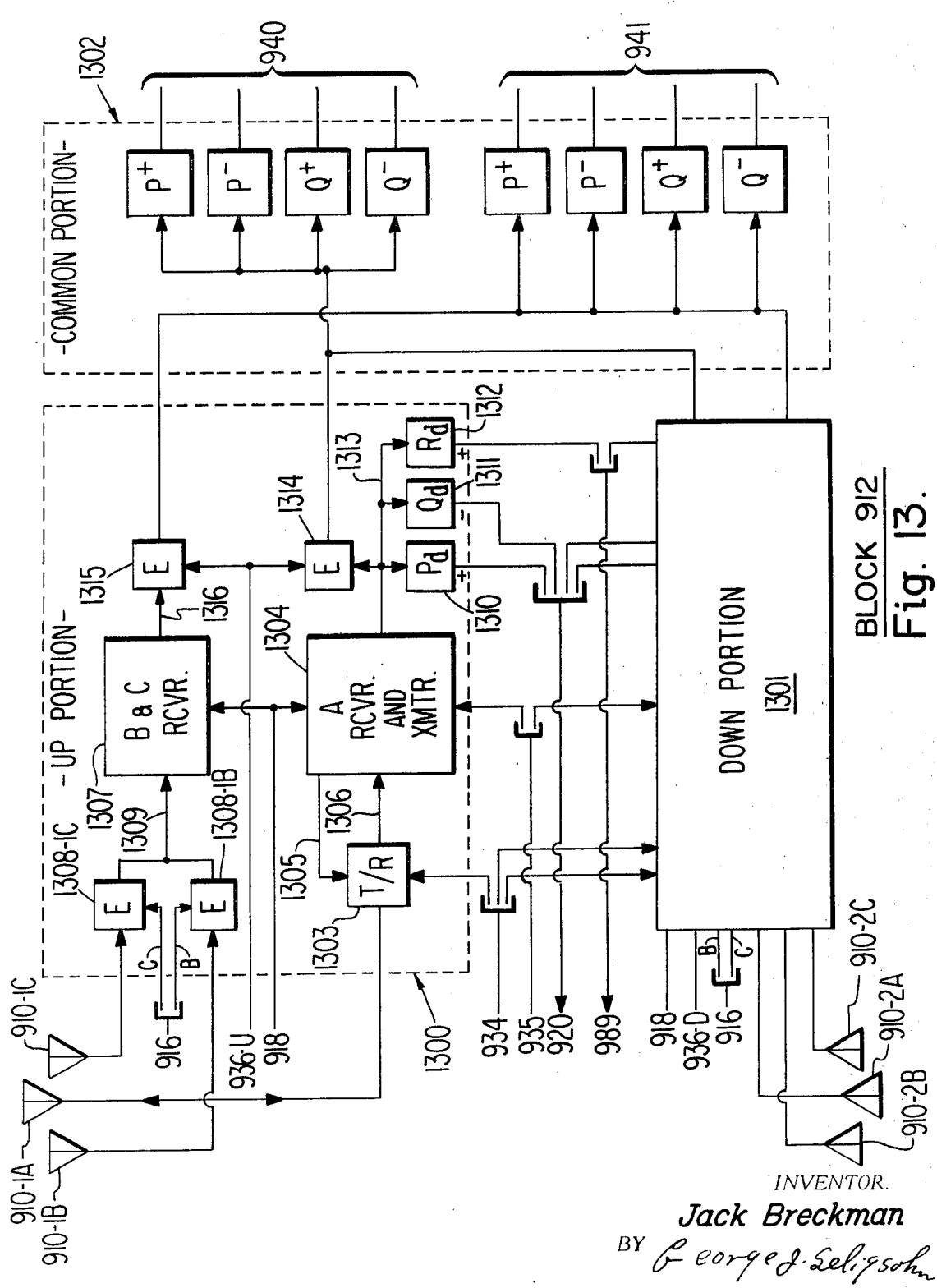

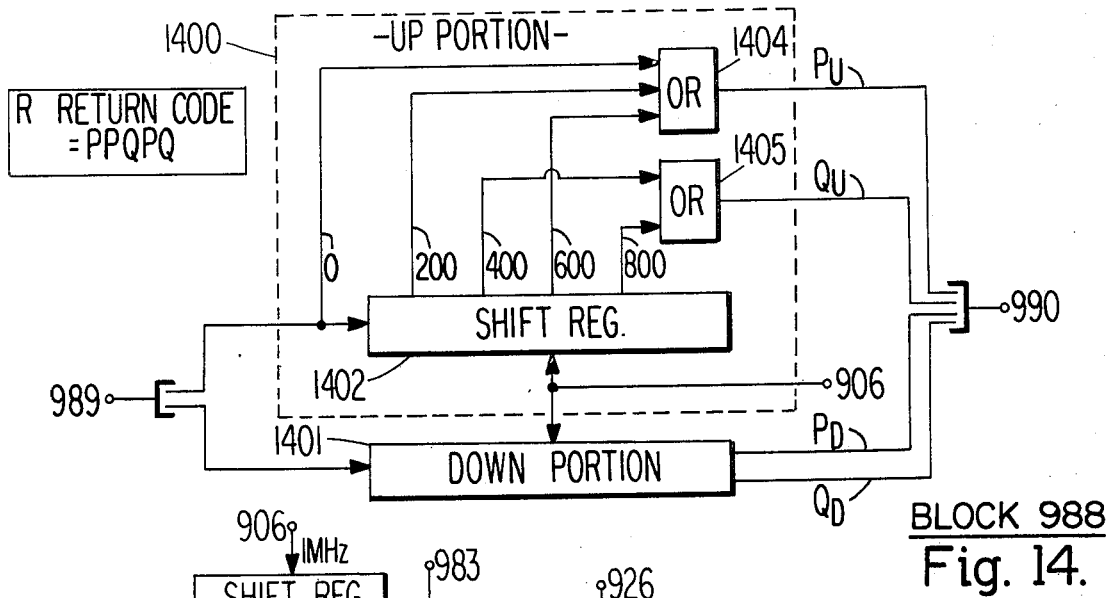
Fig. 14. BLOCK 988
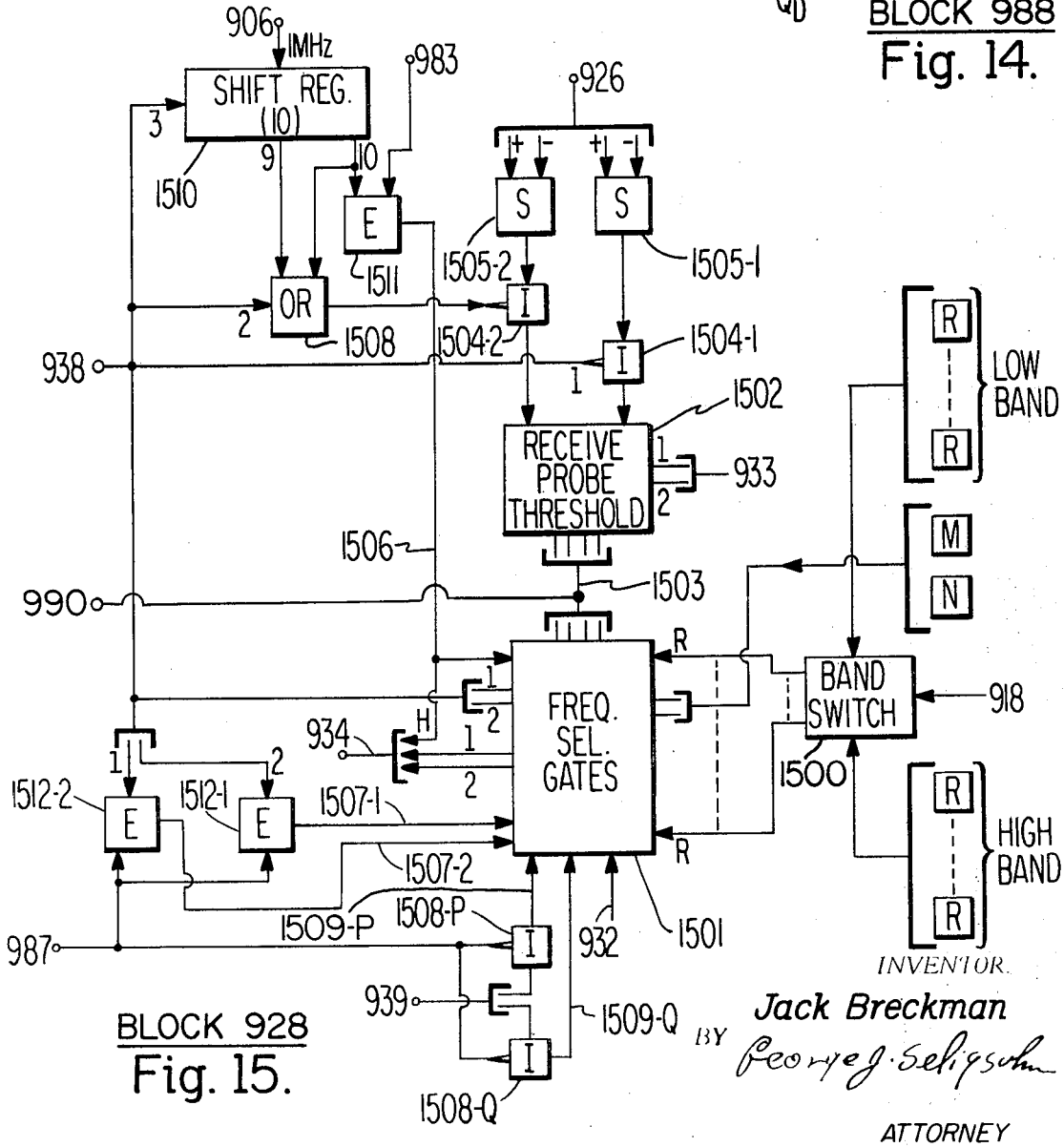
Fig. 15. BLOCK 928

R PROBE RETURN ANALYZER 1822

BLOCK 961

BLOCK 942

BLOCK 971

INVENTOR.
Jack Breckmen
BY George J. Seligsohn

ATTORNEY

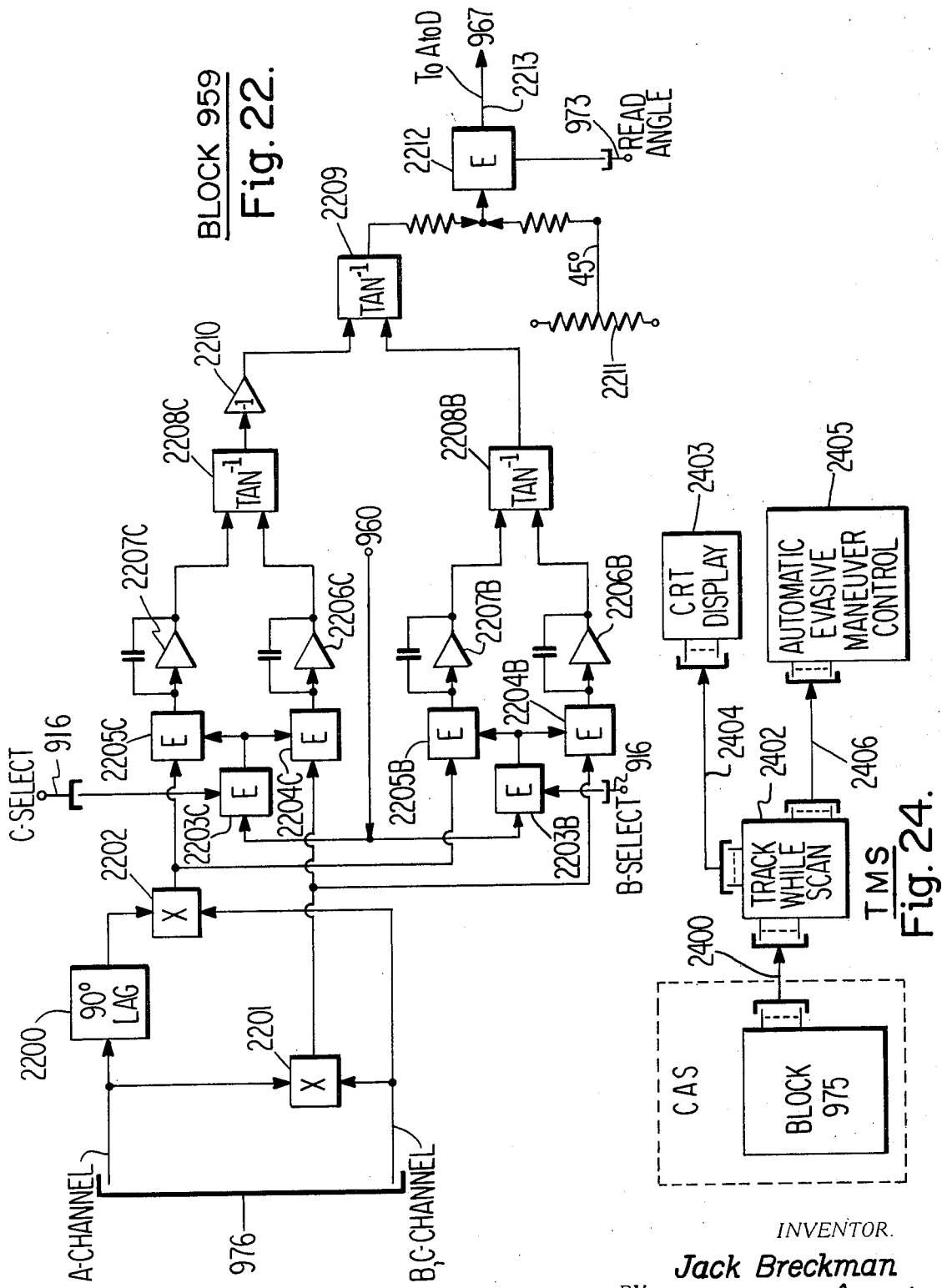

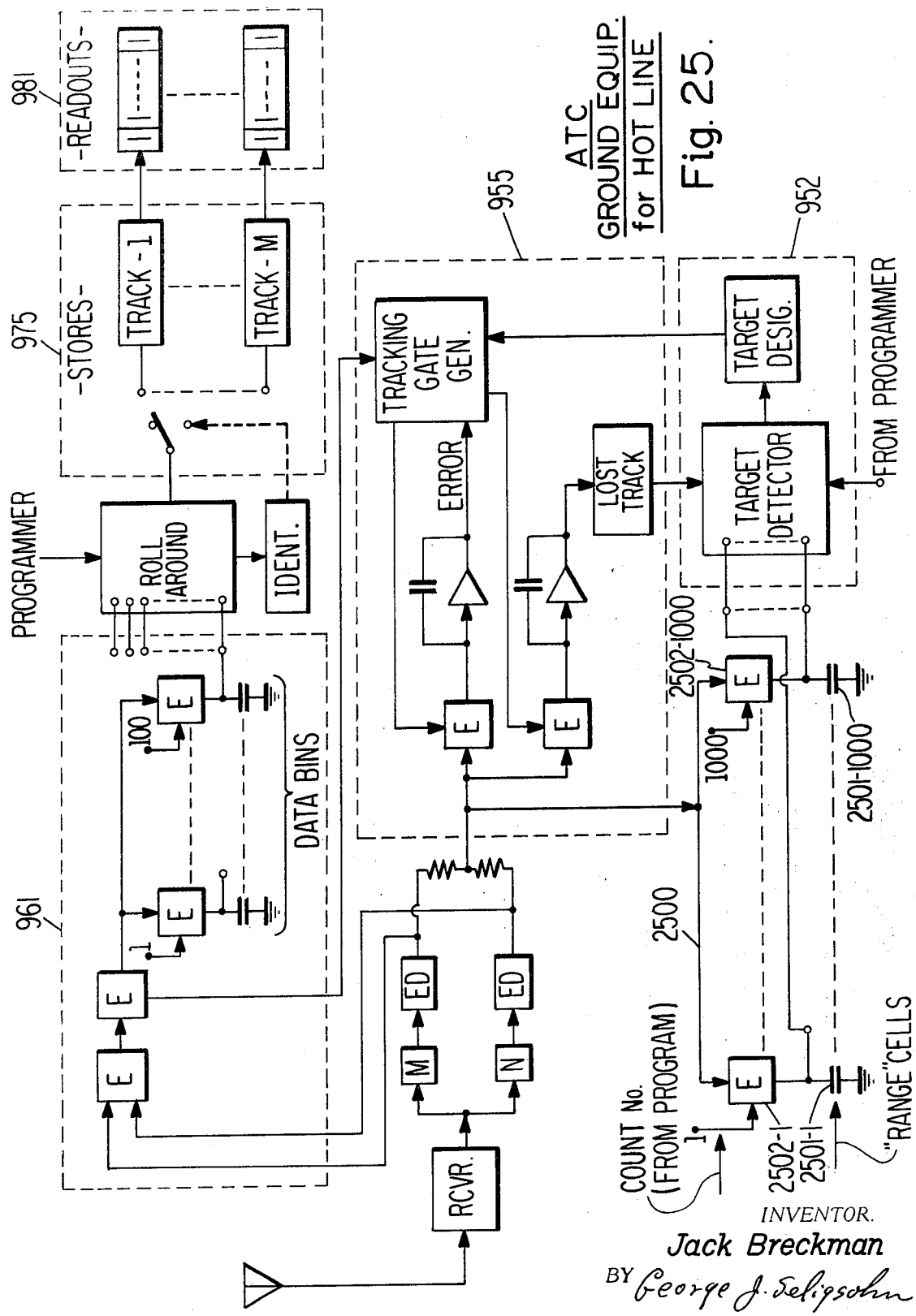

SEPARATION CONTROL OF AIRCRAFT BY NON-SYNCHRONOUS TECHNIQUES

This invention relates to a system for avoiding mid-air collisions between aircraft, and to an improved system for separation control of aircraft by non-synchronous techniques (hereinafter referred to as SECANT).

The present invention is concerned with an improvement to, and an extension of, the discriminating signaling system disclosed in my co-pending patent application Ser. No. 735,716, filed June 10, 1968.

Briefly, the co-pending patent application describes a system consisting of a plurality of separate essentially non-synchronous stations, which may be part of an air collision avoidance system. Each of the stations makes use of a long pseudo-random or truly random binary code.

The binary code is made up of a large plurality of successive bits which exhibit a very high degree of auto-correlation, but exhibit a very low degree of cross-correlation with respect to separate non-synchronous sources.

The discriminating signaling system of my copending application takes advantage of this fact by shifting the frequency of successive interrogating probe pulses transmitted by a station of the system in accordance with the respective binary value of each of the sequential bits of the code generated at that station. Every aircraft station is provided with a transponder for transmitting a return pulse in response to each received probe pulse. Further, the frequency of each return pulse is shifted to manifest a binary value corresponding to that of the received probe pulse which induced the transmission of that return pulse. Stations which transmit probe pulses also include receiving means for receiving return pulses. However, only some of the received pulses (hereinafter referred to as "hits") received by any given station actually will be in response to interrogating probe pulses transmitted from that given station. The remainder of the return pulses (hereinafter referred to as "fruit") received by any given station will have been transmitted from transponders in response to interrogating probe pulses which originated at stations other than the given station. However, the given station may include a suitable correlation detector for discriminating between the "hits" and the "fruit." This is true because of the high degree of autocorrelation of the "hits" as compared to the very low degree of cross-correlation of the "fruit," as mentioned above.

My present invention starts with the teachings contained in my co-pending application Ser. No. 735,716, and goes on from there to provide an optimium system for avoiding mid-air collisions between all types of aircraft, without exception. It also minimizes the likelihood of false alarms.

Briefly, the SECANT system described herein provides a choice of three tiers of airborne equipment of increasing sophistication, one of which is most suitable for use in each particular type of aircraft. The lowest tier of airborne equipment in the SECANT system can be implemented at a cost sufficiently low (in the order of $500 – $1,000) to make it possible for the SECANT system to include the relatively vast number of small aviation aircraft. The inclusion of these general aviation aircraft is required for an effective overall system.

Most military aircraft, executive-jet aviation, air taxis, and air carriers would employ the more sophisticated and more expensive second or third tier of airborne equipment. The SECANT system also includes ground-based ATC equipment for receiving and processing data, which on occasion is automatically transmitted thereto by the more sophisticated second or third tier airborne equipment. Further, all aircraft participating in the SECANT system cooperate with each other to their mutual safety from midair collision, regardless of the particular tier of airborne equipment with which any one of the participating aircraft happens to be provided.

It is therefore an object of the present invention to provide a comprehensive anti-collision system for all types of aircraft.

This and other objects, features and advantages of the present invention will become more apparent from the following detailed description taken together with the accompanying drawing in which:

FIG. 12 is a block diagram of the probe scatter employed in FIG. 11;

FIG. 13 is a block diagram of block 912 of FIG. 9A;

FIG. 14 is a block diagram of block 988 of FIG. 9A;

FIG. 15 is a block diagram of block 928 of FIG. 9A;

FIG. 22 is a block diagram of block 959 of FIG. 9B;

FIG. 24 is a block diagram of a TMS (Traffic Monitoring System) airborne station of the SECANT system, and FIG. 25 is a block diagram of the hot-line ground-based receiving equipment.

INTRODUCTION

Figure 1:
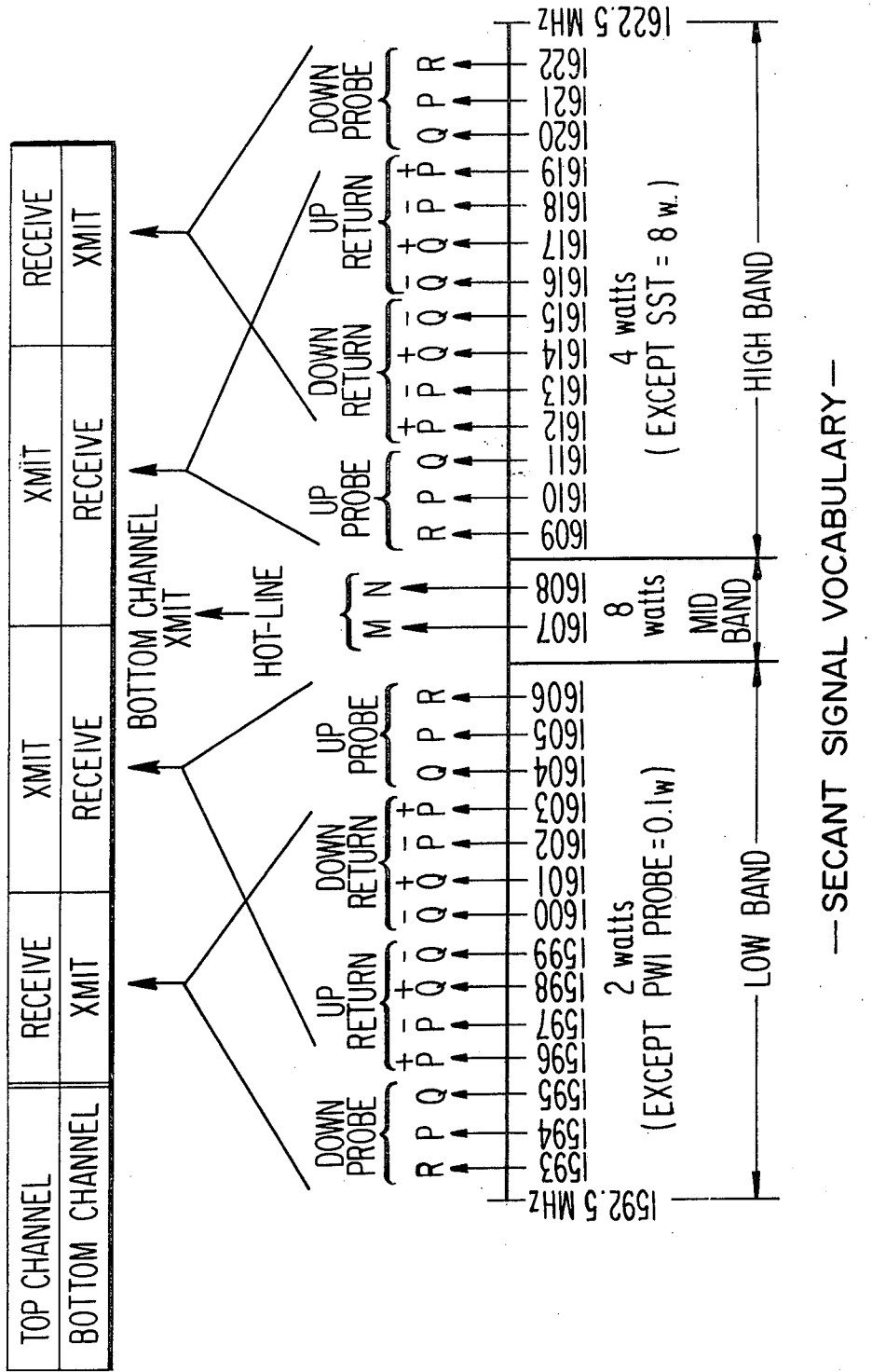
FIG. 1 is a diagram of the signal vocabulary of the radiated signals employed in the SECANT system, showing the respective frequencies and radiated power thereof.

In ascending order, the three tiers of airborne equipment are the PWI (proximity warning indicator), CAS (collision avoidance system), and TMS (traffic monitoring system). The performance characteristics of each of these three tiers of airborne equipment is summarized, as follows:

PWI

The PWI is intended for use on most general aviation aircraft, which are relatively small, relatively slow flying, and fly at an altitude of under 10,000 feet because they do not carry oxygen equipment. The PWI is intended also for those military aircraft which require the minimal installation to participate in a civilian anticollision system. As indicated earlier, the PWI has the great economic advantage that it can be implemented at low cost (in the order of $500 – $1,000).

In order to cooperate with other aircraft in the SECANT system, the PWI includes a form a transponder known as a remitter (receiver - transmitter). The remitter transmits a return pulse in response to the receipt of an interrogating probe pulse from another aircraft of the system. The probe pulse and the return pulse comprise bursts of different selected RF frequencies. The selected RF frequency of a return pulse is determined by the frequency of the inducing probe pulse and by pertinent data pertaining to the aircaft on which the PWI remitter equipment is located. (Data is manifested by the respective binary values of the sequence of return pulses transmitted by the remitter of any PWI. This permits each PWI to be a sending station in a party line among all the participating aircraft of the SECANT system. However, only the CAS and TMS airborne equipment incorporate means for receiving the data transmitted by the remitters of all participating aircraft over this line.)

Besides cooperating with other stations in the SECANT system, as just described, the PWI provides shielded flying for an aircraft equipped therewith. In particular, if an intruding aircraft comes within a preselected range of a protected aircraft incorporating a PWI (the preselected range may be adjusted by the pilot of the protected aircraft), an alert indication is made to the pilot of the protected aircraft. Furthermore, the PWI includes means for discriminating among an aircraft which intrudes the shielded space surrounding the protected aircraft from substantially above the protected aircraft, an aircraft which intrudes the shielded space surrounding the protected aircraft from substantially the wing plane of the protected aircraft, and an aircraft which intrudes the shielded space surrounding the protected aircraft from substantially below the protected aircraft. After a pilot of an aircraft protected by a PWI has been alerted that an intruding aircraft has entered the shielded space surrounding him, visual acquisition, threat assessment, and avoidance maneuver are then up to the pilot of the protected aircraft.

CAS

The CAS is designed for use in some military aircraft, executive-jet aviation, air taxis and more modest air carriers. The cost of a CAS is in the order of $30,000.

An important advantage of the CAS is that it automatically, continuously inspects all apparent threatening aircraft and then discriminates between invalidly threatening aircraft and validly threatening aircraft. This makes it possible to minimize the likelihood of a false alarm in response to an apparent, but invalid, threatening aircraft, so that needless evassive action by the pilot of a CAS protected aircraft is avoided. On the other hand, when the CAS system has automatically determined that an apparent threatening aircraft is a valid threatening aircraft, an electronic watch-dog informs the pilot that he is in a threatening encounter with some SECANT participant in his traffic. Further, the CAS alpha-numerically displays the most promising avoidance route. In addition, it gives this alert in time to let the pilot check the validity of the indicated evasion. In fact, if the pilot decides he had better not act unilaterally for fear of upsetting the traffic pattern, the situation is brought automatically to the attention of the ATC ground controller over an instant-alert hotline. This feature permits the best available cordination of the disengagement. In any case, the CAS keeps a self-generated escape route in reserve, should the ATC fail to resolve the encounter by a preset time.

The CAS also includes a remitter for cooperating with other participants in the SECANT system. As mentioned above in connection with the PWI, the CAS is both a sending and receiving station of the party line data link of the SECANT system.

TMS

The TMS is intended for the larger air carrier and military planes. It includes all the features of the CAS system, as well as additional features. These additional features include track-while-scan apparatus together with a cathode ray display for showing the pilot at all times his potentially dangerous traffic and how it is moving from moment to moment. In other words, the pilot of a TMS protected aircraft is provided with an electronic window on the world, from which he can see all the SECANT traffic with which he might interact within the next minute or so. This enables him to validate an intended course before he makes it.

The cost of a TMS is in the order of $50,000.

GROUND-BASED ATC EQUIPMENT

In addition to the PWI, CAS and TMS airborne equipment, the SECANT system includes ground based ATC equipment for receiving and processing hot-line information, referred to above, transmitted on occasion by CAS and TMS protected aircraft. This hot-line is a data link rather than a voice link.

Although not specifically a part of the SECANT equipment, it is assumed that an aircraft participating in the SECANT system also contains a two-way voice radio which, at times, can be employed to transmit and receive voice information among participating aircraft and between participating aircraft and the ATC controller on the ground.

GENERAL SYSTEM CONSIDERATIONS

The basic aim of the SECANT system is to provide the greatest possible protection for each protected aircraft (hereinafter referred to as the "ship") from being involved in a mid-air collision with any other aircraft (hereinafter referred to as a "bird"), while at the same time minimizing the likelihood of a false alarm. By false alarm is meant an indication to the pilot of the ship that there is imminent danger of a mid-air collision with a bird, when in fact no real danger exists.

In order to accomplish this, each ship must be capable of discriminating with a high degree of resolution between those birds in its general vicinity which are, in fact, definite candidates for collision with the ship, and those that really are not. Further, the system must reject all these latter birds in its general vicinity (hereinafter referred to as "flak") which are not in fact definite candidates for collision. Furthermore, it is important the PWI, CAS or TMS, as the case be, stationed aboard a ship be immune to much of the fruit signals and flak aircraft, in order to minimize the possibility of saturation of the signal processing capacity of the airborne SECANT equipment which would result from attempting to process, during the same time interval, signals from an excessive number of birds, as exists under dense traffic conditions.

The following features of the overall SECANT system contribute to achieving the aforesaid required high-resolution discrimination between actually dangerous birds on the one hand and flak on the other hand, and further, in providing saturation resistance in dense traffic:

BAND SHIFTING

There is a natural aviation boundary at an altitude of 10,000 feet, above which there are almost no small planes flying because of the necessity of carrying oxygen equipment, and below which aviation has been restricted to a 250 knot maximum velocity. The system provides a first, relatively low, band of RF frequencies for use by aircraft flying below 10,000 feet, and provides a second, relatively high, band RF frequencies for use by aircraft flying above 10,000 feet.

Small aircraft, which make use of the PWI option of the SECANT system, will only use the low band, if they never fly above 10,000 feet. High performance aircraft, equipped with the CAS or TMS options, are capable of selectively operating in either band of frequencies. For instance, a high performance aircraft when it is flying below 9,000 feet may operate at all times in the low band; when it is operating between 9,000 feet and 11,000 feet it may alternately, during successive intervals, operate first in the low band and then in the high band; and when operating above 11,000 feet it may at all times operate in the high band.

The effect of employing two separate bands, as described, is to considerably reduce the fruit and flak that requires any processing at all.

ZONE FLIPPING

As was described in the summary of my co-pending patent application Ser. No. 735,716, appearing at the beginning of the specification, the frequency of each return pulse transmitted by a transponder is shifted to manifest a binary value corresponding to that of the received probe pulse which induced the transmission of that return pulse. It is this shift in frequency of the return pulses received by a station which makes it possible to employ a suitable correlation detector for discriminating between "hits" and "fruit", because of the high degree of auto-correlation of the "hits" as compared to the very low degree of cross-correlation of the "fruit."

Now, suppose that instead of the frequency of each return pulse being shifted to manifest a binary value corresponding to that of the received probe pulse which induced the transmission of the return pulse, the frequency of each return pulse is shifted to manifest a binary value corresponding to the complement of the binary value of the probe pulse which induced the transmission of that return pulse. In this case, the correlation detector will still discriminate between the "hits" and the "fruit." However, in the latter case, the polarity of the output of the correlation detector will be opposite to that obtained in the former case.

In the SECANT system described herein, the altitude below 10,000 feet, covered by the low frequency band, is further divided into two zones of below 5,000 feet and above 5,000 feet, respectively. When any bird is in the zone between 5,000 feet and 10,000 feet, the frequency of each return pulse transmitted by its remitter manifests a binary value corresponding to that of the received probe pulse which induced the transmission of that return pulse. When a bird is below 5,000 feet and is carrying a digitizing altimeter (optional for the PWI), an altitude sensitive switch coupled to the altimeter causes the frequency of the return pulse to manifest a binary value corresponding to that of the complement of the binary value of the received probe pulse which induced the transmission of that return pulse.

It will be seen that the polarity of the output of the correlator detector of any ship resulting from hits from a given bird will indicate whether the returns from that bird are direct or inverse.

In a similar manner, the upper frequency band, which covers altitudes above 10,000 feet, if divided into a direct return zone for altitudes between 10,000 and 42,000 feet and an inverse turn zone with altitudes above 42,000 feet. 42,000 feet is chosen as the zone separation altitude because it is the natural boundary between the maximum altitude of subsonic aviation and the altitude of supersonic aviation.

Such zone flipping further adds both to the discriminating capability of the SECANT system and its freedom from saturation.

FIELD SPLITTING

To give full coverage, all SECANT aircraft carry an antenna on top for the upper hemisphere or field-above, and one on the bottom for the lower hemisphere, or field-below.

Only the bottom antennas of birds receive a probe signal emanating from the top antenna of a ship which is below them, and only the top antennas of birds receive a probe signal from the bottom antenna of a ship which is above them. In the case of a bird and a ship which are approximately at the same altitude, both the top and bottom antennas of the bird and ship will be in communication with each other.

By switching antennas, the ship is able to canvass first one field of birds, and then the other. When both fields are searched, a round is completed. The effect of field splitting is to reduce drastically the amount of fruit generated in the traffic.

RANGE LIMITING

Each airplane type has a characteristic hazard radius (depending on its attainable speed and the maximum speed of its traffic) beyond which on-coming aircraft are not of immediate interest.

In the CAS and TMS, the space around the ship is partitioned into 500 foot range cells, and an accumulator is provided for each of these range cells. These range cells, taken together, are called the Search File. The Search File is truncated or limited to match the maximum range of interest. Hence, any signals including fruit due to fall into cells beyond this range do not even appear in the file. Thus, birds beyond this maximum range are automatically eliminated in the CAS and TMS.

In the PWI, there is only one cell which comprises the entire volume within the shielded space surrounding the ship. The size of the shielded space is determined by the range setting of the PWI, which is manually controlled by the pilot.

PROBE AND RETURN THRESHOLDS

Hits are synchronized with respect to transmitted probes. Therefore, the range limiting, discussed above, discriminates against hits outside the ship's hazard radius. However, received fruit is not synchronized with the ship's probe signals. Therefore, the fruit which arrives at the ship which is due to fall into cells of the Search File of the CAS or TMS, or due to fall within the single cell of the PWI, may have been generated by birds both within and without the hazard radius of the ship. Thus, the range limiting, discussed above, does nothing to discriminate against the portion of the fruit which is received during the time periods in which the ship's SECANT equipment is searching for birds within its hazard radius.

However, the greatest enemy of fruit is distance, since the signal strength of fruit arriving at a ship at any time varies inversely as the square of the distance between that ship and the bird which generated that fruit. Similarly, the signal strength at which a probe signal arrives at the remitter of a bird varies inversely as the square of the distance between that bird and the ship that generated that probe signal.

By employing a uniform power level of probe signal transmission (but allowing statistical variations from aircraft to aircraft), and by including a threshold in each remitter so that the remitter does not transmit a return signal unless a probe signal of greater than a predetermined strength is received thereby, the total amount of fruit generated in the SECANT system may be reduced substantially.

By employing a uniform power level of return signal transmission (but allowing statistical variations from aircraft to aircraft), and by thresholding the return signal detector of each ship at a value which corresponds rather comfortably with the ship's hazard radius, ensures that most hits from birds within the ship's hazard radius will be detected. However, the strength of the fruit signal generated by birds whose range from the ship exceeds the ship's hazard radius by more than a modest amount will, at the ship, be below that required to overcome the threshold of the ship's signal detector. Thus, distant fruit, which is not range limited, is still discriminated against.

The CAS and TMS go even further. The output signal of the return signal detector thereof are thresholded by a threshold which varies as a function of time (range) from a relatively high value to a relatively low value, in a manner similar to the familiar sensitivity time control (STC) in radar. Thus, it is still relatively easy for the hits from target birds to cross this time-varying threshold, since the strength of return signals from relatively close target birds will be substantially higher than the strength of received signals from relatively distant target birds within the hazard radius. The effect of this time-variable threshold, which occurs after detection of the return signals, is to make it extremely difficult for fruit originating in the more distant birds to enter the earlier cells of the Search File, which manifest relatively close ranges. Hence, the cells corresponding to the more important class of target, the nearby bird, are kept virtually fruit-free.

ASSIGNMENT OF COMMUNICATION SIGNALS EMPLOYED IN SECANT SYSTEM

In the previous discussion, certain aspects of the communication signals employed in the SECANT system were alluded to. For instance, it was mentioned that the SECANT system employs both a low band and a high band of signals, corresponding to aircraft altitudes below and above 10,000 feet, respectively. Either the upper or lower band is employed for transmitting probe signals from a ship to birds in its vicinity and for transmitting return signals, in response to received probe signals, from birds to ships. It was also mentioned that these return signals comprise a party line for transmitting data among participating aircraft. Further, the radiated power of both probe pulses and return pulses is nominally uniform from aircraft to aircraft. In addition, communication signals, besides those used as probe or return signals transmitted among the participating aircraft, include signals employed in the hot-line data link between aircraft and the ground.

FIG. 1 is an illustrative example of a SECANT system communication signal vocabulary, showing specifically the frequency and power of all the various communication signals required in the PWI, CAS and/or TMS of the SECANT system. Each of these communications signals consists of a 1 -microsecond burst of RF, having the specific frequency designated in FIG. 1.

The different types of communication signals employed in the SECANT system are defined by separate symbols. The following is a table of definitions of these symbols:

P A probe signal manifesting a given binary value, say "one."

Q A probe signal manifesting a binary value opposite to P, say "zero".

R A special probe signal employed solely by CAS and TMS which is utilized only in the circumstance where the relative location of two birds with respect to a ship makes them unresolvable to the ship. The receipt of an R probe pulse by a bird switches the operation of its remitter from its normal mode to a special redundant mode, which makes it possible for the ship to resolve otherwise unresolvable birds. The remitters switch back from their special mode to their normal mode automatically.

$P^+$ A return signal transmitted by a bird's remitter in response to the receipt of a P probe when the bird is operating in a direct-return zone mode (or in response to the receipt of a Q probe when the bird is operating in an inverse-return zone mode), where the return signal manifests a party line data bit having the binary value "one."

$P^-$ A return signal transmitted by a bird's remitter in response to the receipt of a P probe when the bird is operating in a direct-return zone mode (or in response to the receipt of a Q probe when the bird is operating in an inverse-return zone mode), where the return signal manifests a party line data bit having the binary value "zero."

$Q^+$ A return signal transmitted by a bird's remitter in response to the receipt of a Q probe when the bird is operating in a direct-return zone mode (or in response to the receipt of a P probe when the bird is operating in an inverse-return zone mode), where the return signal manifests a party line data bit having the binary value "one."

$Q^-$ A return signal transmitted by a bird's remitter in response to the receipt of a Q probe when the bird is operating in a direct-return zone mode (or in response to the receipt of a P probe when the bird is operating in an inverse-return zone mode), where the return signal manifests a party line data bit having the binary value "zero."

M A hot line data bit manifesting a given binary value, specifically "one."

N A hot line data bit manifesting a binary value opposite to the given value for M, specifically "zero."

It will be seen from FIG. 1, that different frequencies within each of the low and high bands, respectively, are utilized for the up antenna and the down antenna, respectively, of an aircraft, Further, it should be noted that the highest radiated power utilized is 8 watts and that this is utilized only for hot-line transmissions and for supersonic probe and return operation in the high band. Other CAS and TMS aircraft in the high band utilize only 4 watts for both probes and returns in the high band. In the low band, all CAS and TMS aircraft employ only 2 watts radiated power for both probes and returns. PWI aircraft, which normally operate only in the low band, employ 2 watts for returns and only 0.1 watts radiated power for probes.

The choice of different radiated powers is based upon the velocity of the various crafts in question in the two altitude regions defined by the low and high bands, respectively. The radiated power utilized for the hot-line is determined by the maximum reasonable distance between an aircraft and a ATC facility on the ground. Since the hot-line transmits only to the ground, the bottom antenna of an aircraft is always used therefor.

DETAILED DESCRIPTION OF PWI

Figure 2:
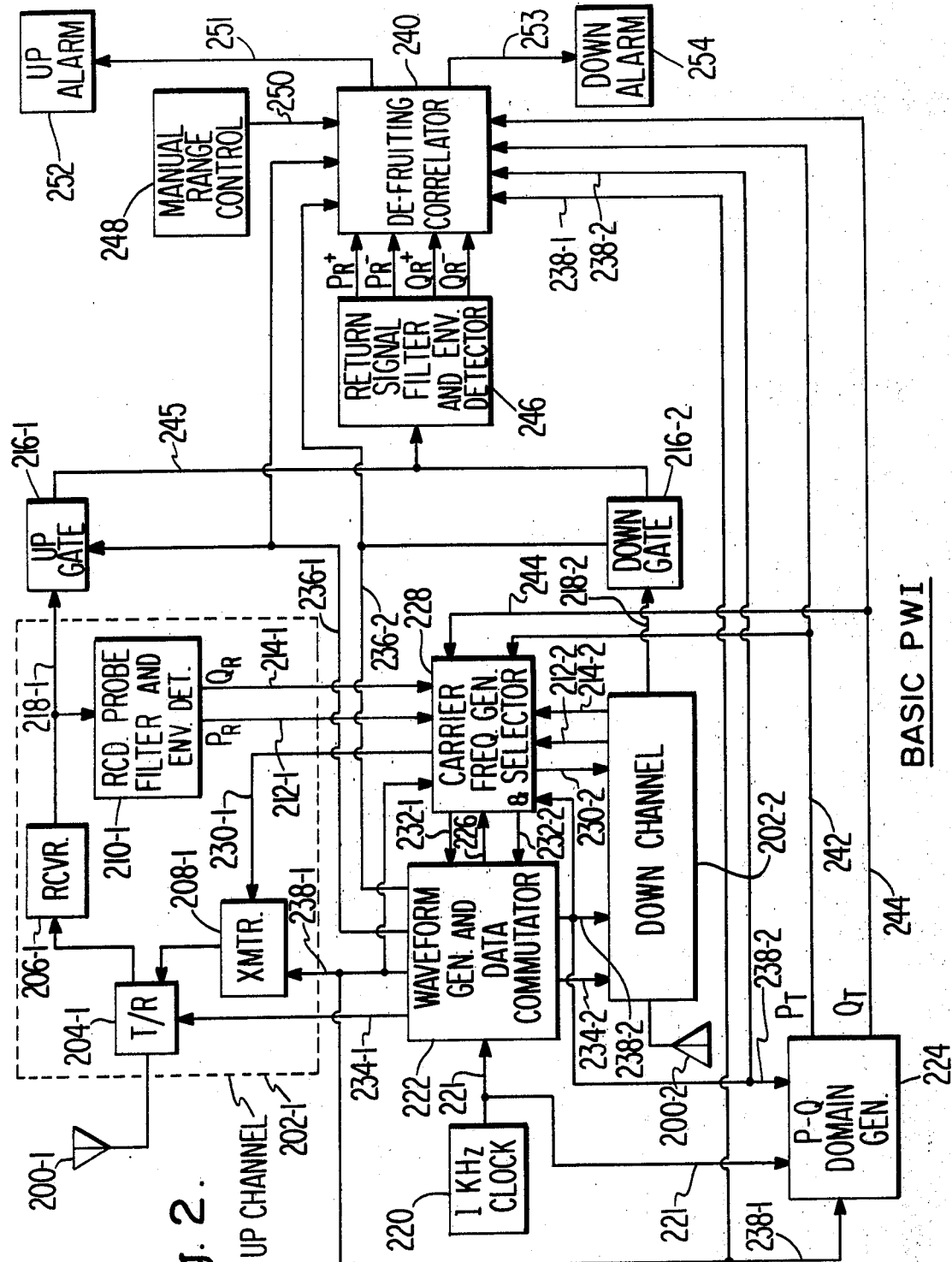
FIG. 2 is a block diagram of the basic PWI (Proximity Warning Indicator) airborne station of the SECANT system.

FIG. 2 is a block diagram of a basic PWI system.

Referring to FIG. 2, each PWI-equipped aircraft is supplied with a top antenna 200-1, located on top of the aircraft, and a bottom antenna 200-2, located on the bottom of the aircraft. Each of these antennas may consist of a single quarter-wave stub.

Top antenna 200-1 is coupled to UP channel 202-1 and bottom antenna 200-2 is coupled to DOWN channel 202-2. Since both of these channels are similar to each other in all respects, the details of only the upper channel are shown in FIG. 2.

All probe and return signals received by top antenna 200-1 are applied through transmit-receive switch 204-1 and applied as an input to receiver 206-1. The transmit-receive switch 204-1 contemplated by the present invention is of a solid-state type which is normally in a receive condition (where it couples antenna 200-1 to receiver 206 1 and decouples transmitter 208-1 from antenna 200-1). Switch 104-1 is capable of being switched from its receive condition to its transmit condition (where antenna 200-1 is decoupled from receiver 206-1 and transmitter 208-1 is coupled to antenna 200-1), or vice versa, in a negligible switching time with respect to 1 microsecond(the duration of a transmitted probe or return signal). Receiver 206-1 may include an RF amplifier, a mixer, a local oscillator and a broad-band IF amplifier.

Received P and Q probe signals and received $P^+$, $P^-$, $Q^+$ and $Q^-$ return signals will be manifested at the output of receiver 206-1 as frequency-coded bursts of I.F. Any such bursts corresponding to received P and Q probe signals will selectively produce an output on conductor 212-1 or 214-1 (depending upon whether a P probe or a Q probe is being received).

The output of receiver 206-1 is also applied as a signal input to UP gate 216-1 over conductor 218-1.

Figure 3:
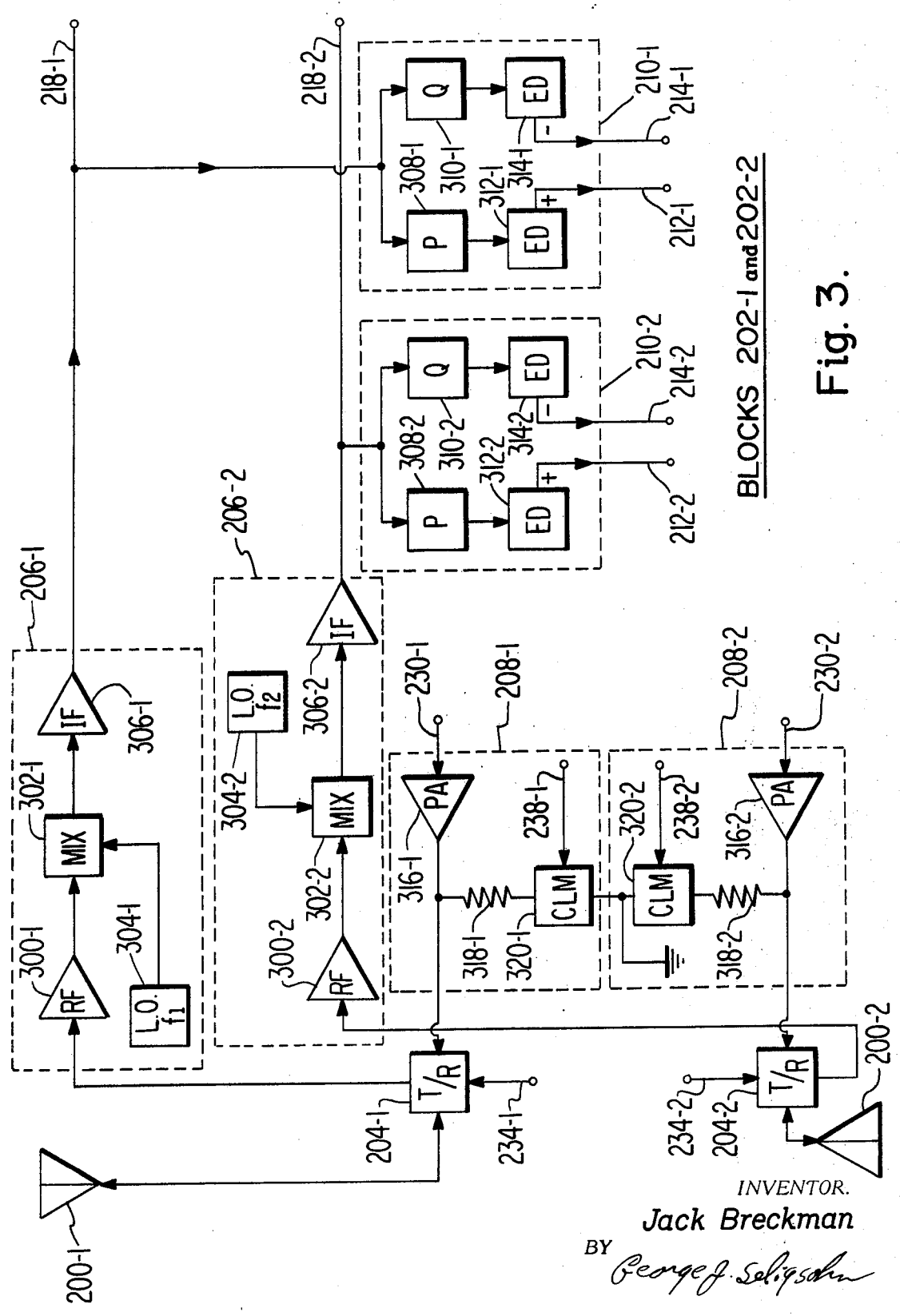
FIG. 3 is a block diagram of blocks 202–1 and 202–2 of FIG. 2.

In a similar manner, signals received by bottom antenna 200-2 produce similar type outputs from corresponding output conductors of DOWN channel 202-2 (which are identified with the same group of reference numerals as those used for UP channel 202-1, except that the suffix 2, rather than 1, is employed). The output on conductor 218-2 is applied as a signal input to DOWN gate 216-2. The details of both UP channel 202-1 and DOWN channel 202-2 are shown in FIG. 3.

The basic PWI, shown in FIG. 2, includes a 1 KHz clock 220 for dividing time into successive 1 millisecond time slots. In particular, the output of clock 220 comprises a plurality of spikes, each of which has a duration which is negligible with respect to 1 microsecond. These spikes recur periodically at a fixed repetition rate of substantially 1,000 per second. The output of clock 220 is applied over conductor 221 as an input to waveform generator and data commutator 222 and as an input to P-Q domain generator 224. Blocks 222 and 224 are shown in detail in FIGS. 5 and 6, which are discussed later in this section.

Briefly, the data commutator of block 222 is actuated by each successive clock signal to manifest an output level on conductor 226 which corresponds to the binary value of the sequentially occuring single data bit (of a multibit data message having a predetermined format) which is being read out during that millisecond time slot. In response to the signal applied to carrier-frequency generator and selector 228 over conductor 226 and in response to the amplitude of the signal applied thereto over a particular one of conductors 212-1, 214-1, 212-2 or 214-2, as the case may be, exceeding a preset threshold, carrier-frequency generator and selector 228 (shown in detail in FIG. 4) selects a burst of the proper one of a group of frequencies, corresponding to $P^+$, $P^-$, $Q^+$ and $Q^-$, and applies it to the input of the transmitter of that channel, UP or DOWN, as the case may be, (which received the probe pulse) over conductor 230-1 (for the UP channel) or 230-2 (for the DOWN channel). In addition, at the same time, a received probe in the UP channel causes a return-control signal to be returned from block 228 to block 222 over conductor 232-1, and a received probe in the DOWN channel causes a return-control signal to be returned from block 228 to block 222 over conductor 232-2. One of the effects of a return-control signal on conductor 232-1 is to produce a switching signal on conductor 234-1 of the UP channel, which results in transmit-receive switch 204-1 switching to its transmit condition during the presence of this switching signal. In a similar manner, a return-control pulse on conductor 232-2 causes a corresponding switching signal to be present on conductor 234-2 of the DOWN channel.

Thus, the transmitters of the UP and/or DOWN channels transmit a data-coded $P^+$ or $P^-$ return signal in response to the receipt of a P probe signal, and transmit a data-coded $Q^+$ or $Q^-$ return signal in response to the receipt of a Q probe signal. In this manner, the basic PWI, shown in FIG. 2, is capable of operating as a remitter in both the UP field and the DOWN field simultaneously. It might be pointed out that when operating in its return-signal transmitting mode, the transmitter of either the UP or DOWN channel operates at its full 2 watt radiated power capacity.

In addition to its capability for transmitting return signals in response to probes from other aircrafts as just described, the basic PWI shown in FIG. 2 is capable of transmitting probes to other aircraft and receiving return signals from them.

In particular, waveform generator and data commutator 222 includes a frequency divider for assigning 1,000 successive 1 millisecond time slots to the UP field, followed by another 1,000 successive millisecond time slots to the DOWN field, and then repeating the process. The entire 2-second period that it takes to successively search the UP field and the DOWN field is called a "round." During the entire 1-second portion of a round assigned to the UP field, block 222 applies an enabling signal to conductor 236–1. During the entire 1-second period of each round assigned to the DOWN field, block 222 applies an enabling signal to conductor 236–2.

P-Q domain generator 224, in response to the clock pulses applied thereto from clock 220 over conductor 221, operates to generate a long binary code and in accordance with the binary value of each successive bit of the long binary code, which may be either pseudo-random or truly random, assigns each successive millisecond time slot to either a P domain or to the Q domain. (In my co-pending application Ser. No. 735,716, a pseudo-random code was employed in the preferred embodiment. However, the last paragraph of the specification of this co-pending application of mine makes it clear that truly random code generators can be used instead of a pseudo-random code generator. It has now been found that truly random code generators are somewhat superior to pseudo-random code generators because the probability of synchronization, merely by chance, of probes being transmitted by two aircraft during a same time interval of many milliseconds in length is significantly lower if the several aircrafts are employing truly random code generators, rather than the maximum-length pseudo-random code generators. Thus, the employment of truly random codes, rather than a pseudo-random code, significantly decreases the liklihood of saturation under dense traffic conditions. Therefore, a truly random code generator is to be preferred over a pseudo-random code generator.)

During each successive time slot, waveform generator and data commutator 222 produces a probe control signal having a duration of substantially 1 microsecond. This probe control pulse is applied to conductor 238–1 when it occurs during the second of each round during which the UP-field is being searched and is applied to conductor 238–2 when it occurs during the second of each round in which the DOWN field is being searched.

Assume for the moment that no received probe pulses are being picked up by antenna 200–1 of the UP channel at the very initiation of a 1-millisecond time slot in which the UP field is being searched. In this case, block 222 will generate the 1 microsecond probe control pulse on conductor 238–1 at the very initiation of that 1-millisecond time slot. On the other hand, if at the very beginning of a time slot, top antenna 200–1 is receiving a probe from another ship, so that transmitter 208–1 must be used for transmitting a return signal in response thereto, the initiation of the probe control pulse on conductor 238–1 will be delayed until the first instant when top antenna 200–1 is not receiving a probe from another ship and UP channel 202–1 is not operating as a remitter. Thus, at the first opportunity after the beginning of a time slot, when antenna 200–1 is not receiving probes from other ships and UP channel 202–1 is not required to operate as a remitter, block 222 applies a 1-microsecond UP probe control signal to conductor 238–1. In a similar manner, during DOWN field searching, a 1-microsecond DOWN probe control signal is applied to conductor 238–2 at the first opportunity that DOWN channel 202–2 does not have to operate as a remitter.

As shown, the 1-microsecond probe control signal on conductor 238–1 is applied as an input to transmitter 208–1. Similarly, the control probe signal on conductor 238–2 is applied as an input to the transmitter of DOWN channel 202–2. The effect of this is to limit the power radiated by the transmitters of the Up and DOWN channels to 0.1 watts, rather than their normal power of 2 watts, during the 1-microsecond periods in which a probe control pulse is applied thereto.

The UP probe control signal on conductor 238–1 and the DOWN probe control signal on conductor 238–2 are also applied as inputs to P-Q domain generator 224 and as inputs to defruiting correlator 240. In addition, the probe control signals on conductors 238–1 and 238–2 are applied as inputs to carrier frequency generator and selector 228.

During the occurrence of each P domain time slot, P-Q domain generator applies a mark signal to conductor 242 thereof for an interval which commences with the leading edge of the 1-microsecond probe control signal which occurs during that time slot and terminates in response to the next occurring clock spike at the end of that time slot. Similarly, during each Q domain time slot, a mark signal is applied to conductor 244 for an interval which commences with the leading edge of the 1-microsecond probe control signal which occurs during that time slot and terminates in response to the next occurring clock spike at the end of that time slot.

The P domain mark signal on conductor 242 and the Q domain mark signal on conductor 244 are applied as inputs to carrier frequency generator and selector 228 and as inputs to defruiting correlator 240.

Carrier frequency generator and selector 228, in response to the simultaneous application thereto of a 1-microsecond UP probe control signal on conductor 238–1 and a P domain mark signal on conductor 242, selects a 1-microsecond burst of the carrier frequency corresponding to a P probe and applies it over conductor 230–1 to transmitter 208–1, where it arrives in time coincidence with the UP probe control signal directly applied to transmitter 208–1 over conductor 238–1. Therefore, transmitter 208–1 transmits a P probe, comprising a one-microsecond burst of the proper carrier frequency from top antenna 200–1 with a radiated power of 0.1 watts. Similarly, in response to the presence of an UP probe control signal on conductor 238–1 and a Q domain mark signal on conductor 244, a 1-microsecond Q probe will be radiated from top antenna 200–1. Correspondingly, the presence of a DOWN probe control signal on conductor 238–2 will result in the transmission of a 1-microsecond P probe from bottom antenna 200-2 when a P domain mark signal is present on conductor 242 and will result in the transmission of a 1-microsecond Q probe from bottom antenna 200-2 when a Q domain mark signal is present on conductor 244.

Figure 7:
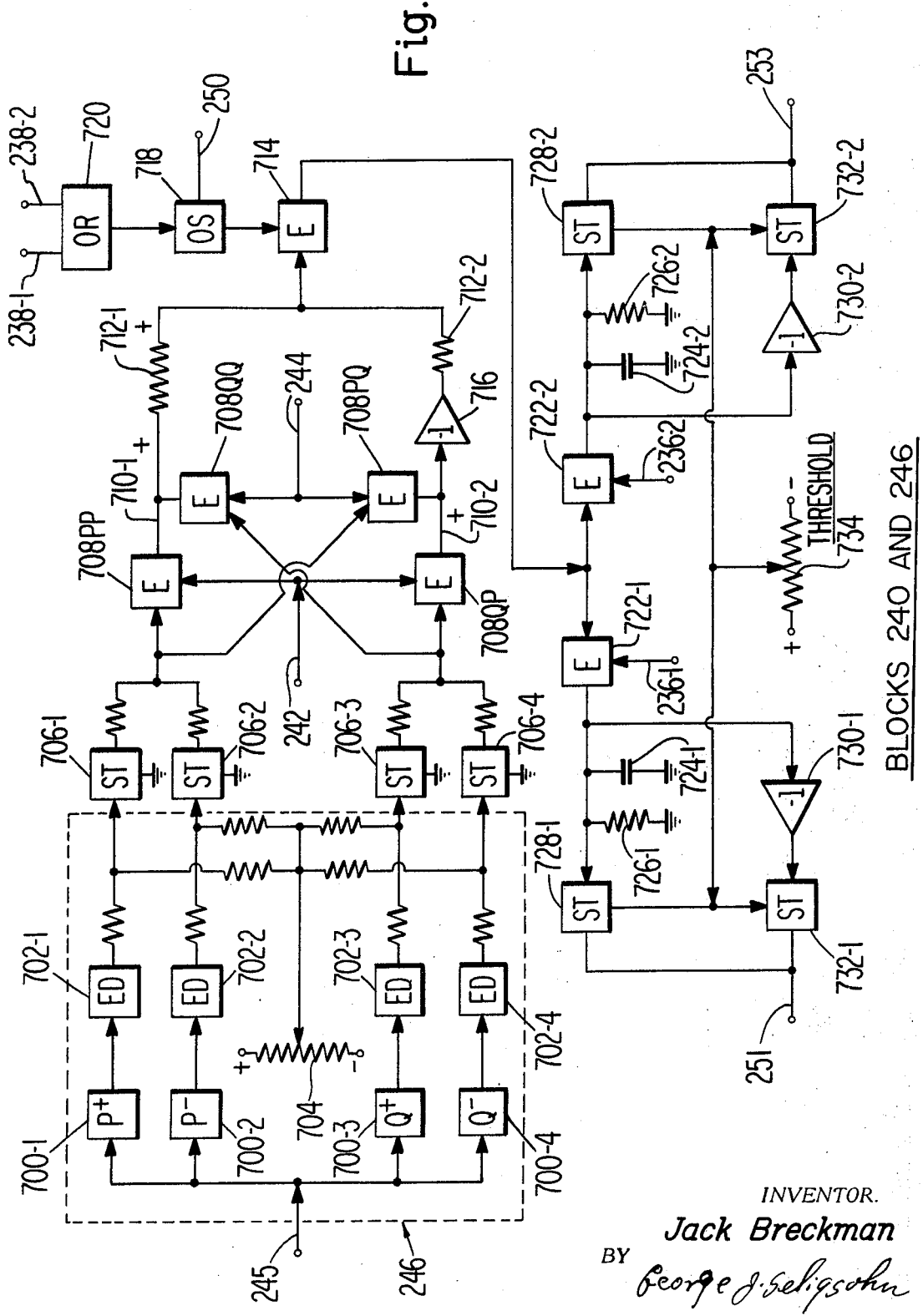
FIG. 7 is a block diagram of blocks 240 and 246 of FIG. 2.

During each of the 1,000 successive millisecond time slots comprising a one second UP field search, UP gate 216-1 is enabled by the presence of a signal on conductor 236-1. Thus, during this period all signals received by receiver 206-1 will be applied as an input to return signal filter and envelope detector 246. Block 246 discriminates against all received probes and selectively separates and detects all received return signals, to produce four different types of return signals. These four different types of return signals, designated $P^+$, $P^-$, $Q^+$ and $Q^-$, which appear at the output of return signal filter and envelope detector 246, are applied as separate inputs to defruiting correlator 240, as shown. Also, an UP field enabling signal on conductor 236-1 is applied as an input to defruiting correlator 240. Detail of blocks 240 and 246 are shown in FIG. 7, discussed in detail later in this section of the specification.

However, briefly, defruiting correlator 240 includes both an UP field integrator and a DOWN field integrator. The UP field integrator is capable of being charged only during a portion of each time slot during which probe pulses are being transmitted from UP antenna 200-1. The integration interval of each of these time slots commences with the leading edge of the probe control signal applied to defruiting correlator over conductor 238-1 during that time slot and terminates a time thereafter determined by the setting of manual range control 248, which is coupled to defruiting correlator 240 by conductor 250. Each of those return signals, $P^+$, $P^-$, $Q^+$ and $Q^-$, applied to defruiting correlator 240 from block 246, which occur during the periods when the UP field integrator is capable of being charged, will contribute an increment to the total accumulation on the UP field integrator of defruiting correlator 240. However, the polarity, plus or minus, of each incremental contribution depends upon both the domain (P or Q, as the case may be) assigned to each successive time slot and the type (whether P-type or Q-type) of the incoming return signals during that particular time slot. More specifically, in those time slots in which a P domain mark signal is present on conductor 242, during the portion thereof in which the UP field integrator is capable of accumulating increments, the occurrence of either a $P^+$ or a $P^-$ return signal will result in an increment of one polarity being applied to the UP field integrator of defruiting correlator 240, and the occurrence of either a $Q^+$ or a $Q^-$ return signal will result in an increment of opposite polarity being applied to the UP field integrator of defruiting correlator 240.

Since the receipt of P and Q return signals which constitute fruit, rather than hits, is completely independent of the domain set by P-Q domain generator 224, there will be a tendency for the UP field integrator of defruiting correlator 240 to accumulate about as many increments of one polarity as increments of the opposite polarity in response to received fruit over a period extending to the end of the one second interval comprising an UP field search. In other words, since the fruit arrives from statistically independent sources, there will be no correlation between the domain of an aircraft equipped with basic PWI and the received fruit accumulated in the UP field integrator of defruiting correlator 240. However, there will be a complete correlation between the domain occupied by a basic PWI equipped aircraft during each of the 1,000 millisecond time slots composing an UP field and the received hits accumulated in the UP field integrator of defruiting correlator 240. Therefore, if the output of the UP field integrator accumulates to an absolute level where it exceeds a given threshold, it is an indication that an intruding aircraft is within the shielded volume surrounding the PWI equipped aircraft, which is determined by the setting of manual range control 248, and, more explicitly, is within the UP field (i.e., the portion of space viewed by top antenna 200-1). In this case an alarm signal is sent over conductor 251 to UP alarm 252, which alarm may be visual, aural, or both.

In a similar manner, the DOWN field integrator of defruiting correlator 240 sends an alarm signal over conductor 253 to DOWN alarm 254 in response to an intruding aircraft within the shielded range defined by manual range control 248 and within the area viewed by bottom antenna 200-2 during each one-second DOWN field search by bottom antenna 200-2

Since intruding aircraft flying at an altitude close to that of the wind-plane of a protected aircraft equipped with basic PWI will be viewed by both top antenna 200-1 and bottom antenna 200-2, such an intruding aircraft will produce alarms in both UP alarm 252 and DOWN alarm 254.

Each of the UP field and DOWN field integrators of defruiting correlator 240 is equipped with a long time-constant (e.g., 2 seconds) discharging circuit, or the equivalent, to provide continuity between each of the interlaced 1-second UP field search periods and DOWN field search periods, respectively.

Examples of the structure of various ones of the blocks forming FIG. 2, shown in FIGS. 3–7, will now be discussed.

In order to simplify the drawings, the legends employed in FIGS. 3–7 make use of many different abbreviations. These abbreviations are defined as follows:

E any type of normally disabled (closed or AND) analog or digital gate, which is enabled in response to an applied signal.

I any type of normally enabled (open) analog or digital gate, which is disabled in response to an applied signal.

ED an intermediate-frequency envelope detector.

S an analog, algebraic, summing circuit.

P a filter or generator tuned to a frequency manifesting a P probe signal.

Q a filter or generator tuned to a frequency manifesting a Q probe signal.

$P^+$ a filter or generator tuned to a frequency manifesting a $P^+$ return signal.

$P^-$ a filter or generator tuned to a frequency manifesting a $P^-$ return signal.

$Q^+$ a filter or generator tuned to a frequency manifesting a $Q^+$ return signal.

$Q^-$ a filter or generator tuned to a frequency manifesting a $Q^-$ return signal.

OR a digital OR circuit

– 1 an analog or digital signal-polarity inverting circuit

ST a Schmitt trigger circuit

OS a monostable, or "one-shot," multivibrator circuit

FF a flip-flop circuit

Referring now to FIG. 3, signals received by top antenna 200–1 are passed through T-R switch 204–1, as previously described in connection with FIG. 2, and applied as an input RF amplifier 300–1. The output from amplifier 300–1 is applied as a first input to mixer 302–1. The output signal from local oscillator 304–1, which is tuned to a frequency $f_1$ is applied as a second input to mixer 302–1. The output from mixer 302–1 is applied as an input to broad-band IF amplifier 306–1. The output of IF amplifier 306–1, which constitutes the output of receiver 206–1, is applied to conductor 218–1.

In a similar manner, signals received by bottom antenna 200–2 are passed through T-R switch 204–2 and applied as an input to RF amplifier 300–2 of receiver 206–2. The output from amplifier 300–2 is applied as a first input to mixer 302–2. The output signal from local oscillator 304–2, which is tuned to a frequency $f_2$, is applied as a second input to mixer 302–2. The output from mixer 302–2 is applied as an input to IF amplifier 306–2. The output from IF amplifier 306–2, which constitutes the output of receiver 206–2, is applied to conductor 218–2.

The only novel feature regarding receivers 206–1 and 206–2 is the choice of the respective frequencies $f_1$ and $f_2$ of local oscillators 304–1 and 304–2, respectively. In particular, by referring to FIG. 1, it will be seen that in the lower band, the top antenna of a PWI receives useful signals in a frequency range extending from 1,594–1,595 MHz and 1,600–1,603 MHz and the bottom antenna receives useful signals in a frequency band extending from 1,596–1,599 MHz and 1,604–1,605 MHz. However, by properly choosing frequencies $f_1$ and $f_2$, respectively, of the local oscillators employed in receivers 206–1 and 206–2, respectively, the same IF frequency for each pair of corresponding function signals, such as P, Q, $P^+$, $P^-$, $Q^+$ or $Q^-$, can be achieved. This is accomplished when the local oscillator frequency $f_1$ exceeds 1,605 MHz by the same amount that 1,594 MHz exceeds the local oscillator frequency $f_2$. For instance, by way of example, if local oscillator frequency $f_1$ is chosen to have a frequency of 1,612.5 MHz and local oscillator frequency $f_2$ is chosen to have a frequency of 1,586.5 MHz, an IF frequency of 7.5 MHz will be achieved for both the UP channel and the DOWN channel in response to either top antenna 200–1 or bottom antenna 200–2 receiving a P probe signal. Similarly, the same respective IF frequencies in both channels of 8.5, 9.5, 10.5, 11.5, or 12.5 MHz will be obtained in response to the receipt of a Q probe signal, a $P^+$ return signal, a $P^-$ return signal, a $Q^+$ return signal, or a $Q^-$ return signal, respectively, by either top antenna 200–1 or bottom antenna 200–2.

The main advantage of choosing the local oscillator frequencies $f_1$ and $f_2$ in the manner just described, is that it makes it possible to employ only a single return signal filter and envelope detector 246 for use with signals received by both the UP and the DOWN channels. A secondary advantage is that the P filters 308–1 and 308–2, employed in FIG. 3, may be identical to each other and the Q filters 310–1 and 310–2, employed in FIG. 3, may be identical to each other.

FIG. 3, shows that received probe filter and envelope detector 210–1 of the UP channel comprises P filter 308–1 and Q filter 310–1 for separating the frequency-coded signal manifesting a received P probe and a frequency-coded signal manifesting a Q probe appearing on conductor 218–1. The frequency-coded signal manifesting a received P probe by top antenna 200–1, appearing on the output of P filter 308–1, is applied as an input to envelope detector 312–1 to provide a positive DC signal on conductor 212–1 in response thereto. Envelope detector 314–1 is effective in producing a negative DC signal on conductor 214–1 in response to the receipt of a Q probe by top antenna 200–1. The absolute amplitude of the DC signals applied to conductors 212–1 and 214–1, respectively, depends upon the signals strengths of the P and Q probe signals, respectively, received by top antenna 200–1.

In a similar manner, a positive DC signal is applied to conductor 212–2 in response to the receipt of a probe signal by bottom antenna 200–2 and a negative signal is applied to conductor 214–2 in response to the receipt of a Q probe signal by bottom antenna 200–2. Again, the absolute magnitude of the signals applied to conductor 212–2 and 214–2, respectively, depends upon the signal strengths of the P and Q probe signals, respectively, received by bottom antenna 200–2.

As shown in FIG. 1, the frequency difference between any pair of received signals, in a particular channel, manifesting a P probe signal and a Q probe signal, respectively, is only 1 megahertz. Since each of these signals has a duration of only 1 microsecond, the frequency spectrum of a received P probe will include a small crosstalk component of Q probe signal frequency, and vice versa. Means to overcome this problem will be discussed below.

Transmitter 208–1 of the UP channel comprises power amplifier 316–1, which is capable of amplifying a 1-microsecond burst of a selected carrier frequency signal applied as an input thereto over conductor 230–1 to provide a 2-watt output signal at the input to T-R switch 204–1. During this microsecond interval, switch 204–1 is switched to its transmit condition in response to a signal applied thereto over conductor 234–1. In its transmit condition, switch 204–1 forwards a burst of carrier frequency from the output of power amplifier 316–1 to top antenna 200–1.

As shown, the output of power amplifier 316–1 is also coupled to ground through serially connected resistance 318–1 and clamp 320–1. Clamp 320–1 is maintained disabled during the transmission of return signals from top antenna 200–1, so that 2 watts are radiated, but is closed in response to a control signal on conductor 238–1 when either a P or Q probe signal is being transmitted by transmitter 208–1. The effect of enabling clamp 320–1 is to shunt most of the 2-watt power output of power amplifier 316–1, so that only 0.1 watt of power is actually radiated from top antenna 200–1 when a P or Q is transmitted.

Power amplifier 316–2, resistance 318–2, and clamp 320–2 of transmitter 208–2 of the DOWN channel cooperate in the same manner as transmitter 208–1 of the UP channel described above, to transmit 2-watt, 2-microsecond bursts of carrier-coded return signals over bottom antenna 200–2 and to transmit 0.1 watt, 1-microsecond, frequency-coded probe signals over bottom antenna 200–2.

Figure 4:
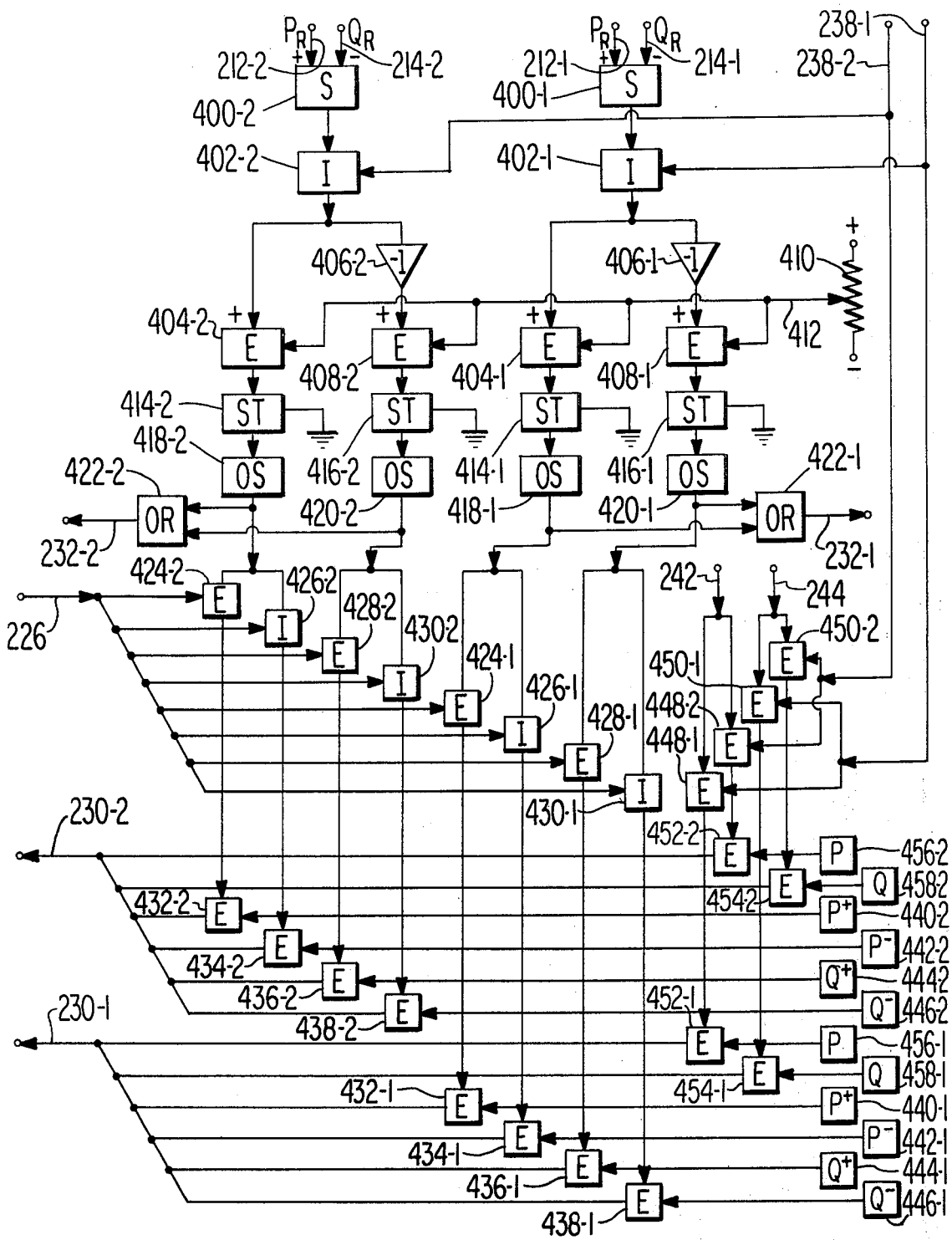
FIG. 4 is a block diagram of block 228 of FIG. 2.

Referring now to FIG. 4, any positive DC signal present on conductor 212–1, manifesting the receipt of a P probe signal by the top antenna, is applied as a first input to summer 400–1. Any negative DC signal on conductor 214–1, manifesting the receipt of a Q probe signal by the top antenna, is applied as a second input to summer 400–1. In a similar manner, summer 400–2 has first and second inputs applied thereto over conductors 212-2 and 214-2, which manifest, respectively, the receipt of a P or a Q probe signal by the bottom antenna. The use of these summers overcomes the problems, discussed above of the appearance of a small unwanted Q crosstalk frequency component when a P probe signal is received and vice versa.

If the output from summer 400-1 is positive, it will normally be forwarded through normally enabled gate 402-1 and be applied as a first input to normally disabled gate 404-1. If the output of summer circuit 400-1 is negative, it will be normally forwarded through gate 402-1 and inverter 406-1, and be applied as a first input to normally disabled gate 408-1. In a similar manner, a positive output from summer 400-2 will normally be applied as a first input to normally disabled gate 404-2 and a negative output from summer 400-2 will normally be through inverter 406-2 as a first input to normally disabled gate 408-2.

A preset voltage threshold from voltage divider 410 is applied as a second input to gates 404-1, 404-2, 408-1 and 408-2 over conductor 412.

Each of gates 404-1, 404-2, 408-1 and 408-2 will produce an output therefrom only if the amplitude of the input applied to the first input of that gate exceeds the preset threshold applied to the second input of that gate. Thus, weak received probe signals originating from distant aircraft, are discriminated against. However, any relatively strong received probe signal, originating from a relatively nearby aircraft, causes an output from gates 404-1, 404-2, 408-1 or 408-2, as the case may be.

Any output from gate 404-1 is effective in triggering Schmitt trigger circuit 414-1. In a similar manner, outputs from 408-1, 404-2 and 408-2 respectively, cause the triggering of Schmitt triggers 416-1, 414-2 and 416-2, respectively. Triggering of each of Schmitt triggers 414-1, 416-1, 414-2, or 416-2 initiates the generation of a pulse by the corresponding one of one-shot multivibrators 418-1, 420-1, 418-2 or 420-2. The duration of a pulse generated by any one of these four one-shot multivibrators is substantially equal to one microsecond. The outputs of one-shot multivibrators 418-1 and 420-1, respectively, are applied as separate inputs to OR gate 422-1 which has its output coupled to conductor 232-1. In a similar manner, the outputs of one-shot multivibrators 418-2 and 420-2, respectively, are applied as separate inputs to OR gate 422-2, which has its output coupled to conductor 232-2.

The presence of a one-microsecond pulse on conductor 232-1 is an indication that a return signal is to be transmitted during this interval of time over top antenna 200-1 in response to either a P or Q probe signal of sufficient strength having been received by top antenna 200-1. The presence of a 1-microsecond pulse on conductor 232-2 has the same import as far as the DOWN channel is concerned.

Although it is possible for both top antenna 200-1 and bottom antenna 200-2 to simultaneously transmit return signals, it is not possible for either of these antennas to simultaneously transmit both a return signal and a probe signal. For this reason, when top antenna 200-1 is engaged in transmitting a probe signal, an inhibiting pulse is applied to gate 402-1 over conductor 238-1. This prevents a return signal from being transmitted over top antenna 200-1 at this time. Similarly, when bottom antenna 200-2 is engaged in transmitting a probe signal, an inhibiting pulse is applied to gate 402-2 over conductor 238-2. This prevents a return pulse from being transmitted by bottom antenna 200-2 at this time.

In addition to being applied as a first input to OR gate 422-1, the output of one-shot multivibrator 418-1 is applied as a first input to both normally disabled gate 424-1 and normally enabled gate 426-1. In a similar manner, the output of one-shot multivibrator 420-1 is applied as a first input to normally disabled gate 428-1 and to normally enabled gate 440-1. the outputs of corresponding one-shot multivibrators 418-2 and 420-2 of the DOWN channel are connected as first inputs to corresponding gates 424-2, 426-2, 428-2 and 430-2.

A data bit control signal, which is present on conductor 226, is applied as a second input to all of gates 424-1, 426-1, 428-1, 430-1, 424-2, 426-2, 428-2 and 430-2. If the binary value manifested by the data bit during a presently-occurring time slot manifests the value "1," each of normally disabled gates 424-1, 428-1, 424-2 and 428-2 will be enabled and normally enabled gates 426-1, 430-1, 426-2 and 430-2 will be disabled. On the other hand, if the binary value of this bit is "0," normally enabled gates 426-1, 430-1, 426-2 and 430-2 will remain enabled and normally disabled gates 424-1, 428-1, 424-2 and 428-2 will remain disabled. In the former case, a first input will be applied to only one of normally disabled gates 432-1, 434-1, 436-1 or 438-1 and/or as a first input to only one of normally disabled gates 432-2, 434-2, 436-2 or 438-2.

Respective carrier-frequency generators 440-1, 442-1, 444-1 and 446-1, each having a frequency corresponding respectively to $P^+$, $P^-$, $Q^+$, and $Q^-$ employed as shown in FIG. 1, for transmission of return signals from top antenna 200-1, are connected, respectively, as second inputs to gates 432-1, 434-1, 436-1 and 438-1, respectively, as shown. The outputs of each of gates 432-1, 434-1, 436-1 and 438-1 are connected in common to conductor 230-1, which is connected as an input to transmitting power amplifier 316-1 of FIG. 3. In a similar manner, carrier frequency generators 440-2, 442-2, 444-2 and 446-2 are connected, respectively, as second inputs to each of gates 432-2, 434-2, 436-2 and 438-2, and the outputs 230–these gates are connected in common to conductor 232-2, which is applied as an input to transmitter power amplifier 316-2 of FIG. 3. In this manner, an appropriate return signal is transmitted over the appropriate antenna in response to each P or Q probe signal received by that antenna.

FIG. 4 also provides means for generating P OR Q carrier-frequency probe signals for transmission as interrogating pulses to other aircraft. In particular, P-domain conductor 242 is connected as a first input to AND gates 448-1 and 448-2; Q-domain conductor 244 is connected as a first input to AND gates 450-1 and 450-2; UP probe control signal conductor 238-1 is connected as a second input to AND gates 448-1 and 450-1, and DOWN probe control signal conductor 238-2 is connected as a second input to AND gates 448-2 and 450-2. Therefore, during any given time slot, only one of normally disabled gates 452-1, 454-1, 452-2 or 454-2 will be enabled.

Carrier-frequency generators 456-1, 458-1, 456-2 and 458-2 are connected respectively as second inputs to gates 452-1, 454-1, 452-2 and 454-2. The outputs of gates 452-1 and 454-1 are connected in common to conductor 230-1 and the outputs of gates 452-2 and 454–2 are connected in common to conductor 230–2. Thus, a P or Q probe signal of the appropriate frequency, in accordance with FIG. 1, is applied to the appropriate one of top and bottom antennas 200–1 and 200–2, respectively.

Figure 5:
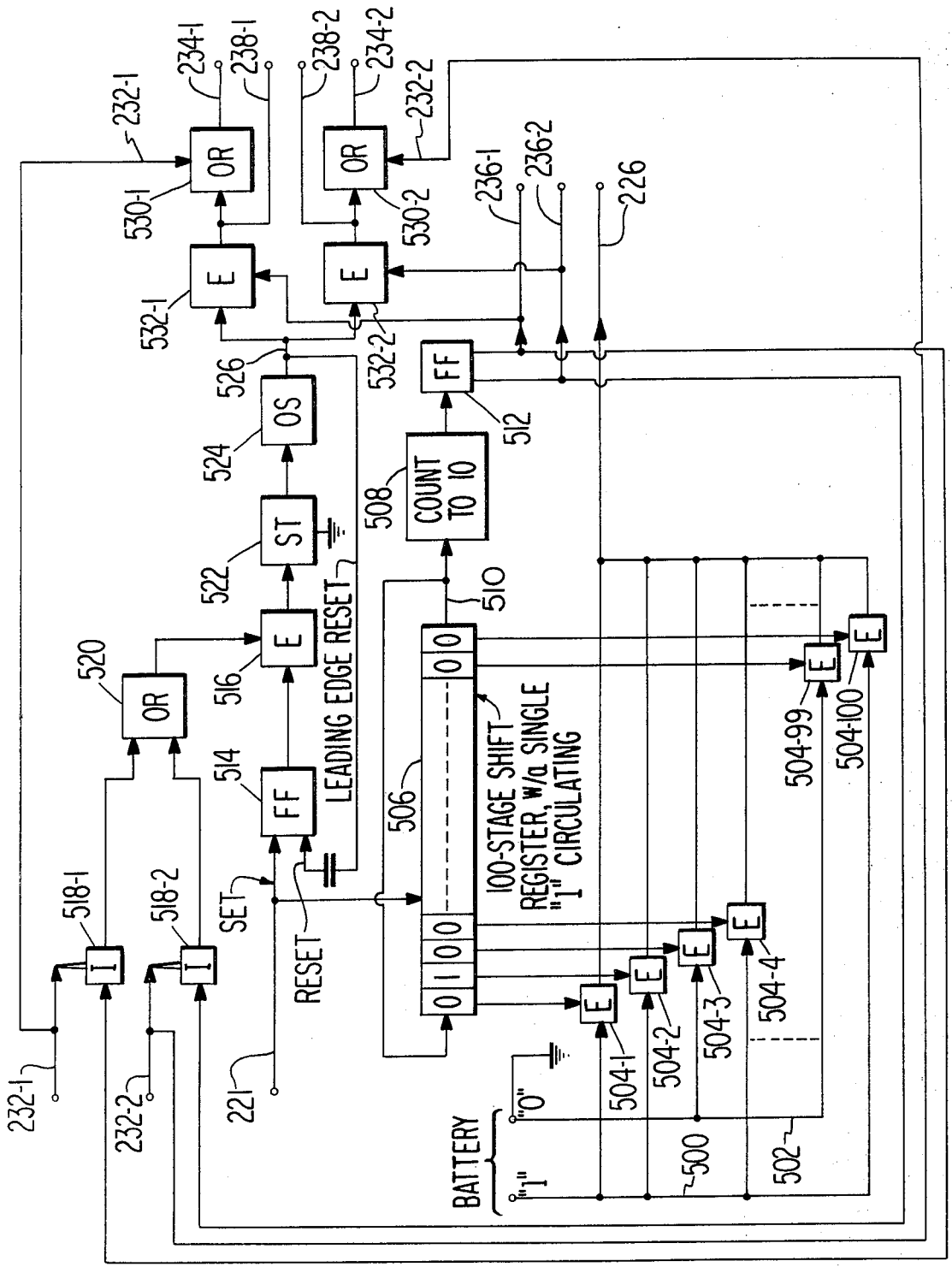
FIG. 5 is a block diagram of block 222 of FIG. 2.

Referring now to FIG. 5, there is shown a preferred embodiment of waveform generator and data commutator 222.

The preferred embodiment of the SECANT system disclosed herein makes use of a 100 bit binary data code. This data has the same predetermined format for all aircraft participating in the SECANT system. The data code is cyclically transmitted from each aircraft, one bit at a time, by choosing each successively occurring return signal transmitted by that aircraft in accordance with the binary value manifested by each successive of bit of the data code (with the first bit of the data code of a succeeding cycle following the last bit of the data code of a preceding cycle). The various pieces of data contained in the data code will be discussed in more detail in connection with the detailed description of the CAS. Suffice to say at this time that, in general, the binary value of particular ordinal bits of the 100 bit data code are permanent and are the same for all aircraft; the binary values of other ordinal bits of the 100 bit data code are permanent for any given aircraft, but may vary from aircraft to aircraft, and the binary values of still other ordinal bits of the 100 bit data code employed on a given aircraft may vary in time in accordance with measured values of such parameters as altitude, etc., obtained from measuring instruments or other sensing apparatus aboard the aircraft. The permanent binary values of the respective bits of the first-mentioned and second-mentioned groups of the data bits are always established by appropriate prewiring. The binary value of respective bits of the third-mentioned group of the data code are obtained on any given aircraft from appropriate devices, to the extent that such devices are on board the given aircraft; otherwise, the binary value of the respective data bits composing the third-mentioned group or any part thereof is also determined by prewiring.

In the basic PWI, as shown herein it is assumed that no sensing or measuring devices, such as a digitizing altimeter, etc., are on board the craft, so that all 100 data bits of the data code may be obtained by prewiring.

Normally, however, one or more bits are obtained from sensing instruments. For instance, an impact device may be carried aboard an aircraft to be automatically actuated by the impact of a crash landing, for instance. The format of the data code, discussed in detail below in connection with FIG. 10, includes a particular ordinal one of the 100 bit data code for manifesting by a binary "1" the need for search and rescue. The impact device, upon impact, changes the binary value of this bit from "0" to "1."

In particular, as shown in FIG. 5, the potential level on conductor bus 500, which is connected to the hot terminal of a battery, not shown, manifests the binary value "1," and the reference potential on conductor bus 502, which is connected to the ground terminal of the battery, manifests the binary value "0." Associated with each ordinal one of the 100 bit data code is a corresponding AND gate 504–1 ... 504–100, respectively. A first input to each of AND gate 504–1 ... 504–100 is strapped to the appropriate one of busses 500 or 502 in accordance with the desired binary value of each respective ordinal bit in the 100 bit data code.

The respective output of each of the 100 stages of 100-stage shift register 506 is connected in order as a second input to the ordinal one of AND gates 504–1 ... 504–100 corresponding to that stage of shift register 506, as shown.

Shift register 506 is primed with a binary "1" in some single one of its 100 stages and a binary "0" in each of its remaining 99 stages. This binary "1" is sequentially shifted from a preceding stage to a succeeding stage of shift register 506 at the end of each time slot in response to each successive clock pulse applied to register 506 over conductor 221. The output from the 100th stage of shift register 506 is applied as an input to "count to ten" counter 508 over conductor 510. Further, conductor 510 couples the output of the 100th stage of shift register 506 back to the first stage thereof, to provide recirculation of the circulating binary "1" in shift register 506.

Each of AND gates 504–1 ... 504–100 is enabled in turn during successive time slots in response to the circulating binary "1" in shift register 506 being applied as a second input thereto. The outputs of all of AND gates 504–1 ... 504–100 are connected in common to bit control conductor 226. Thus, the potential level on bit control conductor 226 during any one millisecond time slot manifests the binary value of the data code to be transmitted during that time slot. As previously discussed, the binary value manifested by the potential level on conductor 226 is employed in carrier-frequency generator and selector 228 to cause either a $P^+$ or $Q^+$ return signal to be transmitted in response to a data bit manifesting a binary "1," and to cause either a $P^-$ or $Q^-$ return signal to be transmitted in response to the data bit manifesting a binary "0.38

Since each time slot lasts 1 millisecond and shift register 506 has 100 stages, the circulating binary "1" in register 506 will appear on conductor 510 every 100 milliseconds. This binary 1 is applied as an input to counter 508, which produces an output pulse therefrom in response to every 10 input pulses applied thereto from shift register 506. Therefore, an output pulse is obtained from counter 508 once every second. The output pulses from counter 508 are applied as an input to flip-flop 512, which is alternately set and reset in response to successive input pulses applied thereto. Thus, flip-flop 512 will remain in its set condition for a period of 1 second, then remain in its reset condition for the next period of 1 second, and thereafter repeat this process. When flip-flop 512 is in its set condition, a 1-second output signal is applied therefrom to UP field conductor 236–1 and when flip-flop 512 is in its reset condition, a 1-second output signal is applied therefrom to DOWN field conductor 236–2.

Each clock pulse on conductor 221 is also applied as a set input to flip-flop 514. When in its set condition flip-flop 514 applies a first input to AND gate 516. Further, during each UP field search, a signal on conductor 236-1 is normally applied through normally enabled gate 518–1 and OR gate 520 to the second input of AND gate 516. Similarly, during each DOWN field search, a signal on conductor 236-2 is normally applied through normally enabled gate 518–2 and OR gate 520 as a second input to AND gate 516.

Under these conditions, immediately upon the occurrence of clock pulse on conductor 221, AND gate 516 will be enabled and an output therefrom will be applied as a triggering input to Schmitt trigger 522. This will result in an output from Schmitt trigger 522 initiating the generation of a pulse to one-shot multivibrator 524. If the output from AND gate 516 has a sharp enough leading edge, Schmitt trigger 522 may be dispensed with and the output of AND gate 516 may be connected directly as a triggering input to one-shot 524. One-shot multivibrator 524 is adjusted so that the duration of a pulse generated thereby is substantially 1 microsecond. Thus, under the conditions just discussed, one-shot multivibrator 524 will produce a 1-microsecond pulse on conductor 526 which has its leading edge occurring immediately upon the occurrence of a clock spike on conductor 221. Flip-flop 514 is reset by the leading edge of the 1-microsecond pulse on conductor 526, which is applied as a second input thereto through differentiating capacitance 528.

The previous discussion assumed that there was no signal on conductor 232-1, which is applied as an inhibiting input to gate 518-1, or a signal on conductor 232-2, which is applied as an inhibiting signal to gate 518-2. However, as discussed in connection with FIG. 4, on occasion there will be a signal on conductors 231-1 or 231-2. In particular, the presence of a signal on conductor 232-1 is indicative of the need to transmit a return signal from top antenna 200-1 in response to receipt of a probe signal thereby and the presence of a signal on conductor 232-2 is indicative of the need to transmit a return signal over bottom antenna 200-2 in response to the receipt of a probe signal thereby. Since it is not possible to simultaneously transmit a return signal and a probe signal over the same antenna, the presence of a signal on conductor 232-1 during an UP field search inhibits gate 518-1 and prevents a second input from being applied to AND gate 516 until the signal on conductor 232-1 is no longer present. Similarly, the presence of a signal on conductor 232-2 during a DOWN field search inhibits gate 518-2 and prevents a second input from being applied to AND gate 516 until the signal on conductor 232-2 is no longer present. Thus, under these latter conditions, although flip-flop 514 is set immediately upon the receipt of a clock spike over conductor 221, one-shot multivibrator 524 is not triggered until a signal is no longer present on conductor 232-1 during an UP field search or is no longer present on conductor 232-2 during a DOWN field search. Therefore, the occurrence of the microsecond pulse produced by one-shot multivibrator 524 is delayed with respect to the beginning of a time slot until the first opportunity in which top antenna 200-1, during an UP field search, or bottom antenna 200-2, during a DOWN field search, is not engaged in transmitting a required return signal.

Further, any signal on conductor 232-1 is applied through OR gate 530-1 to conductor 234-1, where (as shown in FIG. 2) it is applied as a switching signal to T-R switch 204-1 to cause switch 204-1 to assume its transmit condition, so that a return signal may be transmitted. In a similar manner, any signal on conductor 232-2 is forwarded through OR gate 530-2 to conductor 234-2.

The 1-microsecond pulse appearing on conductor 526 is applied as a first input to both AND gates 532-1 and 532-2. AND gate 532-1 is enabled during each 1-second UP field search by the signal on conductor 236-1 which is applied as a second input thereto, and AND gate 532-2 is enabled during each 1-second DOWN field search by the signal on conductor 236-2 which is applied as a second input thereto. The 1-microsecond output pulse appearing at the output of AND gate 532-1 is applied directly to conductor 238-1 as an UP probe control signal and is applied through OR gate 530-1 to conductor 234-1 for switching the T-R switch of the UP channel to its transmit condition during the transmission of an UP probe. Similarly, the output from AND gate 532-2 is applied directly to conductor 238-2 and through OR gate 530-2 to conductor 234-2 for use in the DOWN channel.

Figure 6:
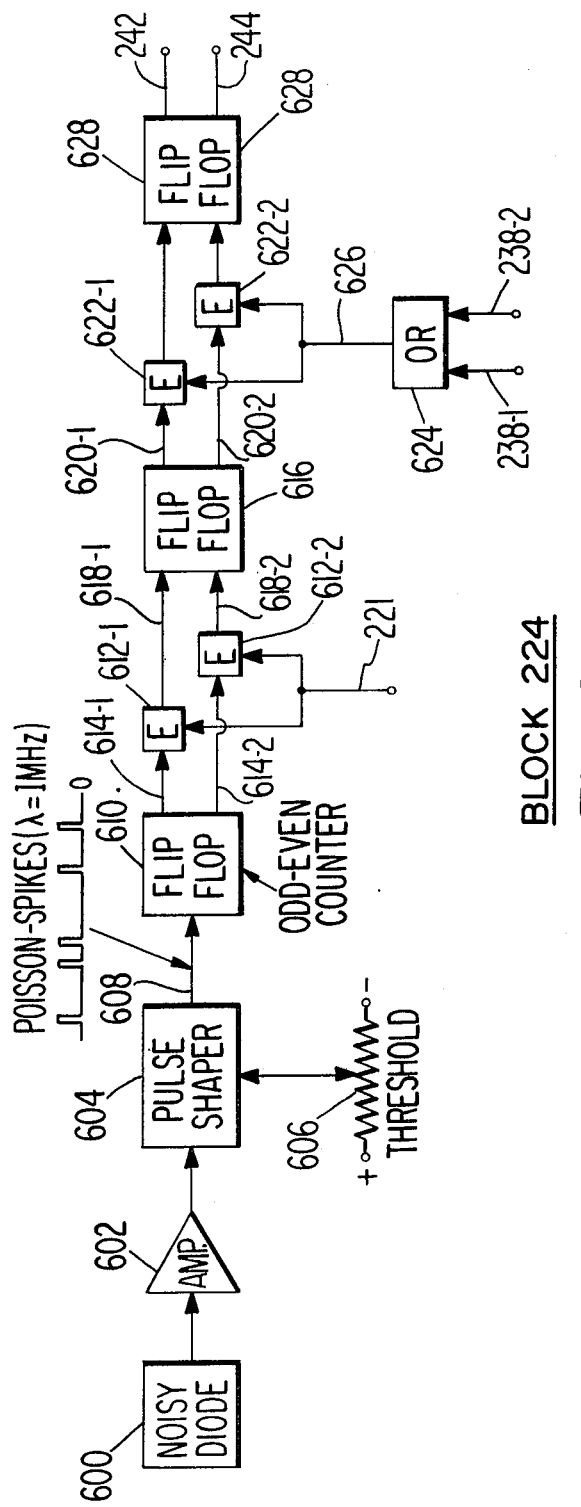
FIG. 6 is a block diagram of block 224 of FIG. 2.

FIG. 6 shows a preferred embodiment of P-Q domain generator 224, which operates as a truly random code generator.

Referring to FIG. 6, the output from noisy diode 600, which includes randomly occurring impulses of relatively low amplitude, is amplified by amplifier 602 and applied as an input to pulse shaper 604. Pulse shaper 604 includes a clipping circuit which passes only those portions of the output of amplifier 602 which exceed a predetermined threshold set by threshold voltage divider 606. By properly setting the threshold level a Poisson distribution of randomly occurring spikes having an average frequency of approximately 1 MHz may be obtained. Pulse shaper 604 may include differentiating circuits, limiting circuits or whatever else is necessary to properly shape each of these randomly-occurring Poisson spikes into clean trigger signals, which are applied to output conductor 608 of pulse shaper 604.

Flip-flop 610, which is operated as an odd-even counter, is switched back and forth between its two stable conditions by successively occurring ones of the Poisson spikes applied as an input thereto over conductor 608. During the periods in which flip-flop 610 is in one of its stable conditions, it applies a first input to AND gate 612-1 over conductor 614-1. During the periods in which flip-flop 610 is in its other stable condition, it applies a first input to AND gate 612-2 over conductor 614-2. A second input is applied to both AND gate 612-1 and 612-2 over conductor 221 in response to each clock spike. The output of AND gate 612-1 is applied as a set input to flip-flop 616 over conductor 618-1 and the output of AND gate 612-2 is applied as a reset input to flip-flop 616 over conductor 618-2.

Flip-flop 616 will be switched to, or remain in, its set condition if at the beginning of any time slot, defined by a clock spike on conductor 221, flip-flop 610 is producing a signal output on conductor 614-1. Similarly, flip-flop 616 will be switched to, or remain in, its reset condition if at the beginning at any time slot flip-flop 610 is producing a signal output on its output conductor 614-2. Thus, any switching of flip-flop 616 from one of its stable conditions to the other will only take place at the initiation of a time slot, as defined by the presence of a clock spike on conductor 221.

If flip-flop 616 is in its set condition, it will produce an output signal on conductor 620-1 which is applied as a first input to AND gate 622-1. If flip-flop 616 is in its reset condition, it will produce an output signal on conductor 620-2, which is applied as a first input to AND gate 622-2.

1-microsecond UP field probe control signals present on conductor 238-1 or 1-microsecond DOWN field probe control signals present on conductor 238-1 will be applied through OR gate 624 and conductor 626 as a second input to both AND gates 622–1 and 622–2. This results in flip-flop 628 being switched to the same stable condition as flip-flop 616 is then in, if it is not already there, at the time of occurrence of a probe signal in any time slot of either the UP field or the DOWN field, as the case may be. When flip-flop 628 is in its set condition, it applies a P-domain mark signal to conductor 242, connected as the first output thereof, and when flip-flop 628 is in its reset condition, it applies a Q-domain mark signal to conductor 244, connected as the second output thereof.

FIG. 7 illustrates an embodiment of return signal filter and envelope detector 246 and defruiting correlator 240.

Referring now to FIG. 7, any probe or return signal received by top antenna 200–1 during an UP field search will result in a frequency-coded IF signal being applied to conductor 245 through UP gate 216–1 (shown in FIG. 2). Similarly, any probe or return signal received by bottom antenna 200–2 during the period of a DOWN field search will result in a frequency-coded IF signal being applied to conductor 245 through DOWN gate 216–2 (shown in FIG. 2). Further, as discussed in connection with FIG. 3, the IF frequency-coded signals manifesting, respectively, P-probes, Q-probes, $P^+$ return signals, $P^-$ return signals, $Q^+$ return signals and $Q^-$ return signals will be the same for the UP channel and the DOWN channel, because of the way that the local oscillator frequencies $f1$ and $f2$ in FIG. 3 are chosen.

As shown in FIG. 7, an IF frequency-coded signal present on conductor 245 is applied in parallel as inputs to $P^+$ filter 700–1, $P^-$ filter 700–2, $Q^+$ filter 700–3, and $Q^-$ filter 700–4. Associated with each of filters 700–1 ... 700–4 is a corresponding envelope detector 702–1 ... 702–4. Threshold voltage divider 704 is set to provide a preselected threshold for each of envelope detectors 702–1 ... 702–4, which are individually connected to element 704 through individual resistance elements, as shown in FIG. 7. If a frequency-coded signal manifesting a received $P^+$ return signal appears on conductor 245 with sufficient strength to overcome the threshold voltage applied by element 704 to envelope detector 702–1, envelope detector 702–1 will produce an output sufficient to trigger Schmitt trigger circuit 706–1. In a similar manner, frequency-coded IF signals corresponding to received $P^-$, $Q^+$, and $Q^-$ return signals, respectively, of sufficient strength to overcome the preset threshold, will result in Schmitt trigger 706–2, Schmitt trigger 706–3, and Schmitt trigger 706–4, respectively, being triggered.

The triggering of either Schmitt trigger 706–1 or Schmitt trigger 706–2 results in a first input being applied to both AND gate 708 PP and AND gate 708 PQ through isolating resistances connected respectively to Schmitt triggers 706–1 and 706–2. Similarly, the triggering of either Schmitt triggers 706–3 and 706–4 results in a first input being applied to both AND gate 708 QP and AND gate 708 QQ through the isolating resistances connected respectively to Schmitt triggers 706–3 and 706–4.

Each of AND gates 708 PP and 708 QP have their second input coupled to P-domain conductor 242, while AND gates 708 PQ and 708 QQ have their second inputs coupled to Q-domain conductor 244.

It will be seen that during those time slots in which a P-domain mark signal is present on conductor 242, the triggering of Schmitt triggers 706–1 or 706–2 by a $P^+$ or a $P^-$ return signal will result in enabling AND gate 708 PP, causing a positive increment to be applied to conductor 710–1. On the other hand, the triggering of Schmitt triggers 706–1 or 706–2 by a $P^+$ or $P^-$ return signal when a Q-domain mark signal is present on conductor 244, will result in enabling gate 708 PQ, causing a positive increment to be applied to conductor 710–2. However, the triggering of Schmitt trigger 706–3 or 706–4 in response to the arrival of either a $Q^+$ or a $Q^-$ return signal when a Q-domain is present on conductor 244, will enable gate 708 QQ and cause a positive increment to be applied to conductor 710–1. On the other hand, the triggering of Schmitt trigger 706–3 or 706–4 in response to the arrival of a $Q^+$ or a $Q^-$ return signal when a P-domain mark signal is present on conductor 242 will result in enabling gate 708 QP, causing a positive increment to be applied to conductor 710–2.

Any positive increment present on conductor 710–1 is applied, without change in polarity, through isolating resistance 712–1 as a signal input to normally disabled gate 714. Any positive increment on conductor 710–2 is applied through inverter 716, which changes its polarity to negative, and isolating resistance 712–2 as a signal input to gate 714.

The occurrence of either an UP-probe-control signal on conductor 238–1 or a DOWN-probe-control signal on conductor 238–2 causes a signal to be applied to the triggering input of one-shot multivibrator 718 through OR gate 720. Multivibrator 718, in response thereto, produces an output pulse having a duration which is determined by the potential level on conductor 250, which is set by the pilot on manual range control 248 of FIG. 2. Manual range control 248 (which is a voltage divider) is capable of adjusting the duration of the output pulse produced by one-shot multivibrator 718, in response to a trigger applied thereto, to any value between a given minimum value to a given maximum value. A typical example of the given minimum value may be 5 microseconds, for example, corresponding to a little less than 0.5 miles, while a typical example of the given maximum value might be, for example, 50 microseconds, corresponding to a range of nearly 5 miles. However, the given minimum value could be lower than in this example and the given maximum value could be greater than in this example.

In any case, the output of one-shot multivibrator 718 is applied as an enabling input to gate 714. Therefore, gate 714 is capable of producing an output therefrom only during the relatively small portion of each time slot during which a pulse output is being produced by one-shot multivibrator 718. This range limiting severely limits the amount of non-useful signal which passes gate 714.

During the time that gate 714 is enabled, any positive or negative signal input, as the case may be, applied to gate 714 is passed thereby and is applied as a first input to normally disabled gates 722–1 and 722–2. Gate 722–1 is enabled during each UP field search by a signal applied as a second input thereto over conductor 236–1 and gate 722–2 is enabled during each DOWN field search by a signal applied as second input thereto over conductor 236–2. During each time slot of each UP field search, positive and negative incremental signals passed by gates 714 and 722–1 are applied to integrating capacitance 724–1. Capacitance 724–1 is shunted by resistance 726–1, which provides capacitance 724–1 with a long discharge time constant (2 seconds or more). During any UP field search capacitance 724–1 accumulates either a positive or negative charge of an absolute magnitude which depends upon the algebraic sum of all the positive and negative increments applied thereto through gate 722–1 over that field period minus any charge which leaks off through shunt resistance 726–1.

Since received fruit is not correlated with the sequence of P-domains and Q-domains during the successive time slots of an UP field period, on the average there are approximately as many positive increments as negative increments applied to integrating capacitance 724–1 over an entire 1-thousand time slot UP field period. Therefore, very little charge due to passed fruit accumulates on capacitance 724–1. This is true because of the inherent lack of correlation of fruit. However, received return signals, manifesting hits from a bird within the shielded range determined by the setting of manual range control 248, provide a high correlation of the successive increments due to hits applied to capacitance 724–1 through gate 722–1 during an UP field search period. Thus, the absolute magnitude of the charge accumulated on capacitance 724–1 becomes high in response to bits from an intruding bird. However, due to the fact that the bird may be employing the technique of "zone-flipping," discussed earlier in the specification, the polarity of the increments accumulated by capacitance 724–1 may be either positive (if the intruding bird happens to be transmitting direct returns) or may be negative (if the intruding bird happens to be transmitting inverse returns).

As shown, the output on capacitance 724–1, due to the accumulated charge thereon, is continuously applied as a direct input to Schmitt trigger 728–1 and, through inverter 730–1, as an inverted input to Schmitt trigger 732–1. Both Schmitt trigger 728–1 and 732–1 have a preset threshold voltage applied thereto from threshold voltage divider 734. If the total accumulated voltage on integrating capacitance 724–1 has a positive polarity and reaches a magnitude which exceeds this threshold voltage, Schmitt trigger 728–1 will fire and apply an output to conductor 251 (which is coupled to UP alarm 252 shown in FIG. 2). On the other hand, if the total accumulated voltage on integrating capacitance 724–1 has a negative polarity and reaches a magnitude which exceeds this preset threshold, Schmitt trigger 732–1 will fire and apply an output to UP alarm conductor 251.

In a similar manner, gate 722–2, integrating capacitance 724–2, shunt resistance 726–2, Schmitt trigger 728–2, inverter 730–2, and Schmitt trigger 732–2 operate during each one-second DOWN field search to provide an output on DOWN alarm input conductor 253 in response to a bird entering the shielded volume of the DOWN field.

Although FIG. 7 employs integrating capacitances 724–1 and 724–2 as analog accumulators, digital accumulators comprising reversible counters could be substituted therefor, as is known in the art.

In the preceding discussion of the basic PWI shown in FIG. 2 (and FIGS. 3–7), it was assumed that an aircraft equipped with a PWI did not include any measuring instruments, such as altimeters, etc., which could contribute to either the PWI itself or other aircraft in the overall SECANT system. This assumption is, of course, true for many small aircraft. However, many relatively small aircraft, of a type which would employ the PWI, do carry certain measuring instruments, such as a digitizing altimeter, for instance, which can be used to good effect in the PWI. Thus, the basic PWI shown in FIG. 2 may be easily modified to make use of such measuring instruments as a digitizing altimeter.

For instance, as discussed earlier, zone-flipping (transmitting direct returns from an aircraft flying at an altitude between 5,000 and 10,000 feet and transmitting inverted returns from an aircraft flying below 5,000 feet) is a desirable discriminant in the overall SECANT system. Further, supplying exact altitude information as part of the data code which is transmitted over the party line provided by the transmitted return signals from an aircraft is also extremely desirable. However, neither of these features is included in the basic PWI, since the required measuring instrument, a digitizing altimeter, is assumed not to be available. However, if a digitizing altimeter is available, it may be utilized to control a zone-flipper and to provide varying information as to the exact altitude of the aircraft on which it is located as part of the data code transmitted by that aircraft.

Figure 8:
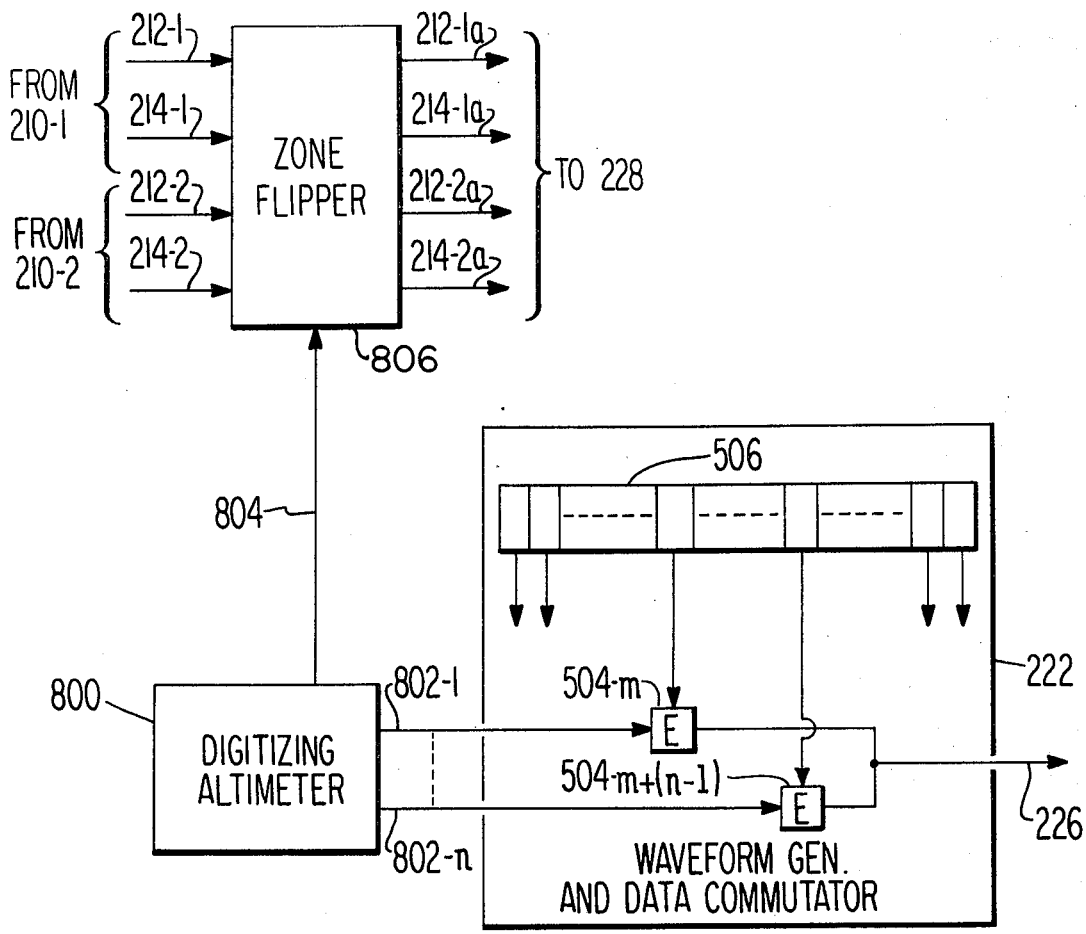
FIG. 8 illustrates a modification of the basic PWI shown in FIG. 2.

FIG. 8 illustrates a slight modification of a basic PWI shown in FIG. 2, where a digitizing altimeter is employed.

Referring to FIG. 8, digitizing altimeter 800 provides an indication of the altitude of the PWI equipped aircraft in the form of a binary Gray code appearing on conductors 802–1 ... 802–n. These are individually applied as first inputs to each of AND gates 504–m .. .504–m + (n-1) of waveform generator and data commutator 222. Respective outputs of certain individual ordinal ones of the stages of shift register 506 of block 222 are applied as second inputs to AND gates 504–m ... 504–m + (n-1), as shown. The outputs of these gates are connected to bit control output conductor 226, along with the outputs of all of the other ones of AND gates 504–1 ... 504–100, shown in FIG. 5. Thus, the partyline data code transmitted from a modified PWI employing a digitizing altimeter will include time-varying information manifesting the altitude of the aircraft on which the modified PWI is located.

Digitizing altimeter 800 also applies a control signal to zone-flipper 806. Zone-flipper 806 includes two reversing switches, both of which are controlled in accordance with the signal applied to conductor 804 from digitizing altimeter 800. In particular, input conductors 212–1, 214–1, 212–2, and 214–2 of zone-flipper 806 correspond in all respects to the output conductors from received probe filter and envelope detectors 210–1 and 210–2, shown in FIGS. 2 and 3. Output conductors 212–1a, 214–1a, 212–2a, and 214–2a of zone flipper 806 correspond in all respects to the input conductors 212–1, 214–1, 212–2, and 214–2 of carrier-frequency generator and selector 228, as shown in FIGS. 2 and 4.

In response to digitizing altimeter 800 indicating that aircraft on which the modified PWI is located is in an altitude region between 5,000 feet and 10,000 feet, the control signal applied to conductor 804 causes zone-flipper input conductors 212–1, 214–1, 212–2, and 214–2 to be directly connected to the corresponding ones of output conductors 212–1a, 214–1a, 212–2a, and 214–2a. However, in response to the altitude measured by digitizing altimeter 800 indicating that the aircraft on which the modified PWI is located is in an altitude region below 5,000 feet, the control signal on conductor 804 causes the reversing switches of zone-flipper 806 to be operated. In this case, input conductor 212–1 is connected to output conductor 214–1a, input conductor 214–1 is connected to output conductor 212–1a, input conductor 212–2 is connected to output conductor 214–2a, and input conductor 214–2 is connected to output conductor 212–2a.

The presence of zone-flipper 806 inserted, as shown, between the received probe filter and envelope detectors on the one hand, and the carrier-frequency generator and selector, on the other hand, will result in carrier-frequency generator and selector 228 generating direct returns when the aircraft is at an altitude of between 5,000 feet and 10,000 feet, and generating inverted returns when the aircraft is at an altitude below 5,000 feet.

DETAILED DESCRIPTION OF THE CAS

Figure 9A:
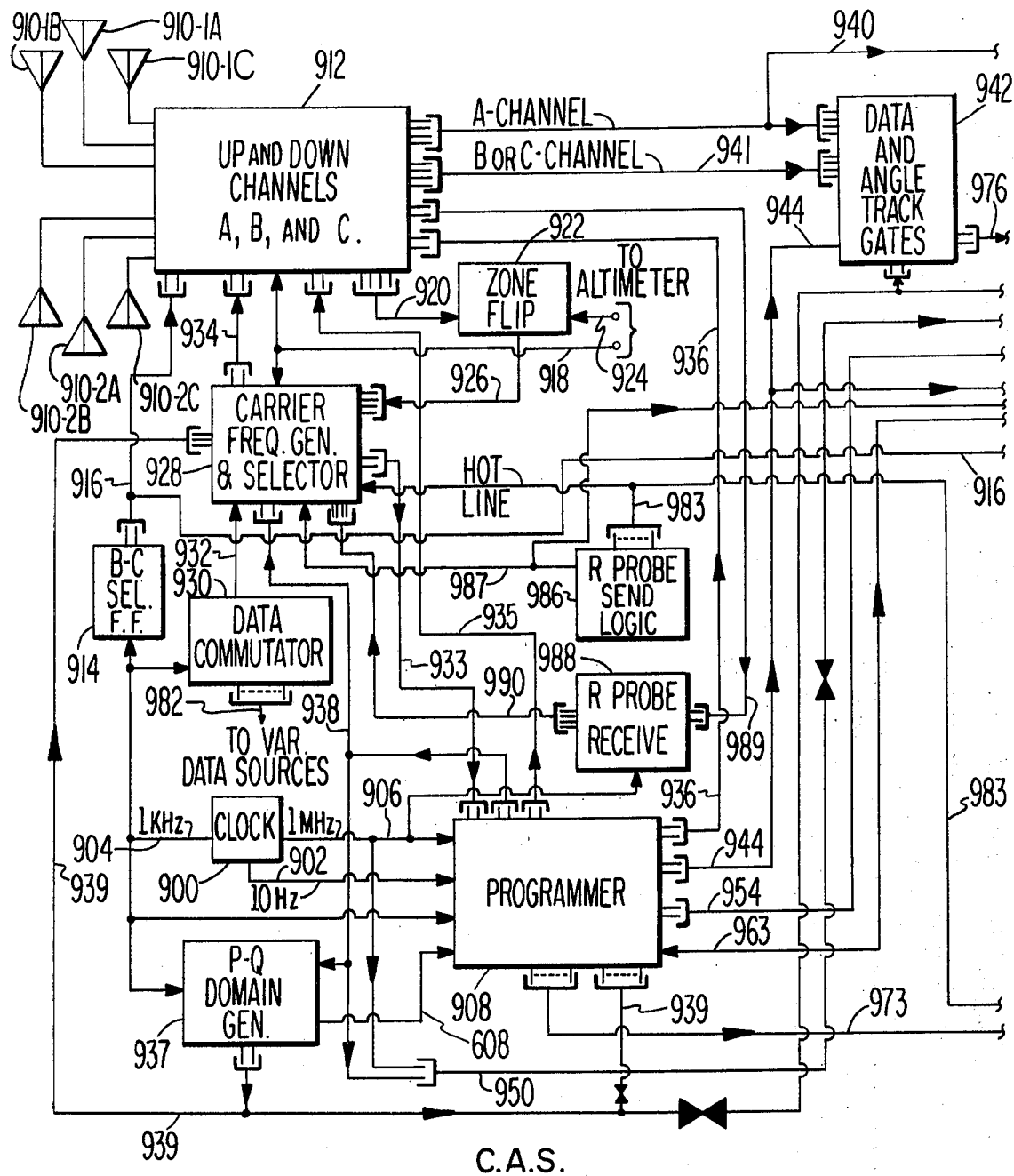
FIGS. 9A and 9B are a block diagram of the CAS (Collision Avoidance System) airborne station of the SECANt system.
Figure 9B:
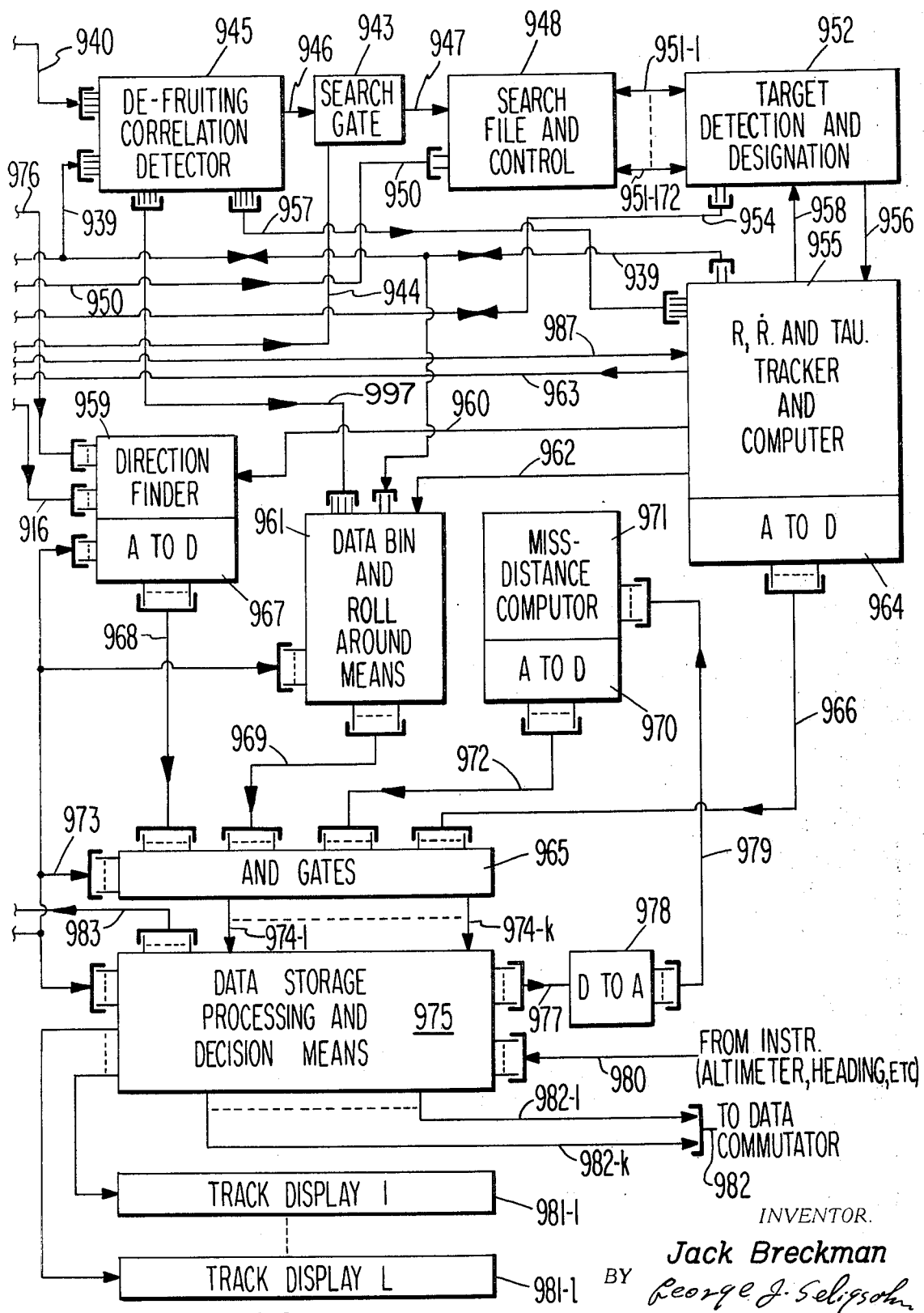

The CAS, a block diagram of which is shown in FIGS. 9A and 9B, taken together, is a vastly more sophisticated piece of equipment that the PWI discussed in the last section.

Referring to FIG. 9A, clock 900 is capable of dividing time into successive 100 millisecond time frames; dividing equally each successive 100 millisecond time frame into 100 one-millisecond time slots; and further dividing equally each successive 1-millisecond time slot into 1,000 one-microsecond count periods. In particular, the output of clock 900 comprises a plurality of spikes, each of which has a duration which is negligible with respect to 1-microsecond. These spikes are applied to conductor 906 periodically at a fixed repetition rate of substantially 1,000,000 per second. Every thousandth one of these clock spikes is applied to conductor 904, so that the clock spikes applied to conductor 904 recur periodically at a fixed repetition rate of substantially 1,000 per second. Every hundredth one of the clock spikes applied to conductor 904 is also applied to conductor 902, so that the clock spikes applied to conductor 902 recur periodically at a fixed repetition rate of substantially ten per second. Clock 900 may have an accuracy of only about one part per million, since it need not be synchronized with any other SECANT system station and since the smallest time interval employed in the CAS aboard any given aircraft is 1-microsecond.

The clock signals appearing on each of conductors 902, and 906 are applied as inputs to programmer 908. Programmer 908 controls the various modes and sequence of operations of the CAS in a manner to be described in detail later in this section.

The CAS includes a triad of three top antennas, 910–1A, 910–1B, and 910–1C, respectively; and a triad of three bottom antennas, 910–2A, 910–2B, and 910–2C, respectively. Each of these antenna triads is arranged in the form of an isoscles right triangle, with the distance between the A and B antennas of either triad equalling the distance between the A and C antennas of that triad. These distances are predetermined and are normally the same for both the top and bottom antenna triads. Further, the base line connecting the B and C antennas of a triad is oriented perpendicular to the longitudinal axis of the aircraft.

The UP channel of block 912 includes a first receiver which is permanently associated with antenna 910–1A and a second receiver which is selectively associated with antenna 910–1B during alternately occurring time slots and is selectively associated with antenna 910–1C during the remaining time slots. Similarly, antenna 910–2A is permanently associated with a first receiver of a down channel of block 912, while antennas 910–2B and 910–2C share a second receiver of the DOWN channel each being selectively associated therewith during alternate ones of each pair of successive time slots. The alternate selection of the B and C antennas by the second receivers of the UP and DOWN channels, respectively, of block 912 is controlled by control pulses applied to block 912 from the output of B-C selector flip-flop 914 over the conductor pair of cable 916. Flip-flop 914 is switched back and forth between its two stable conditions in response to successive 1 KHz clock spikes on conductor 904 applied as an input thereto.

The significance of employing the triad of top antennas and the triad of bottom antennas in the CAS system, which are switched in the manner just discussed, is for the purpose of measuring the relative bearing angle (in the wing plane of the ship) of a bird which is being tracked with respect to the heading of the ship on which the CAS equipment is located. The details of this direction-finding capability of the CAS system will be discussed later in this section of the specification.

Since both the UP and DOWN channels 912 are capable of operating in either a low-frequency band or a high-frequency band (see FIG. 1), depending upon the altitude of the ship with respect to 10,000 feet, a band control signal from the ship's altimeter is applied to block 912 over conductor 918. The control signal on conductor 918 is employed in block 912 for the purpose of switching the local oscillator frequencies in both the UP and DOWN channel receivers in such a manner that the respective IF frequencies manifesting received P, Q and R probe signals and received $P^+$, $P^-$, $Q^+$, and $Q^-$ return signals, respectively, is independent of whether the received signals are derived from the high-frequency band or the low-frequency band, or are derived from the UP channel or the DOWN channel, as the case may be.

Block 912, in performing its function as a remitter in either the UP or DOWN channel, employs only antennas 910–1A and 910–2A and the A receivers of block 912 which are permanently associated with these antennas.

In response to the receipt of a P or Q probe signal by top antenna 910–1A or the receipt of a P or Q probe signal by bottom antenna 910–2A, as the case may be, block 912 operates in a manner equivalent to the UP or DOWN channels of FIGS. 2 and 3, described in the previous section, to provide signals on the appropriate ones of the four output conductors of cable 920, which correspond respectively with the signals on conductors 212–1, 214–1, 212–2, and 212–2 of FIG. 2.

The signals present on the conductors of cable 920 are applied as an input to zone flipper 922, which, as described in connection with FIG. 8, has its reversing switches controlled by a signal from the altimeter applied thereto over conductor 924. Depending upon the altitude of the aircraft on which the CAS is located, these signals on the conductors of cable 920 will either be transferred in direct fashion or be transferred in inverted fashion through the corresponding conductors of cable 926 connected to the output of zone flipper 922.

The signals on the four conductors of cable 926 are applied as inputs to carrier frequency generator and selector 928, which is similar to previously described carrier frequency generator and selector 228, except that it is capable of generating the whole spectrum of frequencies shown in FIG. 1, rather than only the six frequencies shown in FIG. 4.

In accordance with the signal applied thereto over conductor of cable 926, the band control signal applied thereto from conductor 918, and the bit control signal applied thereto from data commutator 930 over conductor 932, carrier frequency generator and selector 928 selectively applies to either the UP conductor or the DOWN conductor of cable 934 a 1-microsecond burst of carrier frequency, manifesting $P^+$, $P^-$, $Q^+$, or $Q^-$, whichever is appropriate. At the same time a return control pulse is applied to programmer 908 over an UP or DOWN conductor of cable 933, which corresponds with conductors 232-1 and 232-2 of FIG. 2. In response thereto, programmer 908 applies a switching signal over one of the two conductors of cable 935, which correspond to conductors 234-1 and 234-2 of FIG. 2, to operate the proper T-R switch, thereby causing the UP channel of block 912 to transmit a proper return signal from top antenna 910-1A in response to antenna 910-1A having received a probe signal, and to cause the DOWN channel of block 912 to transmit a proper return signal from bottom antenna 910-2A in response to antenna 910-2A having received a probe signal. Thus, the normal operation of the CAS as a remitter is substantially similar to the previously described operation of the PWI as a remitter.

As is the case of the PWI, the transmitted return signals of a CAS contribute to the inter-aircraft party-line data link by manifesting in sequence the binary value of each bit of a 100 bit data code having a format which is the same for all participating aircraft in the SECANT system. The binary value of each of these data bits is controlled by the signal present on conductor 932 of data commutator 930. The signal present on conductor 932 corresponds in all respects with the bit control signal present on conductor 226 of wave form generator and data commutator 222 of FIGS. 2 and 5. Data commutator 930, which is identical in structure to the data commutator contained in block 222, includes a recirculating 100 stage shift register, which corresponds in all respects to shift register 506, and 100 AND gates, which correspond to AND gates 504-1 . . . 504-100, respectively, associated with each original stage of the shift register. The shift register of data commutator 930 is shifted at the end of each time slot in response to each clock spike applied thereto over conductor 904. The binary value associated with each of certain ones of the AND gates of data commutator 930 is permanently selected by strapping to "1" and "0" busses as is shown in FIG. 5. However, the binary value associated with each of other ones of the AND gates of data commutator 930 is determined by the variable potential level on each of the conductors of cable 982, connected at inputs to data commutator 930. Some of this variable data, such as altitude, is obtained from instruments aboard the aircraft which are not in as of themselves part of the CAS. The rest of this variable data is obtained from data registers aboard the aircraft which are part of the CAS, and will be discussed in more detail later in this section.

Figure 10:
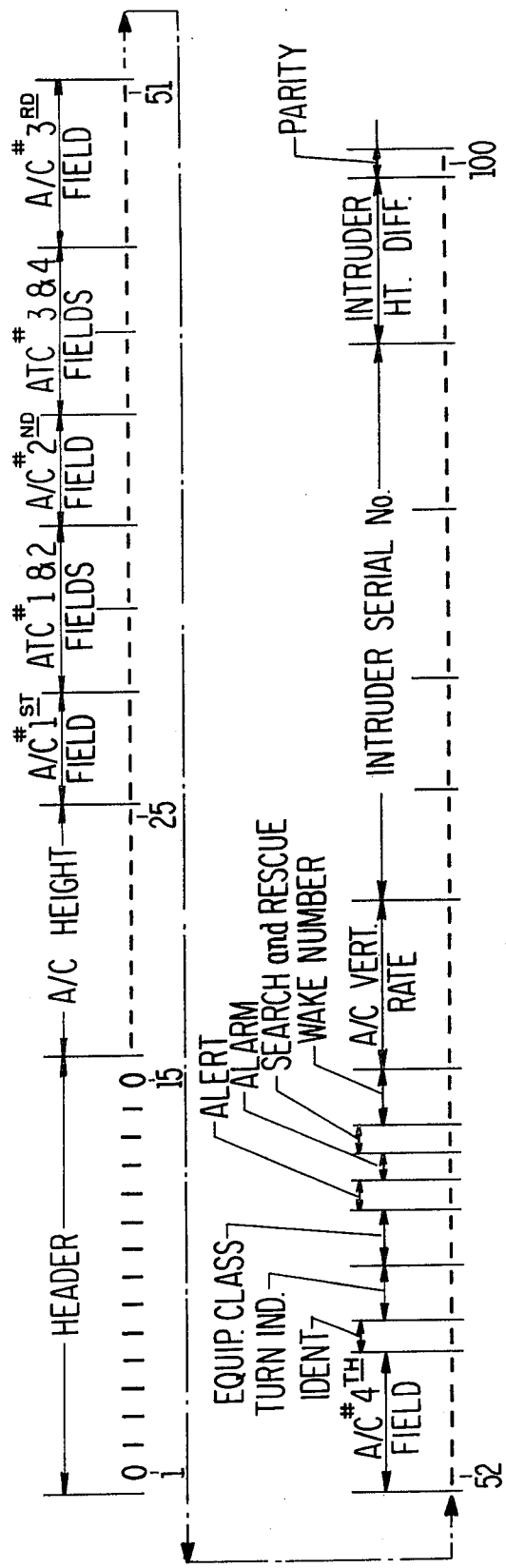
FIG. 10 is a diagram showing the format of a preferred 100 bit data code employed in the SECANT system.

As stated earlier, the format of the data code employed in all SECANT system participating aircraft is identical. For illustrative purposes, a suggested format of a 100 bit data code is shown in FIG. 10. It should be understood, however, that other formats or data codes of other bit lengths could be employed without departing from the present invention.

Referring to FIG. 10, the various items of information contained in the illustrative format of the hundred bit data code are listed and explained as follows:

Header

For a receiving aircraft to determine the start of the cyclicly-transmitted hundred bit data code, all participating aircraft in the SECANT are provided with the same identical Header consisting of 15 consecutive bits (1-15). As shown in FIG. 10, the Header consists of a single bit manifesting a binary "0," followed by 13 consecutive bits each manifesting a binary "1," followed by a single bit manifesting a binary "0." The format of the remaining 85 bits of the one hundred bit data code is arranged in a manner such that it is impossible for 15 consecutive bits to validly have the respective binary values of the 15 consecutive bits making up the Header.

Aircraft Height

A 10 bit Gray code (16-25) is employed for manifesting the altitude of a remitting aircraft with 100 foot granularity over an altitude range extending from the maximum negative altitude below sea level to the maximum positive altitude above sea level that any aircraft is capable of attaining. A particular Gray code value, which uniformly manifests a certain fixed, predetermined negative altitude, which is beyond that which any aircraft is capable, indicates that the remitting aircraft is not sending aircraft height information.

Aircraft Serial Number

Every aircraft is assigned a serial number. In the United States, aircraft serial numbers begin with an N, which is followed by five characters. The first three of these characters are decimal digits while the last two of these characters may be either digits or letters. The data code is designed to manifest each of the trailing four of the five characters following the N. The first four-bit field (26-29) and the second four-bit field (36-39) are prewired to manifest in binary coded decimal form the value of each of the first two digit characters of the trailing four characters of the aircraft serial number included in the data code. A third field of six consecutive bits (46-51) and a fourth field of six consecutive bits (52-57) are prewired to manifest in binary coded alpha-numeric form the value of the digit or letter of the third and fourth characters of the trailing four characters of the aircraft serial number included in the data code.

ATC Number and IDENT

Anticipating that the SECANT remitter may one day be used as an ATC responder, an ATC number field is included as well as an IDENT bit. The ATC number consists of four octal fields (30-32, 33-35, 40-42, and 43-45, respectively). If there is a binary "0" in all of these bit positions of the data code, it manifests that no ATC number is being sent. The binary value of bit position 58 is utilized for transmitting IDENT information.

Turn Indicator

The binary values in bit positions 59 and 60 are utilized to supply turn indication data about the remitting aircraft. In particular, "00" indicates no turn, "01" indicates a right turn, "10" indicates a left turn, and "11" indicates that no turn indication is being sent.

Equipment Class

Bit positions 61 and 62 of the data code are employed to indicate the equipment class of the remitting aircraft. In particular, "00" indicates that the remitter is a ground remitter, "01" indicates that the remitting aircraft is a PWI, "10" indicates that the remitting aircraft is a CAS, and "11" indicates that the responding aircraft is a TMS.

Alert and Alarm

A binary "1" in bit position 63 of the data code indicates that the remitting aircraft is in an alert condition due to an intruding aircraft in its general vicinity. Similarly, "1" in bit position 64 of the data code indicates that the remitting aircraft is in an alarm condition due to an intruding aircraft in its close vicinity.

Search and Rescue

A binary "1" in bit position 64 of the data code indicates that the remitting aircraft requires search and rescue.

Wake Number

Bit positions 66 and 67 indicate the wake number of the responding aircraft. In particular, "00" indicates that no wake number is being sent, "01" indicates that the aircraft produces only a light wake, "10" indicates that the aircraft produces a medium wake, and "11" indicates that the aircraft produces a heavy wake.

Aircraft Vertical Rate

A six bit Gray code (68–73) indicates with a 1-foot per second granularity the rate of change in altitude of a remitting aircraft. A predetermined negative value greater than a given negative maximum indicates that no aircraft vertical rate information is being sent.

Intruder Aircraft Serial Number and Intruder Height Difference

First and second four-bit binary coded decimal fields (74–77 and 78–81) and third and fourth six-bit binary coded alpha-numeric fields (82–87 and 88–93) indicates the aircraft serial number of any intruder detected by a CAS or TMS remitting aircraft. If the binary value of both bits 78 and 79 of the data code are "1," no intruder serial number is being sent. If height information about an intruder is detected by a CAS or TMS, the difference in height between the remitting aircraft and the intruder may be computed and sent with 100 foot granularity by a six-bit Gray code (94–99). If no height difference information is being sent, a predetermined negative value is always sent which is above in absolute value the negative maximum height difference that might ever be sent.

Parity

The binary value in the hundredth bit indicates the parity of the binary values of all 100 bits of the data code.

This completes the description of the CAS when it is operating in its remitting mode.

The operation of the TMS in its remitting mode is in all respects identical to that of the CAS, just described.

The operation of the CAS in its capacity as a ship, rather than as a bird, will now be discussed.

As a ship, the CAS will successively operate through successive rounds. Each round consists of an UP run, followed by a DOWN run. Each run, whether UP or DOWN, comprises an integral number of time frames, each having a duration of 0.1 seconds. However, the number of successive time frames in any run is not fixed, but depends upon the total number of detected birds in the vicinity of the ship, as well as the individual flight characteristics of each of these detected birds with respect to the ship. Further, as a ship, the CAS is capable of a plurality of separate modes of operation. The first one of these modes, which only takes place during the first time frame of any run, is a priming, search-only mode. During a priming mode time frame, each detected bird is stored in a particular one of a plurality of consecutive range cells of a search file in accordance with the approximate range of that detected bird. Immediately upon the end of this priming frame of a run, the consecutive range cells of the search file are scanned in ascending order until the particular range cell is reached in which the detected target closest to the ship is located. (If this scan shows that no detected target at all has been stored in the search file, the run is completed and the next time frame is devoted to a priming frame of the next following run.) Assuming, however, that the scan of the search file at the end of the priming time frame of a run does find a particular range cell in which the closest detected target is located, the run continues for at least one more time frame, during which the CAS employs a second one of its plurality of modes of operation.

The second mode of operation of the CAS is a combined search and tau-track mode. (Tau, which is measured in units of time, is the quotient of the range between a given detected bird and the ship, divided by the rate of change of this range.) During any time frame devoted to this second mode of operation, the stored information in the search file is up-dated and simultaneously the range of the particular detected bird found by the search file scan just described at the end of the previous time frame is continuously tracked to provide signals at the end of this tau-track which manifest the range, the range rate, and the tau of the tracked bird. (The derived values of these parameters may be stored as described below.) The value of the tau parameter is employed at the end of a tau-track frame to determine whether the tracked bird is a possible threat to a ship or is only flak.

More particularly, if the measured value of tau exceeds a predetermined value (60 seconds, for instance), it is considered to be flak and no storage of range, range rate or tau takes place. In this case, at the end of such a tau track, the search file is further scanned in ascending order (beginning with the range cell which has just been tracked), until the next closest detected bird is found. (If no addition detected bird is found in the rest of the search file, the run is completed and the next run begins with the next occurring time frame.)

If an additional detected bird is found, however, the next-occurring time frame is devoted to a tau track thereof, with the search file being updated during each tau track run.

Generalizing, if at the end of any time frame devoted to a combined search and tau track, it is determined that the tracked bird is flak, the next-occurring frame will be devoted to a combined search and tau track of another detected bird, if any exists, which is closer to the ship than all other birds except those that have been already tau-tracked during that run. This process continues until, during any given run, all detected birds in the search file, have been tau tracked in order from the closest to the furthest with respect to the ship. If the tau track of the detected bird furthest from the ship shows that it is flak, the next time frame begins the next successive run.

On the other hand, if at the end of any frame devoted to a combined search and tau track, it is determined that the tau of the tracked bird is below the aforesaid predetermined value, so that it is a possible threat, the CAS switches into a third one of its plurality of modes of operation and the range; range rate and tau parameters derived during this tau track are stored in registers. This third mode of operation of the CAS, which is maintained for the next successive five consecutive time frames, is known as a data and angle track mode. During each of the consecutive five time frames of the data and angle track mode, the particular bird, which has been determined to be a possible threat in the preceding tau track frame, is again range tracked to determine its present range, range rate, and tau parameters (and these values are also stored in registers). In addition, during the five consecutive time frames of a data and angle track, the antenna triad together with a direction finder are employed to measure the bearing angle of the tracked bird.

All this information is stored in registers and, during the five consecutive time frames, is utilized along with locally derived information such as altitude and heading, to compute, based on available information, the projected miss-distance between the tracked bird and the ship. This miss-distance information along with the detected data transmitted from the tracked bird to the ship over the party-line data link during these five consecutive time frames are also stored in registers.

All this stored information is utilized to determine whether the tracked bird is actually flak, despite its original low value of tau which triggered the data and angle track mode, or is actually a truly threatening aircraft. Further, threatening aircraft are divided into classes consisting of those that have relatively long tau (45–60 seconds, for instance) and those that have a relatively short tau (below 45 seconds, for instance). In the first case only, an alert indicator is operated, while in the latter case an alarm indicator is operated. Such an alert or alarm is the first indication to the pilot of the aircraft as to what is going on in the CAS system. Further, if time permits, the data from an actually threatening tracked bird will be automatically forwarded over a hot-line to the ATC on the ground. This permits the ground to provide helpful advice to the pilot over voice radio. In addition, in response to either an alert or alarm condition, based on the available stored information, the pilot will have displayed to him in alphanumeric form certain desirable items of the available stored information. These may include the time left until collision, the best escape maneuver of the ship to avoid collision with an intruding bird, the aircraft serial number of the intruding tracked bird, the height difference between the ship and the intruding aircraft, etc.

During the first four of the five consecutive frames in which the CAS is operating in its third mode, or data and angle-tracking mode, no updating of the search file takes place. However, in the fifth, and last time-frame of the five consecutive time frames composing a data and angle tracking mode operation of the CAS, the search file is updated.

At the end of the five consecutive frames of the data and angle tracking mode, regardless of what information was gathered during these frames, the next time frame is assigned to a combined search and tau track of the detected bird associated with the range cell which, in ascending order, next follows the range cell associated with bird which has just been tracked in the preceding time frames. Of course, if the bird which has been tracked in the preceding time frame is that detected bird whose range from the ship is the furthest of all detected birds, a new run begins.

In order to better understand the operation of the CAS from the point of view of the ship, reference is again made to FIG. 9A. Programmer 908, in response to the clock spikes applied thereto over conductors 902, 904, and 906 and in response to various feedback signals applied thereto controls the sequence of operation and the choice of modes of the CAS system.

In particular, for the duration of each UP run, programmer 908 applies a signal to one conductor of cable 936 and for the duration of each DOWN programmer 908 applies a signal to the other conductor of cable 936. The conductors of cable 936 are applied to UP and DOWN channels 912. Further, once during each millisecond time slot, a one microsecond probe control signal is applied to carrier-frequency generator and selector 928 and P-Q domain generator 937 over conductors of cable 938. The clock spikes on conductor 904 are also applied as an input to block 937, which is identical in all respects to P-Q domain generator 224 of FIGS. 2 and 6. Thus, in the manner previously described, P-Q domain generator 937 randomly assigns either a P domain or a Q domain to each successive time slot, which domain is initiated in response to the occurrence of the probe control signal applied thereto over a conductor of cable 938 and terminates in response to the end of that time slot.

The P and Q domain conductors and a conductor carrying a 1 MHz signal are applied through cable 939 as inputs to carrier-frequency generator and selector 928. Block 928, in accordance with the signals present on the conductors of cables 926 and 939, and in response to the presence of a probe control signal on conductor 939, applies a burst of the appropriate frequency manifesting either a P probe signal or a Q probe signal to be transmitted to a first conductor of cable 934, in the case of an UP run, and to a second conductor of cable 934, in the case of a DOWN run. At the same time, the T-R switch of the UP or DOWN channel, as the case may be, is actuated by a signal applied over a conductor of cable 935. In response thereto, during time slots of an UP run, antenna 910–1A transmits either a P or Q probe signal (in accordance with the domain of that time slot as selected by block 937). In a similar manner, during each time slot of a DOWN run, antenna 910–2A transmits a P or Q probe signal.

During each time slot of an UP run, all the return signals received by top antenna 910–1A are applied through P+, P−, Q+, and Q− filters and applied as an IF signal to the appropriate one of the P+, P−, Q+, or Q− conductors of A channel cable 940. (In a similar manner, during each DOWN run, return signals received by antenna 910-2A are applied to the appropriate conductors of A channel cable 940.)

Further, during each time slot of an UP or DOWN run, in accordance with the stable condition of flip-flop 914, the return signals received by one or the other of top antennas 910-1B and 910-1C or bottom antennas 910-2B and or 910-2C, are passed through P+, P−, Q+ and Q− filters to provide an IF signal on the appropriate one of the P+, P−, Q+, or Q− conductors of B or C channel cable 941.

Data and angle gates 942 shown in FIG. 9A, and search gate 943, shown in FIG. 9B, are controlled in accordance with mode-manifesting control signals applied thereto from programmer 908 over conductors of cable 944. In particular, data and angle gates 942 is closed for the duration of each priming mode and for the duration of each tau-track mode, but is open for the five consecutive time frames of any data and angle track mode. In addition, a set of P and Q domain conductors of cable 939 are coupled as inputs to data and angle gates 942. Search gate 943 is open for each priming mode and for each tau-track mode, for the fifth of the five consecutive time frames of each data and angle track mode, but is closed for the first four of the five consecutive time frames of each data and angle track mode.

Referring now to both FIGS. 9A and 9B, the P+, P−, Q+, and Q− conductors of cable 940 are applied as inputs to defruiting correlation detector 945. In addition, control signals including those derived from P-Q domain generator 937 are applied from programmer 908 as inputs to detector 945 over the conductors of cable 939. Correlation detector 945 includes a separate envelope detector followed by a Schmitt trigger corresponding to each of the P+, P−, Q+, and Q− inputs applied thereto in IF form.

The trigger circuits are thresholded by a time varying potential level (STC) from programmer 908, which varies from a maximum value, which occurs immediately upon the transmission of probe signal, to a minimum value many microsecond count periods later. This does not affect hits, which are synchronized with the transmitted probe signals, because the amplitude of hit return signals from nearby birds is much greater than from relatively distant birds. However, because received fruit signals are not synchronized with the transmitted probe signals, the use of an STC time-varying threshold greatly descriminates against fruit, especially fruit originating from relatively distant birds.

The signals marking a domain as either P or Q, as the case may be, are applied to correlation detector 945 over conductors of cable 939. This permits detector 945 to correlate those return signals applied thereto over conductor 940, which exceed the time varying threshold, with the then-existing P or Q domain, in the manner discussed previously in connection with FIGS. 2 and 7. Correlation detector 945, in response to each correlated P+ or P− return signals received during a P domain, or each correlated Q+ or Q− return signal received during a Q domain, applies an incremental positive pulse of predetermined amplitude to output conductor 946 thereof. Detector 945, in response to a correlated P+ or P− return signal received during a Q domain or a correlated Q+ or Q− return signal received during a P domain, applies an incremental negative signal of the aforesaid predetermined amplitude to output conductor 946 thereof. During those time frames in which search gate 943 is enabled, in response to a control signal applied thereto over conductor 944, the signal on conductor 946 is applied through search gate 943 and conductor 947 to search file 948, which includes a predetermined range-limited number of range cells.

Further, clock spikes present on conductor 906 together with the probe control signals present on a conductor of cable 938, are applied as control inputs to search file 948 over cable 950. The control of search file 948 includes a counter for counting 1 MHz clock spikes, which are applied thereto only after the occurrence of each successive probe control signal. This counter is effective in connecting conductor 947, in ascending order sequence, to the set of range cells. Therefore, each range cell is connected to input conductor 947, for a count period of 1 microsecond, which corresponds to a range interval of approximately 500 feet. It is assumed that the set includes 172 range cells, each corresponding to a successive range interval of approximately 500 feet, so that the 172 range cells of the set comprising the search file provides a range-limited hazard radius of approximately 86,000 feet. (For a faster aircraft, such as an SST, the number of range cells in the set may be increased and for a slow aircraft the number of range cells in the set may be decreased.) Each of output conductors 951-1 . . . 951-172 of search file 948 is individually associated with a corresponding one of the set of range cells.

Each of the range cells is composed of either an analog accumulator, such as an integrating capacitance, or a digital accumulator, such as an integrated circuit reversible counter. In either case, the range cell maintains the total accumulation of the increments applied thereto over input conductor 947 until cleared by dump signals applied to the range cells of search film 948 from target detection and designation block 952. The generation of these dump signals by target detection and designation block 952 is discussed later.

At the end of any time frame during which a search took place, programmer 908 applies a target scan initiation control signal to block 952 over certain one of the conductors of cable 954. In response thereto, a line-finding scanner in block 952 (which has a home position and an individual position corresponding to each of range cell line conductors 951-1 . . . 951-172, and which during any time frame is in some particular one of its 173 possible positions) is actuated to scan in ascending order those ones of line conductors 951-1 . . . 951-172 which are above the particular position already attained by the scanner. This scan continues until a line is found that provides an accumulated positive or negative reference cell signal which exceeds a positive or negative threshold of a predetermined absolute value. This manifests the existence of a bird in the range interval corresponding to that line. In response to the detection of such a bird target, scanning stops and the scanner remains in the position then attained until the end of the next succeeding time frame during which a search has taken place, at which time it is again actuated.

After a target is detected in a particular range cell, an analog voltage having a magnitude determined by the ordinal position of the reference cell in which the detected target has been found, is applied to range, range-rate and tau-tracker and computor 955 over conductor 956. During the operation of the scanner, as each range cell is scanned, a dumping signal is applied to the immediately preceding range cell to clear any accumulated signal from the latter.

If during a line scan by the scanner of block 952, no targets are detected, the scanner will continue to scan only until it reaches its home position, which is an indication that a run has been completed. In response to the scanner having reached its home position, a run-complete control signal will be fed back from block 952 to programmer 908 over a conductor of cable 954. In response thereto, programmer 908 will begin a new run, which will be an UP run if the preceding run had been a DOWN run, or a DOWN run if the preceding run had been an UP run.

Assuming now that at the end of a given time frame, in the manner discussed above, block 952 has found a detected target in a particular range cell and, therefore, has applied the aforesaid analog signal to tracker 955 over conductor 956, it follows that the next succeeding time frame cannot be a priming time frame, but must be devoted to either a tau-track or the beginning of a data and angle track. Under these conditions, a control signal is forwarded from programmer 908 to correlation detector 945 over a conductor of cable 939 to cause the input to the $P^+$, $P^-$, $Q^+$ and $Q^-$ Schmitt triggers of correlation detector 945 to be selectively coupled to corresponding conductors of cable 957, connected as shown between detector 945 and tracker 955. Thus, during a tracking time frame $P^+$, $P^-$, $Q^+$ and $Q^-$ detected video signals are applied, respectively, as signal inputs to tracker 955. Further, during tracking time frames, control signals from programmer 908, including signals derived from P-Q domain generator 937, are applied to tracker 955 over conductors of cable 939.

Tracker 955, in response to the magnitude of the analog signal applied thereto over conductor 956, as described above, generates a very wide (somewhat greater than 1 microsecond, i.e. covering a range interval of somewhat more than 500 feet) acquisition range gate which occurs at a time following the occurence of a probe control signal (applied to block 955 over a conductor of cable 939) which is determined by the magnitude of the analog signal on conductor 956. The time of occurence of this acquisition range gate is such that it corresponds roughly to the range of the target bird which was detected at the end of the preceding time frame. Therefore, the return signals transmitted from the detected bird will pass through the acquisition range gate. The tracker of block 955, as is conventional, compares the relative time of occurence of the midpoint of the range gate with the actual time of occurence of a return signal which has passed through the range gate to provide an error signal, and then shifts the occurence of subsequent range gates in a direction to minimize the error. Therefore, once acquisition has been achieved, and so long as tracking of the target bird is maintained, the analog signal which was applied over conductor 956 to attain acquisition is removed. This occurs when acquisition is attained in response to a control signal returned from block 955 to block 952 over conductor 958. However, this analog signal is maintained in block 952 until the next sampling of search file 948. Therefore, shoulder tracker 955 lose the target, a lost target control signal applied over conductor 958 will cause the analog signal to again be applied to block 955 over conductor 956 until the target is reacquired.

The internal operation of block 955 will be discussed later in this section. However, it produces a first range gate of substantially 1 microsecond duration, which is applied to direction finder 959 over conductor 960 and produces a second range gate having a duration of only a small fraction of a microsecond which is applied to data bin 961 over conductor 962. In addition, block 955 generates an analog video signal manifesting the range of the tracked bird as a function of time, and, by differentiating this range signal, generates an analog video signal manifesting range rate as a function of time. Further, the value of tau is computed by dividing the range signal by the range rate signal. The computed value of tau is sampled at the end of a tau-track time frame and, if the value is less than a predetermined value (such as 60 seconds) indicating that the tracked bird is potentially threatening, a signal is fed back from block 955 to programmer 908 over conductor 963. In response thereto, programmer 908 assigns the next five consecutive time frames to a data and angle track of the tracked bird, and, as will be described later, digital readout of range, range rate, and tau takes place. If no signal is fed back over conductor 963 at the end of a tau-track, an attempt is made during the next following time frame to tau track the detected target bird, if any, next furthest from the ship. In this latter case no readout of any information takes place, and the tracked bird is dismissed as tau-flak.

If a data and angle track is called for (in response to a signal being present on conductor 963, as previously described) block 955 continues to track the tracked bird it was tracking during the immediately preceding tau-track frame for another five consecutive time frames. However, the control signals on the conductors of cable 944 applied by programmer 908 during the five consecutive data and angle track frames cause data and angle track data 942 to open for each of these five consecutive time frames and cause search gate 943 to be closed for the first four of the five consecutive data and angle track time frames, but to be open for the fifth of the five consecutive time frames. Depending on whether a P or Q domain exists for the return signals of the tracked bird, the opening of data and angle track gate 942 causes an IF return signal present on the P or Q conductors, respectively, of A channel cable 940 to be forwarded to one of the conductors of cable 976 and an IF return signal present on the P or Q conductors, respectively, of B or C channel cable 941 to be forwarded to the other conductor of cable 976. The signals present on the conductors of cable 976 are applied as first and second signal inputs to direction finder 959. The details of direction finder 959 will be discussed later in this section. Briefly, however, direction finder 959, in response to the signal input supplied thereto over conductors of cable 976, the B-C channel selecting signals applied thereto from flip-flop 914 over cable 916, and the first range gate from tracker 955 applied thereto over conductor 960, provides, during each time frame of the data and angle track, an analog signal manifesting the relative bearing angle of the bird in the wing plane of the ship with respect to the heading of the ship. At the end of each time frame of the data and angle track, the analog signal manifesting the relative bearing angle is converted to digital form in analog to digital converter 967 in response to a sampling control signal applied thereto over one of the control conductors of cable 973 from programmer 908. In the manner previously described, the digital output of analog to digital converter 967 is applied through cable 968, AND gates 965 and appropriate ones of conductors 974–1 . . . 974–k to working registers in block 975.

During the five consecutive time frames of a data and angle track, programmer 908 applies a control signal to a conductor of cable 939 which causes the respective outputs of the $P^+$, $P^-$, $Q^+$ and $Q^-$ Schmitt triggers of de-fruiting correlation detector 945, which was discussed above, to be forwarded to corresponding conductors of cable 997, which are applied as separate input signals to the data bin of block 961. Block 961 includes 100 data storage bins (the number of bits in the party-line data code) and steering means operated at the end of each time slot in accordance with a time control signal applied to block 961 over a conductor of cable 973, to permit each successive one of the return signals on conductors 997 which occurs in time coincidence with the second range gate on conductor 962 to be applied in ascending order to separate ones of the 100 data bins. A passed return signals manifesting $P^+$ or $Q^+$ produces a stored signal manifesting a given binary value in the data bin to which it is applied, and a passed return signal manifesting $P^-$ or $Q^-$ produces a second stored signal manifesting an opposite binary value in the data bin to which it is applied.

In order to minimize error, data bin 961 is permitted to operate through the entire five consecutive time frames of a data and angle track before it is read out. Thus, five successive cycles of the data code transmitted from the tracked bird are accumulated in the 100 data bins. Since there is no synchronization between the ship and the bird, there is no way of assigning any particular one of the 100 data bits to any particular one of the data bins of the transmitted code. However, since there are 100 bits in the data code and there are 100 data bins, the same bit of the data code will be applied to the same data bin in each of the five consecutive cycles of the data code.

At the end of the five consecutive time frames of the data and angle track, when it is desired to read out the received data code, it is necessary to employ roll around means, such as a 100 stage recirculating shift register. In particular, the data bit stored in each of the 100 data bins is transferred to the corresponding stage of the shift register. The sequence of bits in the first 15 stages of the shift register is compared with the binary values of the 15 bits making up the header of the data code, which is the same for the entire SECANT System, as discussed above in connection with FIG. 10. If the 15 bits in the first 15 stages of the shift register are not coincident with the 15 bits of the header, 1 MHz clock spikes, applied over a conductor of cable 973, shift register one stage at a time until coincidence is achieved, and proper correspondence between the shift register stages and ordinal data bits of the data code exists. Thereafter, the data code is transferred through conductor 969 AND gates s and certain ones of conductors 974–1 . . . 974–k to assigned track registers of block 975, in a manner to be described below.

In addition to the foregoing inputs to block 975, inputs from instruments aboard are also applied to block 975 over cable 980. The information from these instruments includes such items as altitude and the actual heading of the aircraft. This data information is also stored in working registers of block 975.

With the data applied to and stored in working registers of block 975 over each of the five consecutive time frames of a data and angle track, preceded by a single frame tau-track, a signal-processing portion of block 975, among other things, has knowledge of the relative bearing angle of the tracked bird during each pair of the two successive preceding 100 millisecond time frames; the ship's actual heading during each pair of these two preceding time frames and the range from the ship to the tracked bird during each pair of these two preceding time frames. The processing portion of block 975 may utilize the relative bearing angle and ship heading information in each pair of two preceding time frames to compute and register in digital form the rate of change in the relative bearing angle of the tracked bird with respect to the ship. This digital information, along with digital information as to the range between the ship and the tracked bird having each of the two preceding time frames, as well as the differences in these ranges are applied as digital signals over the conductors of cable 977 to the input of digital to analog converter 978, where four signals manifesting, respectively, in analog form the rate of change of bearing angle between the tracked bird and the ship, the respective range between the tracked bird and the ship at the end of each of the two preceding time frames, and the range difference therebetween, are applied over conductors of cable 979 as inputs to miss-distance computer 971. Miss-distance computer 971 is an analog computer which, with the inputs supplied thereto, can figure out the minimum miss-distance between the tracked bird and the ship (i.e., the closest approach of the tracked bird to the ship assuming that no maneuver of either takes place). This computed miss-distance is converted to digital form in analog to digital converter 970 and applied through cable 972, and gates 965 and certain ones of conductors 974–1 . . . 974–k to working register in block 975.

With all the information now stored in block 975, the degree of threat to the ship by the tracked bird may be determined. For instance, if the data received from the party line data code at the end of the five consecutive time frames includes the altitude of the tracked bird, the processing portion of block 975 may utilize this information along with the altitude of the ship to determined the height difference between the ship and the tracked bird.

Block 975 includes a group of separate track registers. At the end of the fifth consecutive time frame of a data and angle track, when the output from data bin 961 is being readout, the aircraft serial number of the tracked bird, as manifested by the party-line data code transmitted by that bird, is compared with the aircraft serial numbers stored in each of already assigned ones of the track registers to determined if that particular tracked bird was subject to a data and angle track during the preceding round. If so, the data code information transmitted by this tracked bird during the present round is applied to the particular track register already assigned to that bird. In addition, other significant information about the tracked bird gathered during the present round, which, as previously described, is stored in working registers of block 975, is transferred to the particular tracking register already assigned to that bird. Thus, the stored information about a tracked bird in the tracking register assigned thereto is updated each round.

On the other hand, if the present round is the first round that a particular bird is being data and angle tracked, an idle one of the plurality of track registers is assigned thereto. Thus, the CAS provides continuity from round to round in keeping track of all birds which continue to be data and angle tracked in each of successive rounds, and, therefore, remain potential or actual threats to the ship. When a bird is no longer a potential or actual threat to the ship, manifested by the fact that it was data and angle tracked during the preceding round, but not during the present round, the track register assigned to that tracked bird is cleared and this register is then available for assignment to another tracked bird during succeeding rounds.

Any bird that has been subject to a data and angle track during any round must have a tau below a predetermined value, such as 60 seconds, or, otherwise, no data and angle track would have taken place during that round. Therefore, the very fact that a data and angle track did take place shows that the tracked bird is potentially threatening and is not tau-flak.

The decision portion of block set 975, in response to a data and angle track having taken place, considers both the respective values of the height difference between the ship and the bird, if available, stored in a height-difference register, as described above, and the computed miss-distance between the ship and the tracked bird, stored in a miss-distance register. If the registered height difference is greater than a predetermined amount (which may be fixed or may vary with such factors as the ship's velocity), the tracked bird is dismissed for that round as height-flak. Similarly, if the value of miss-distance exceeds a predetermined value (which may be fixed or may vary with such factors as the velocity of the ship) the tracked bird is dismissed during that round as miss-distance flak.

However, if the registered height difference is either not available or is below the predetermined value and if the registered miss-distance is below the predetermined value, the decision portion of block 975 concludes that the tracked bird is an actual threat during that round. In response to such a decision, if the registered tau is between 45 seconds and 60 seconds, an alert indication is provided on that one of track displays 981-1 . . . 981-L which is assigned to the particular track register associated with the bird then being tracked. On the other hand, if the tracked bird has been determined to be an actual threat and the value of tau is below 45 second, an alarm indication is provided on that display. In addition, an alpha-numeric portion of the display is used to read out such portions of the stored data as the threatening birds serial number, its height difference, if available, time to closest approach (or collision), instructions of an evasive maneuver determined in the light of the known relative bearing angle and/or other available or computable information which would be helpful to the pilot in avoiding a mid-air collision. As discussed in connection with FIG. 10, some of this data, such as the intruding bird's serial number and the height difference between the intruding bird and the ship, is applied as data inputs to data commutator 930 over conductors 982-1 . . . 982-k of cable 982.

Furthermore, in response to an alert condition, a hot-line control signal is applied through a conductor of cable 983 as an input to block 928, which results in the respective "1" and "0" manifesting bits of the 100 bit data code from commutator 930 being applied as bursts of M and N carrier frequency, respectively, to the DOWN channel conductor of cable 934. (However, there may be provided manual switch means, operable by the pilot, which disables the otherwise automatic operation of the hot-line.) If the hot-line has not been disabled by the pilot, it automatically makes a 1-microsecond transmission of a successive bit of the data code once during each successive time slot. The hot-line transmissions are made at a fixed interval, such as 10 microseconds, after the transmission of a probe pulse during any time slot. Further, any transmission of return signals from bottom antenna 910–2A is inhibited during the transmission of a hot-line signal. In addition, cable 934 includes a conductor for increasing the power of the DOWN channel transmitter to 8 watts, from its normal or 4 watts, during the transmission of a hot-line signal.

Block 975 includes checking means for checking erroneous or garbled data received thereby during any time frame of the data and angle track. In response to the detection of such erroneous or garbled data, block 975 feeds back a signal to programmer 908 over a conductor of cable 973, which cause the entire data and angle track to be repeated.

However, in the special case where a data and angle track is being made of one of two separate birds, and the two separate birds have substantially the same range and are traveling at such speeds and in such directions with respect to the ship that the range of these two separate birds with respect to the ship remains substantially the same for a plurality of time frames, a situation referred to hereinafter as a "slow-crossover," has arisen. The CAS includes special means for resolving "slow-crossover."

In particular, if block 975 finds that the data received from data bin 961 is garbled for a plurality of consecutive time frames and/or the range, range rate and angle information received by block 975 which may portend that a slow-crossover situation is about to arise, signals manifesting such information are returned over one or more conductors of cable 983 to R probe initiation logic 986, which assesses the returned information and if required applies an output signal to block 928 over conductor 987. In response thereto, instead of P or Q probes being transmitted by either the UP or DOWN channels, as the case may be, R probes are transmitted in their place. The remitter of a CAS or TMS equipped bird receiving an R probe, transmits five consecutive return signals spaced exactly at 200 microseconds intervals (at 0, 200, 400, 600 and 800 microseconds, relative to a received R probe). The P or Q characteristics of each of these five consecutive remitted return signals is preselected in accordance with an assigned sequence of the remitter transmitting the return signals. The assignment of the sequence to any CAS or TMS aircraft is made in a manner so that any one of the 32 different possible sequences has an equal probability of being assigned to any given aircraft. (One way of doing this is to do it in accordance with the values of the five trailing characters of the serial number of that aircraft.)

From the foregoing, it will be seen that the chances that the two unresolved birds will have exactly the same sequences is only one chance in 32. R probe receive block 988, which has an input applied thereto over conductor 989 and an output applied to block 928 over cable 990, applies the five consecutive remitting return signals in response to receipt of an R probe.

The output of block 986 applied to conductor 987 is also applied as an input to tracker 955 to indicate that the ship is operating in its R probe mode. Tracker 955 includes an R probe return analyzer. The signal output of each of five P accumulators is compared with the corresponding output of five Q accumulators to determine which, if any, corresponding pairs of return signals coincident P and Q produce outputs. The lowest ordinal group of the five which produces such a coincident output is employed for tracking one or the other of the two otherwise unresolved birds. This is accomplished by offsetting the occurrence of data gate applied to data bin 961 by 0,200, 400, 600, or 800 microseconds, as is required in any given case and utilizes either P or Q returns, but not both, to track one of the two otherwise unresolved birds.

The details of some of the blocks shown in FIGS. 9A and 9B will now be discussed.

PROGRAMMER 908

Figure 11:
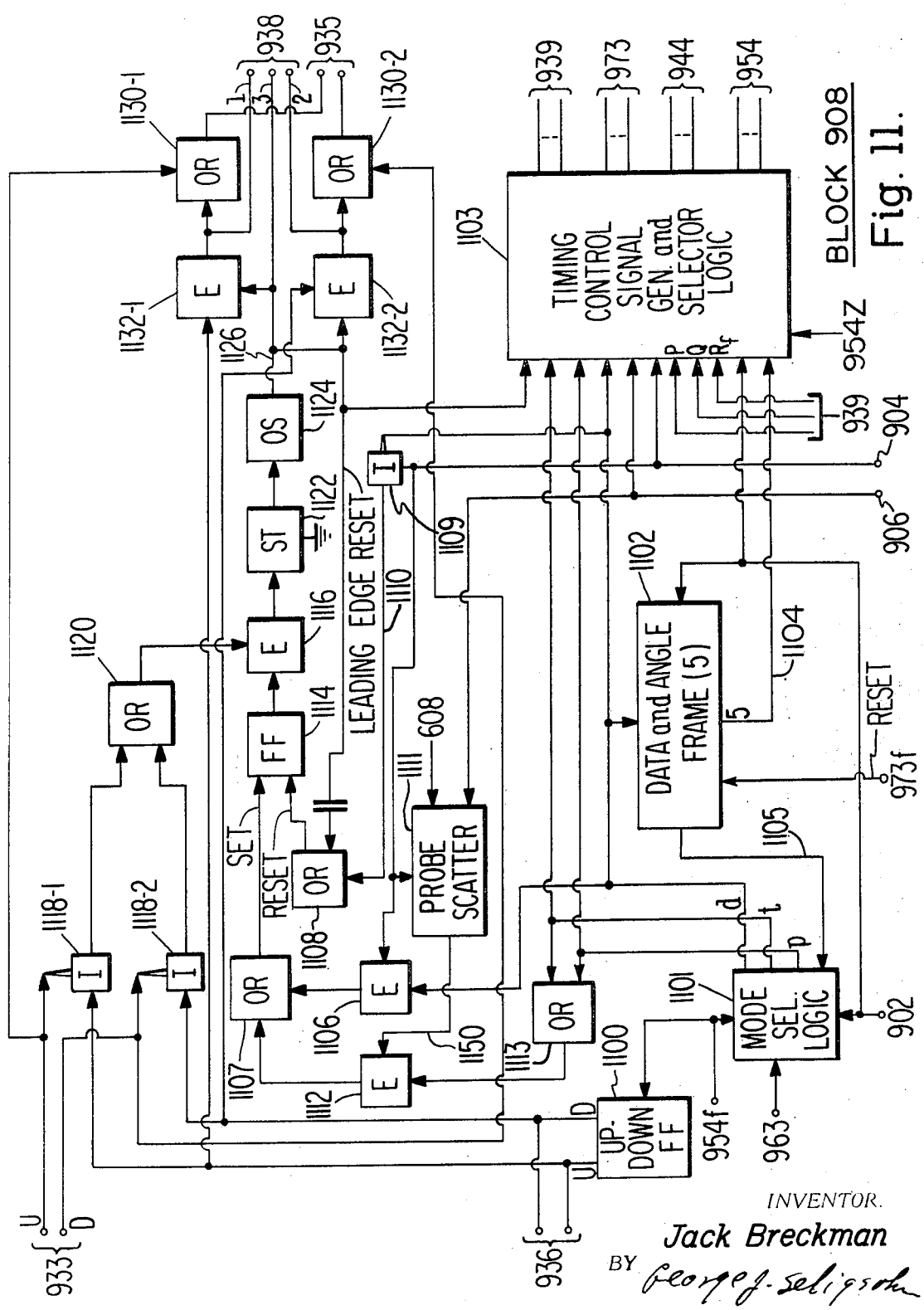
FIG. 11 is a block diagram of block 908 of FIG. 9A.

FIG. 11 shows an embodiment of Programmer 908.

At the end of each run, target detection and designation block 952 feeds back an end of run signal on conductor 954f. This signal is applied as an input to both UP-DOWN flip-flop 1100 and as a first input to mode selecting logic 1101. If flip-flop 1100 is originally in its UP stable condition, it is switched to its DOWN stable condition in response to a signal on conductor 954f, and vice versa. In this manner, UP or DOWN control signals are applied to the respective conductors U and D of cable 936.

The application of the control signal from conductor 954f to mode selecting logic 1101, causes mode selecting logic 1101 to be switched to its priming mode, resulting in an output being applied to conductor $p$. 10Hz, time-frame clock spikes are applied as a second input to mode selecting logic 1101 over conductor 902. Mode selecting logic 1101 remains in its primary mode for one time frame. At the end of this priming frame the application to block 1101 of a time-frame clock spike causes block 1101 to switch to its tau-track mode.

In its tau-track mode, mode selecting logic 1101 applies an output to conductor $t$ thereof. Mode selecting logic 1101 then remains in its tau-track mode until a signal, applied as a third input thereto, is returned over conductor 963 from block 964, indicating that a tau of less than a predetermined value, such as 60 seconds, has been computed. In response to the application of such a signal over conductor 963 to mode selecting logic 1101, mode selecting logic 1101 is switched from its tau-track mode to its data and angle tracking mode, causing block 1101 to apply an output to conductor $d$ thereof.

The presence of a signal on conductor $d$, which is applied as a first input to data and angle frame counter 1102, enables normally disabled counter 1102, which has a count capacity of five. When enabled, counter 1102 is responsive to successive time-frame signals applied as a second input thereto over conductor 902, During the occurrence of the fifth consecutive time frame of a data and angle track a first output signal is applied by counter 1102 as an individual input to timing control signal generating and selector logic 1103 over conductor 1104. After a short time delay (in the order of 1 or 2 milliseconds) following the end of the fifth consecutive time frame, block 1102 normally applies a second output over conductor 1105 as a third input to mode selecting logic 1101. In response to a signal applied to block 1101 over conductor 1105, mode selecting logic 1101 switches back from its data and angle track mode to its tau-track mode, causing block 1101 to again apply an output to conductor $t$. However, if during the occurrence of the short time delay between the end of the fifth consecutive time frame and the time that an output signal is normally applied to conductor 1105, a reset signal should be present on conductor 973f, counter 1102 is reset to count another five consecutive time-frame data and angle track, and, in this case, the signal on conductor 1105 does not occur at the end of the first occurring data and angle track. (A reset signal is applied to conductor 973f by data storage, processing and decision means 975, when it is first found that the data code readout from data bin 961 at the end of a data and angle track is garbled or, as will be explained in detail later, as part of the R-probe mode operation of the CAS.) The presence of a feedback signal on reset conductor 973f will result in a special (not normal) situation where two successive data and angle tracks, each of five consecutive frames, take place in a row, without any intervening tau-track. Signals present on any of conductors $p$, $t$ and $d$ are respectively applied as individual inputs to block 1103.

Programmer 908 also includes two alternative means for generating a probe control signal. A first of these means is substantially identical to the probe-control signal-generating means of FIG. 5, which generates a probe-control signal at the first moment after the beginning of any time slot of an UP run during which the UP channel is not engaged in transmitting a return signal in response to a received probe signal, or at the first moment after the beginning of any time slot of a DOWN run in which the DOWN channel is not engaged in transmitting a return signal in response to a received probe signal. Therefore, each of elements 1114, 1116, 1118-1, 1118-2, 1120, 1122, 1124, 1126, 1130-1, 1130-2, 1132-1 and 1132-2 of FIG. 11 correspond in structure and function with elements 514, 516, 518-1, 518-2, 520, 522, 524, 526, 530-1, 530-2, 532-1 and 532-2, respectively. Schmitt trigger 1122 may often be omitted, as described above in connection with FIG. 5.)

This first means for generating a probe control signal is effective only during the occurrence of a data and angle track. In particular, 1 KHz clock spikes are applied every millisecond over conductor 904 as a first input to AND gate 1106. However, these clock spikes are forwarded through OR gate 1107 to the set input of flip-flop 1114 only during the occurrence of a data and angle track, when a control signal on conductor d, applied as a second input to AND gate 1106, is effective in enabling gate 1106. The leading edge of the probe-control signal present on conductor 1126 is applied through OR gate 1108 to reset flip-flop 1114. (Inhibit gate 1109, which is disabled during the progress of a data and angle track, prevents 1 KHz clock spikes present on conductor 904 from being applied as an input to OR gate 1108 over conductor 904, gate 1109 and conductor 1110 during the progress of a data and angle track, when normally enabled gate 1109 is disabled).

During either a priming frame mode or tau-track mode of operation of the CAS, a probe-control signal may occur at any time between the beginning and end of a time slot with substantially equal probability. The only constraints are that no more than one probe control signal may be generated during any time slot and that the minimum time interval between two successive probe control signals is greater than the time corresponding to the maximum range to be searched (172 microseconds). In particular, probe scatter 1111 has randomly-occurring Poisson spikes present on conductor 608 of P-Q domain generator 937 (details of which are shown in FIG. 6) applied as a first input thereto. In addition, 1 KHz and 1 MHz clock spikes, present on conductors 904 and 906, respectively, are applied as inputs to probe scatter 1111. The details of probe scatter 1111 are discussed in connection with FIG. 12.

However, the randomly occurring output signal therefrom is applied as a signal input to AND gate 1112. During either a priming frame mode or a tau-track mode of the CAS, AND gate 1112 is enabled in response to the signal present on either conductors *p* or *t*, which is forwarded as an enabling input to AND gate 1112 through OR gate 1113. In response to the enabling of AND gate 1112, any output of probe scatter is forwarded through AND gate 1112 and OR gate 1107 to the set input of flip-flop 1114. If, after the setting of flip-flop 1114 during any time slot, a probe-control signal is generated on conductor 1126 before the end of that time slot, flip-flop 1114 will be reset by the leading edge of the generated probe signal applied thereto through OR gate 1108. However, if during any time slot in which flip-flop 1114 is set, no probe control signal has been generated by the end of that time slot, the occurrence of the next clock spike on conductor 904 at the end of that time slot will be forwarded through OR gate 1108 to reset flip flop 1114.

Any probe-control signal present on conductor 1126 is applied as an individual input to block 1103. Further, as discussed earlier, conductors *p*, *t*, *d* and 1104, respectively, are coupled as individual inputs to block 1103. In addition, the P and Q domain marking conductors from block 937 and an R-probe mode feedback control signal 939f from block 955 are applied as respective individual inputs to block 1103. Also, clock conductors 902, 904 and 906, respectively, are coupled as individual inputs to block 1103.

Timing-control, signal generating and selector logic 1103 performs the following functions:

First, block 1103 controls the forwarding of individual ones of its applied input signals to one or more selected output conductors of any of cables 939, 944, 954 and/or 973. This forwarding, in any given case, may be during only a single selected mode of operation of the CAS, during more than one, but not all, of the modes of operation of the CAS, or during all the modes of operation of the CAS. Secondly, in addition to selectively forwarding input signals to the outputs signals, as explained above, block 1103 includes means for generating such signals as the STC threshold employed by defruiting correlation detector 945 and means for forwarding these generated signals to the proper output conductors of cables 939, 944, 954 and/or 973.

For example, normally the P and Q domain marking conductors, applied as inputs to block 1103 from P-Q domain generator 937, are merely forwarded through to corresponding pairs of P and Q output conductors from block 1103 belonging to cable 939. In particular, in response to a positive polarity being present on input conductor 954Z, indicative of direct returns being received from a tracked bird, the P and Q domain input conductors from generator 937 are directly connected to the respective P and Q domain output conductors of cable 939 coupled to each of blocks 942, 945, 955, and 961. In response to a negative polarity being present on input conductor 954Z, indicative of inverse returns being present received from a tracked bird, the P and Q domain input conductors from generator 937 are connected in reversed order to the respective Q and P output conductors of cable 939 coupled to each of blocks 942, 955 and 961, but still directly to the P and Q output conductors of cable 939 coupled to block 945. However, in the special case when the CAS is operating in its R-probe mode, so that a feedback signal is applied over input conductor 939 f to block 1103, the input P and Q conductors are decoupled from the output P and Q conductors of cable 939 and, instead, a predetermined P or Q domain marking signal is applied to the appropriate one of the P or Q output conductors, respectively, of cable 939. In particular, during an R-probe mode, a P domain marking signal is applied to the P output conductors of cable 939 during each of the five consecutive frames of one of two successive data and angle track, and a Q domain marking signal is applied to the Q output conductors of cable 939 during each of the five consecutive frames of the other of the two successive data and angle tracks. (During an R-probe mode, data storage, processing and decision means 975 will feed back a reset signal over conductor 973f at the end of the fifth time frame of the first of the two successive data and angle tracks, to thereby prevent an input signal from being applied over conductor 1105 to mode selecting logic 1101, as previously described.) In this manner, two slow-crossover detected target aircrafts ( the occurrence of which initiated the R probe track) are each data and angle tracked in sequence.

PROBE SCATTER 1111

Referring now to FIG. 12, probe scatter 1111 of FIG. 11 comprises 1,000 bit counter 1200, which is reset at the end of every time slot by a clock spike applied thereto over conductor 904, and which divides each time slot into 1,000 count periods in response to a 1 MHz clock spike counting input applied thereto over conductor 906. Ten respective output conductors, 1201-1 . . . 1201-10 are coupled to counting stages 5, 104, 203 . . . 896 (where there is a difference of 99 stages between two successive output conductors). Associated with each output conductor is a flip-flop 1202-1 . . . 1202-10. Each output conductor 1201-1 . . . 1201-10 is connected, as shown, to set its corresponding flip-flop and to reset its immediately preceding flip-flop. Conductor 1201-11, connected to output stage 995 of counter 1200, resets flip-flop 1202-10.

From the foregoing, it will be seen that each of the respective flip-flops 1202-1 to 1202-9 remains in its set condition for a successive 99 microsecond interval of each 1,000 microsecond time slot period, while flip-flop 1202-10 remains in its set condition for a period of 9 microseconds, which immediately follows the resetting of the preceding flip-flop 1202-9 (not shown).

The output of each of flip-flops 1202-1 ... 1202-10 is applied as an enabling input to a corresponding one of AND gates 1203-1 ... 1203-10. It will, therefore, be seen that during the 990 microsecond period of each 1,000 microsecond time slot, which extends from the 5-995 microsecond counts of that time slot, one and only one of AND gates 1203-1 ...1203-10 will be enabled. During the 10 microsecond time period extending from the 995 microsecond count of a preceding time slot to the 5 microsecond count of the next succeeding time slot, none of AND gates 1203-1 ... 1203-10 will be enabled.

Randomly occurring Poisson spikes on conductor 608 are applied as a signal input to all of AND gates 1203-1 ... 1203-10. The output of each of these AND gates is applied to a corresponding one of flip-flops 1204-1 ... 1204-10. Each of these latter flip-flops is switched back and fourth between its stable states by successive Poisson spikes applied thereto through its corresponding input AND gate, when that AND gate is open. Thus, as each successive input AND gate 1203-1 ... 1203-10 is again closed, its corresponding flip-flop will be left in one or the other of its two bistable states, the particular one of which has been randomly chosen by the number of randomly occurring Poisson spikes applied thereto while its corresponding input AND gate was open.

The outputs of flip-flops 1204-1 ... 1204-10 are applied as signal inputs to corresponding ones of output AND gates 1205-1 ... 1205-10. During count period 999 (which last 1 microsecond) of a time slot (when all of input AND gates 1203-1 ... 1203-10 are disabled and flip flops 1204-1 ... 1204-10 have some arbitrary ten bit binary code stored therein) output AND gates 1205-1 ... 1205-10 are simultaneously opened. In response thereto, the binary value stored in each respective one of flip-flops 1204-1 ... 1204-10 is transferred to a corresponding stage of 10-stage randomly set binary counter 1206. Since counter 1206 has 10 stages, it has a count capacity of 1,024.

Pulse generator 1207 generates pulses at a repetition rate of 1.035 MHz, which makes it possible to readout a counter having a count capacity of 1,024 in a period of 1 millisecond, the length of a time slot. Pulses from generator 1207 are applied as a signal input to AND gate 1208, which is enabled in response to flip-flop 1209 being set in a manner to be described below. (For the moment, it will be assumed that flip-flop 1209 has been set.) Therefore, 1.035 MHz pulses from pulse generator 1207 are applied through AND gate 1208 as serial inputs to randomly set counter 1206. As soon as counter 1206 reaches a predetermined count, an output will be applied thereby through OR gate 1210 to probe scatter output conductor 1150. The minimum time for counter 1206 to achieve this predetermined count is zero, since counter 1206 may have been randomly set to the predetermined count. On the other hand, the maximum time for counter 1206 to reach this predetermined count, (unless flip-flop 1209 has been reset before the predetermined count is achieved,) is 1 millisecond, the cycle time of counter 1206.

The application of an output signal on probe scatter output 1150 has the following internal effects on the probe scatter itself. First, it immediately resets flip-flop 1211. Second, after a short delay (a small fraction of a microsecond which is just longer than a clock spike), provided by delay capacitance 1212 a signal is applied to conductor 1213, which is effective in resetting flip-flop 1209, resetting binary counter 1214 and resetting flip-flop 1215.

The resetting of flip-flop 1209 disables AND gate 1208 and prevents any further counting by counter 1206 until flip-flop 1209 is again set.

The resetting of flip-flop 1211, in response to the undelayed output signal on conductor 1150, disables AND gate 1216, thereby preventing binary counter 1214 from further counting 1 MHz clock spikes applied thereto through AND gate 1216. Immediately thereafter, in response to the delayed signal on conductor 1213, binary counter 1214 is reset to zero. This condition remains until the beginning of the next time slot, when flip-flop 1211 is again set by a clock spike on conductor 904. Thus, binary counter 1214 begins to count microsecond count periods at the beginning of each time slot.

Assuming that during a given time slot, counter 1206 does not produce an output on conductor 1150 within the first 818 microsecond count periods of that time slot, so that flip-flop 1211 has not been reset. In this case, binary counter 1214, upon reaching a count of 818, will set flip-flop 1215. In response to flip-flop 1215 being set, reversible binary counter 1217, which has eight stages with a count capacity of 256, will have 1 Mhz clock spikes applied to the negative input thereof thereto through now enabled AND gate 1218 AND OR gate 1219.

Assume now that counter 1206 does finally produce an output during a given time slot after a number of count periods in excess of 818, but less than 990. In this case, upon the resetting of flip flop 1215, in the manner described above, counter 1217 will be left with a negative count stored therein equal to the difference between the count period in which the output from counter 1206 occurred and 818. Based on the above assumption that the output from counter 1206 occurred prior to a count period of 990, the negative count stored in counter 1217 will be less than 172, the difference between 990 and 818. Nothing further will happen until count 999, the last count of this time slot, when counter 1200 will set flip-flop 1220. Therefore, AND gate 1221 again will be enabled when the first count period of the next following time slot occurs, so that 1 MHz clock spikes will be applied to the positive input of reversible counter 1217. Since, in accordance with the above assumption, counter 1217 has stored therein some negative count below 172, at the end of some certain time interval which occurs prior to the occurrence of the 172 count period of this next following time slot, counter 1217 will produce an output on conductor 1222, which is applied as a set input to flip-flop 1209. Therefore, AND gate 1208 is again enabled and counter 1206 again proceeds to count to the predetermined number at which an output is produced. However, in the mean time, during counter period 999 of the previous time slot, a new 10-bit arbitrary binary code has been transferred to counter 1206, in the manner previously described.

Even if reversible binary counter 1217 produces an output on conductor 1222 prior to counter period 171, the maximum possible negative count stored in counter 1217 under the assumed conditions, counter 1217 continues to count in the positive direction even after an output is produced on conductor 1222 until count period 171 is reached. In response thereto, flip-flop 1220 is reset, AND gate 1221 is disabled and counter 1217 stops counting. However, immediately thereafter, during count period 172, reversible binary counter 1217 is reset by a signal applied thereto over conductor 1223. During count period 172, while a signal is present on conductor 1223, counter 1217 inhibits any signal from being applied to output conductor 1222 in response to counter 1217 reaching its reset condition. During the very next count period (173), a signal is applied from counter 1200 through conductor 1224 and OR gate 1219 as a signal negative input to counter 1217, to thereby offset the count of counter 1217 by one count in the negative direction.

If it now assumed that counter 1206 applies an output to conductor 1150 prior to count 818 of the time slot, so that binary counter 1214 is reset before it reaches count 818, reversible binary counter 1217 remains with −1 registered therein until after flip-flop 1220 is again set at count 999 of the time then taking place causing a +1 count to be applied to the positive input of reversible counter 1217 through AND gate 1221 during the first count of the next successive time slot. This results in reversible counter 1217 applying an output to conductor 1222, which sets flip-flop 1209, in the manner previously described.

Should randomly set counter 1206 fail to provide an output on conductor 1150 by count period 990 of any given time slot, binary counter 1214 will apply an output signal to output conductor 1150 through conductor 1225 and OR gate 1210. Therefore, under all conditions, a single output will be obtained from probe scatter 1111 over conductor 1150 sometime during the first 990 count periods of any given time slot.

The reason for choosing count period 990 for forcing an output from probe scatter 1111, if one has not as yet been achieved in response to counter 1206 reaching its predetermined value, is to provide a minimum time of 10 microseconds to accommodate any delay, due to the transmission of return signals between the occurrence of an output on conductor 1150 and the latest time in a time slot the generation of a probe control signal (applied to conductor 1126 of FIG. 11) can take place. Thus, except for the very rare situation in which the CAS is continuously engaged in transmitting return signals for the entire final 10 count periods of a time slot, a probe control signal must be generated once and only once during each time slot, under the control of probe scatter 1111. However, the time of occurrence of a probe control signal within each successive time slot is randomly distributed.

The purpose of this random distribution provided by probe scatter 1111, which, as discussed above in connection with FIG. 11, is employed in both the priming frame mode and in the tau-track mode, is that it randomly distributes the already range-limited received fruit signals applied to the range cells of the search file over the entire group of 172 range cells. This homogenization of the fruit applied to the range cells of search file is particularly effective because, due to the applied STC threshold, it increases the signal-to-noise ratio of the nearby range cells at the expense of the more distant range cells. Since the nearby range cells are much more important from the point of view of avoiding midair collisions than are the more distant range cells, the use of probe scatter 1111 in the CAS provides a great advantage.

The probe scatter is not employed during the time frames of a data and angle track because of the overriding importance of interrogating birds and transmitting hot-line data signals at fixed millisecond intervals in order to minimize the change that one or more data bits of responding birds will be twice interrogated or one or more data bits will be missed altogether (which would cause the received code to contain more or less than the correct 100 data bits) and to maintain relative synchronization between any ship and the hot-line receiving apparatus on the ground.

UP AND DOWN CHANNELS 912

Referring now to FIG. 13, UP and DOWN channels 912 is composed of UP portion 1300, DOWN portion 1301 and common portion 1302. Each of UP and DOWN portions 1300 and 1301, respectively, are substantially identical. Therefore, the details of only UP portion 1300 are shown.

In particular, antenna 910–1A is coupled through T-R switch 1303. Switch 1303 is switched from its normal receive state to its transmit state in response to a signal applied thereto over the UPPER conductor of cable 934. At the same time that T-R switch 1303 is being switched to its transmit state, the carrier frequency to be transmitted is applied to the input of the transmitter of receiver and transmitter 1304 over the UPPER conductor of cable 935, and the output of this transmitter is applied as a transmitting input to T-R switch 1303 over conductor 1305.

Any signal received by antenna 910–1a is applied through T-R switch 1303 and conductor 1306 as an input to block 1304. Further, since depending upon the altitude of the ship, either the high-band or low-band of frequencies, shown in FIG. 1, is utilized, an altitude manifesting control signal is applied to both block 1304 and B and C receiver 1307 over conductor 918 to properly switch the local oscillator frequencies in a manner such that the resulting IF frequency band is the same, regardless of whether the high-band or low-band of carrier frequencies is being employed. The signal on conductor 918 also switches the power from 2 watts for the low band to 4 watts for the high band, as indicated in FIG. 1.

The output of antenna 910–1B is applied as an input to AND gate 13081B and the output of antenna 910–1C is applied as an input to AND gate 1308–1C. AND gates 1308–1B and 1308–1C are, respectively, enabled during alternate time slots in response to control signals applied thereto over the B and C conductors, respectively, of cable 916. The output of either of AND gates 1308–1B or 1308–1C, as the case may be at any given time, is applied as an input to receiver 1307 over conductor 1309.

A band of IF frequencies obtained at the output of A receiver 1304 is applied as inputs to respective P, Q and R filters and envelope detectors 1310, 1311 and 1312, respectively, over conductor 1313. The outputs of P filter and envelope detector 1310 and Q filter and envelope detector 1311 are applied, respectively, to separate conductors of cable 920. The output conductor of R filter and envelope detector 1312 is applied to one of the conductors of cable 989.

The band of IF frequencies on conductor 1313 is also applied as a signal input to AND gate 1314. In a similar manner, the IF output of receiver 1307 is applied as a signal input to AND gate 1315 over conductor 1316.

AND gates 1314 and 1315 are enabled during each UP run by a signal on conductor 936–U.

DOWN portion 1301 is identical to UP portion 1300 except for two minor differences. First, the AND gates of DOWN portion 1301 corresponding to AND gates 1314 and 1315 are enabled during each DOWN run by a signal present on conductor 936–D. Second, since only the DOWN portion is employed for transmitting hot-line information, and, as shown in FIG. 1, during hot-line transmissions, the transmitter operates at 8 watts, rather than its usual 2 or 4 watts, it is necessary to apply a control signal to the transmitter of only the DOWN portion during the transmission of hot-line signals to cause the DOWN portion transmitter to increase its power to 8 watts from its usual 2 or 4 watts. Such a control signal is applied to the transmitter of DOWN portion 1301 over the center conductor of cable 934.

The frequencies selected for both the high band and the low band of the local oscillator of both the B and C receiver and the A receiver of DOWN portion 1301 are chosen so that the resulting IF frequencies are identical to those obtained from UP portion 1300.

The output of A channel AND gate 1314 and the output from the corresponding A channel AND gate of DOWN portion 1301 are connected in common as inputs to an A channel set of $P^+$, $P^-$, $Q^+$, and $Q^-$ return signal filters, forming part of common portion 1302. The respective outputs of these four filters are applied, as shown, to separate conductors of A channel cable 940. In a similar manner, the output of B and C channel AND gate 1315 and the output of the corresponding B and C channel AND gate of DOWN portion 1301 are connected in common as inputs to a B and C set of $P^+$, $P^-$, $Q^+$ and $Q^-$ return signal filters, which have their individual outputs applied, as shown, to separate conductors of B and C cable 941.

R PROBE RECEIVE 988

Referring to FIG. 14, there is shown an embodiment of R probe receive 988.

As discussed in connection with FIGS. 9A and 9B, each given aircraft is assigned in a random manner a permanent five-bit binary code of P domains and Q domains, which are employed to control the particular domain of five successive return signals, space 200 microseconds apart, and which are transmitted in order in response to the receipt of an R probe by either the UP channel or the DOWN channel.

For illustrative purposes, it is assumed that the sequence of the five R probe return signals assigned to a given aircraft is PPQPQ, as shown in FIG. 14.

R probe receive 988 consists of UP portion 1400 and DOWN portion 1401 which are identical to each other. Therefore, only UP portion 1400 is shown in detail.

In particular, UP portion 1400 consists of 800 bit shift register 1402, which is continuously driven by 1 MHz clock spikes applied thereto over conductor 906. Any IF frequency passed by R probe filter and envelope detector 1312 of FIG. 13, discussed above, is detected and applied over the UPPER conductor of cable 989 as an input to shift register 1402 and is also applied as an input to $P_U$ OR gate 1404, since the first term of the assigned return code is a P. Similarly, since the second and fourth terms of the assigned return code sequency are also P, and the third and fifth terms of the return code sequency are Q, the respective outputs of stages 200 and 600 of shift register 1402 are also connected as inputs to OR gate 1404, while the output of stages 400 and 800 of shift register 1402 are coupled as respective inputs to $Q_U$ OR gate 1405. The outputs of OR gates 1404 and 1405 and the outputs of the corresponding OR gates of DOWN portion 1401 are applied as separate conductors of cable 990, as shown. Obviously, if the code assigned to a craft were other than PPQPQ, the connections to OR gates 1404 and 1405 would be appropriately changed.

CARRIER FREQUENCY GENERATOR AND SELECTOR 928

The embodiment of FIG. 15 includes all of the thirty carrier-frequency generators discussed in connection with FIG. 1. Although, in FIG. 15 (as well as in FIG. 4 discussed above) these carrier frequency generators are shown as separate sources, in practice they may be obtained from a single frequency synthesizer.

The 30 carrier frequency generators include four sets each consisting of seven separate frequency sources plus an additional set consisting of two frequency sources. The first of the four sets is employed for transmitting low band, UP field signals; the second set is employed for transmitting low band DOWN field signals; the third set is employed for transmitting high band UP field signals and the fourth set is employed for transmitting high band DOWN field signals. Each set includes seven signals manifesting respectively an R probe, a P probe, a Q probe, a $P^+$ return signal, a $P^-$ return signal, a $Q^+$ return signal and a $Q^-$ return signal. The additional set of two frequency sources is employed for transmitting M and N hot-line signals manifesting, respectively, binary "1" data bits and binary "0" data bits.

Since at any time only one set of UP field carrier frequency generators and one set of DOWN field carrier frequency generators are employed, band switch 1500, which is controlled in accordance with altitude information applied thereto over conductor 918, selects the appropriate two out of the four possible sets of signals to be applied to frequency selector gates 1501. Frequency selector gates 1501 is essentially identical to the frequency selector gates of FIG. 4, including both the UP field and the DOWN field gates identified in FIG. 4 with the reference numeral 424, 426, 428, 430, 432, 434, 436, 438, 448, 450, 452, and 454, respectively.

Further, received probe threshold 1502 is substantially identical to the received probe threshold portion of FIG. 4 which includes elements of both the UP and DOWN fields identified with the reference numerals 404, 406, 408, 410, 412, 414, 416, 418, 420, and 422, respectively.

Data bit control conductor 932 of FIG. 15 corresponds with data bit control conductor 226 of FIG. 4; the output conductors of cable 933 eminating from block 1502 correspond with the conductors 232 of FIG. 4; the conductors of cable 934 emanating from block 1501 of FIG. 15 correspond with output conductors 230 of FIG. 4; the four conductors of cable 1503 of FIG. 15 correspond with the output conductors of one-shot multivibrators 418–1, 418–2, 420–1 and 420–2, respectively, and the outputs of inhibit gates 1504–1 and 1504–2 of FIG. 15 correspond with the outputs of inhibit gates 402–1 and 402–2 of FIG. 4. The respective conductors of cable 990 from R probe receive block 988 are connected to the corresponding conductors of cable 1503. In addition, the positive and negative inputs applied to each of summers 1505–1 and 1505–2 of FIG. 15 over cable 926 correspond with the positive and negative signals applied to each of summers 400–1 and 400–2 of FIG. 4 over conductors 212–1, 214–1, 212–2 and 214–2.

In addition to the frequency selecting gates corresponding to those of FIG. 4, as discussed above, frequency selector gates 1501 of FIG. 15 further includes another pair of gates, interconnected in the manner of gates 424–2 and 432–2 of FIG. 4, associated with the M carrier-frequency generator for transmitting over the DOWN channel a hot-line signal manifesting a binary "1" data bit, in response to a hot-line control signal being applied thereto. In a similar manner, frequency selector gates 1501 further includes a pair of gates interconnected in the manner of gates 426–2 and 434–2 of FIG. 4 associated with the N carrier frequency generator for transmitting over the DOWN channel a hot-line signal manifesting a "0" data bit in response to a hot-line control signal being applied as an input thereto. This hot-line control signal, which is applied as an input to the gates associated with the M carrier frequency source and the N carrier frequency source, respectively, is present on conductor 1506, and is derived in a manner to be described below.

Frequency selector gates 1501 further includes a first pair of gates corresponding with gates 448–1 and 462–1 associated with an UP field R probe, for transmitting an UP field R probe (rather than an UP field P or Q probe) when the CAS system is operated in its R mode during an UP run. An input signal to the UP field R mode gate is applied to frequency selector gates 1501 over conductor 1507–1. In a similar manner, frequency selector gates 1501 further includes a pair of DOWN field R probe gates, similar to gates 450–2 and 452–2 of FIG. 4, which are associated with a DOWN field R frequency generators of FIG. 15. These DOWN field R probe gates have an input signal applied thereto over conductor 1507–2 in response to the CAS operating in its R mode during a DOWN run.

UP inhibit gate 1504–1 is inhibited from forwarding return signals during the occurrence of each probe control signal of an UP run, which is applied thereto over a first conductor of cable 938, in a manner identical to the inhibiting of gate 402–1, by a probe control signal applied thereto over conductor 238–1 during an UP field scan in FIG. 4. DOWN inhibit gate 1504–2 is inhibited during the occurrence of a probe control signal during a DOWN run by the probe control signal present on a second conductor of cable 938, which is applied to the inhibiting input of gate 1504–2 through OR gate 1508. The inhibiting of DOWN inhibiting gate 1504–2 in response to the occurrence of a probe control signal during a DOWN run is identical to the inhibiting gate 404–2 of FIG. 4 in response to the occurrence of a probe control signal on conductor 238–2 during a DOWN field.

Normally, P and Q domain marking signals, corresponding with the signals on conductors 242 and 244, respectively, of FIG. 4, are applied through the appropriate gates of block 1501 from separate P and Q conductors of cable 939, through normally enabled inhibit gate 1508–P and conductor 1509–P, and normally enabled inhibit gate 1508–Q and conductor 1509–Q, respectively.

Further included in block 928 is a 10-stage shift register 1510, which, during both UP and DOWN runs has each probe control signal (obtained from conductor 1126 of FIG. 11) applied as an input thereto over a third conductor of cable 938. Shift register 1510 is shifted every microsecond in response to 1 MHz clock spikes applied thereto over conductor 906. The ninth and tenth stages of 10-stage shift register 1510 are applied as separate inputs to OR gate 1508. Therefore, inhibit gate 1504–2 is disabled during the ninth and tenth count periods following the occurrence of a probe control signal, as well as during the occurrence of a probe control signal, as described above. The disabling of inhibit gate 1504–2 during the ninth and tenth count periods following the occurrence of a probe control signal insures that during the tenth count period following the occurrence of a probe control signal, when a bit of a hot-line message may be transmitted, the DOWN channel is not engaged in processing a return signal to be transmitted in response to a received probe signal. Thus, transmission of hot-line information has the highest priority.

Hot-line control conductor 983 is connected as a signal input to AND gate 1511, which is enabled during the tenth count period of shift register 1510. Therefore, if a signal is present on hot-line conductor 983, a one microsecond hot-line control pulse will be forwarded by AND gate 1511 to conductor 1506 during the tenth microsecond following the occurrence of each probe control signal. The hot-line control signal present on conductor 1506 is applied, as previously described, to frequency selector gate 1501 to cause the transmission of either hot-line carrier-frequency M or hot-line carrier-frequency N, in accordance with the binary value of the data bit of the data code to be transmitted during that time slot. In addition, the hot-line control signal present on conductor 1506 is applied through cable 934 to block 912, where, as previously described in connection with FIG. 13, it is employed for switching the power of the DOWN portion transmitter from its normal 2 or 4 watts to 8 watts, during the transmission of a hot-line data bit.

When the CAS is operated in its R mode, under the control of R probe initiating logic 986, an R probe mode control signal is applied to block 928 over conductor 987. In response thereto, inhibit gates 1508–P and 1508–Q are both disabled, so that no P or Q domain marking signal is present on either conductors 1509–P or 1509–Q applied as inputs to frequency selector gates 1501. This prevents the transmission of either a P or Q probe signal during either the UP or DOWN runs in response to the occurrence of a probe control signal on conductors 1 or 2 of cable 938, in the manner previously described. However, the UP and DOWN run probe control signals on conductors 1 and 2, respectively, of cable 938 are individually applied as signal inputs to normally disabled AND gates 1512–1 and 1512–2, respectively. In response to the occurrence of an R probe control signal on conductor 987, both of AND gates 1512–1 and 1512–2 are enabled. Therefore, when enabled, AND gate 1512–1 forwards any probe control signal during an UP run to conductor 1507–1 and AND gate 1512–2 forwards any probe control signal during a DOWN run to conductor 1507–2. As previously, described, a signal present on conductor 1507–1 causes an UP field R probe to be transmitted and a signal present on conductor 1507-2 causes a DOWN field R probe to be transmitted.

DEFRUITING CORRELATION DETECTOR 945 AND SEARCH FILE 948

Figure 16:
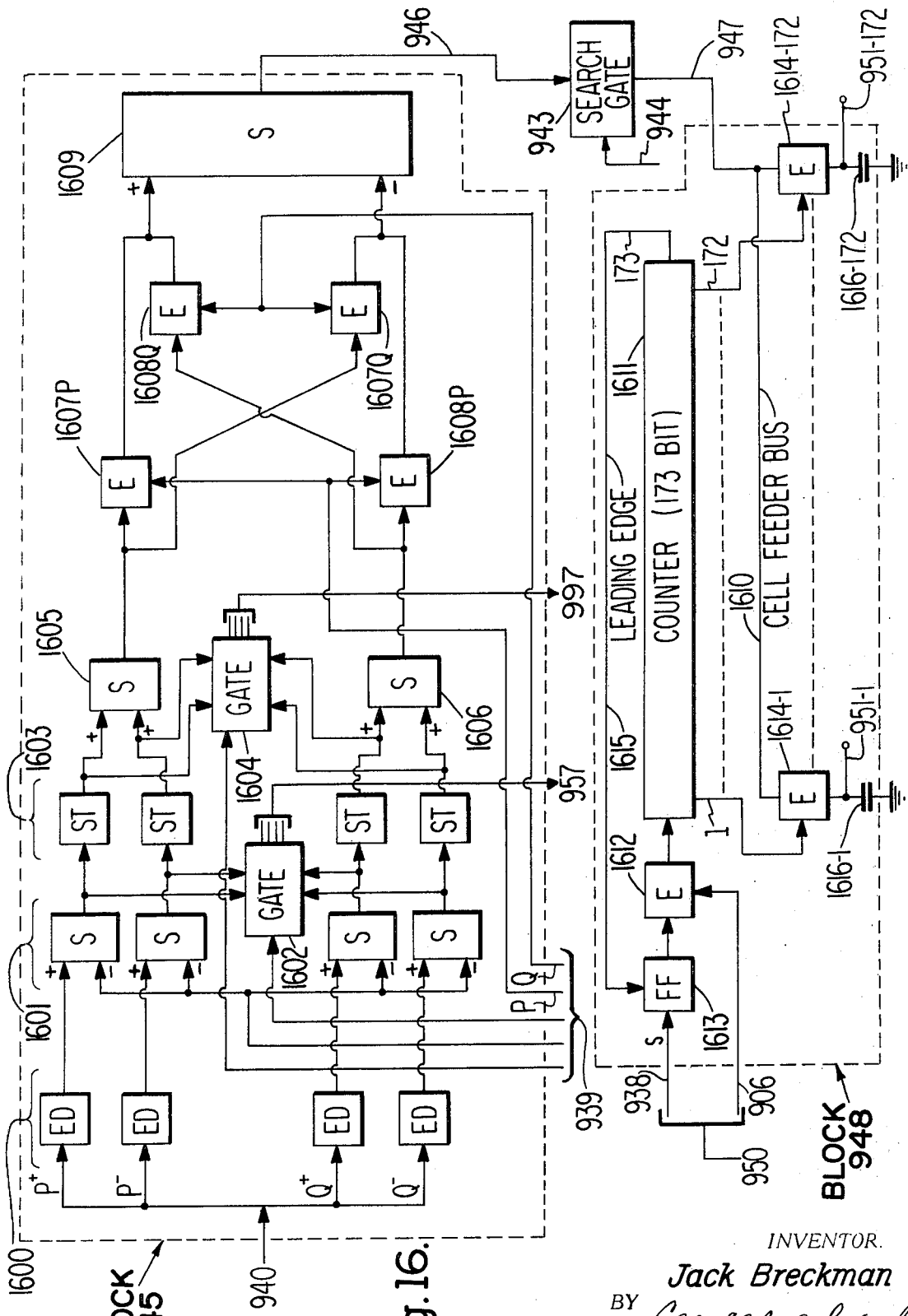
FIG. 16 is a block diagram of blocks 945 and 948 of FIG. 9B.

Referring now to FIG. 16, there is shown an embodiment of defruiting correlation detector 945 and an embodiment of search file and control 948, which are coupled to each other through conductors 946, search gate 943 and conductor 947.

Block 945 consists of a set of four individual envelope detectors 1600 for individually detecting the $P^+$, $P^-$, $Q^+$ and $Q^-$ IF return signals applied as respective individual input signals thereto. The output of each envelope detector of set 1600 is respectively applied as a positive input to a corresponding one of a set 1601 of four summers. An STC signal present on a conductor of cable 939 is applied in common to the negative inputs of the four summers of set 1601. (The STC signal varies continuously in magnitude from a maximum value at the time of occurrence of a probe control signal to a minimum value 172 microseconds thereafter. Preferably, the STC signal should not vary as a linear function of time, but should vary inversely as a square function of time since the signal strength of received hits varies inversely with the square of the distance between the ship and the remitting bird.) The STC signal provides a time-varying threshold, since each of the four summers of set 1601 produces an output only if the sum of its inputs is positive.

The respective outputs of the four summers of set 1601 are applied as inputs to gate 1602. Gate 1602 is disabled during any priming frame mode of operation of the CAS, but is enabled during either any tau-track mode or any data and angle track mode of operation of the CAS. When enabled by a signal applied over a conductor of cable 939, gate 1602 forwards the inputs supplied thereto to the four corresponding conductors of cable 957.

The respective outputs of the four summers of set 1601 are also individually applied as respective inputs to a corresponding set 1603 of four Schmitt triggers, as shown. Each of these Schmitt triggers is fired when the output of the summer applied thereto reaches a positive value of predetermined magnitude.

The respective outputs of the four Schmitt triggers of set 1603 are applied as individual inputs to gate 1604. Gate 1604 is enabled only during each data and angle track in response to a signal applied thereto over a conductor of cable 939. When enabled gate 1604 forwards the four inputs thereto to four corresponding conductors of cable 997.

The outputs of the two Schmitt triggers corresponding respectively to $P^+$ and $P^-$ return signals are applied as individual inputs to summer 1605. Respective outputs of the Schmitt triggers corresponding respectively to $Q^+$ and $Q^-$ return signals are applied as individual inputs to summer 1606.

The output of summer 1605 is applied as a signal input to AND gate 1607P and also as a signal input to AND gate 1607Q. The output of summer 1606 is applied as a signal input to AND gate 1608P and also as a signal input to AND gate 1608Q. AND gates 1607P and 1608P are enabled in response to a P domain marking signal being present on a P conductor of cable 939 and AND gates 1607Q and 1608Q are enabled in response to a Q marking signal being present on a Q conductor of cable 939. (The P and Q conductors of cable 939 applied to block 945 are obtained from the output, rather than the input, of block 1103 in FIG. 11.)

The respective outputs of AND gates 1607P and 1608Q are applied in common to the positive input of summer 1609. The respective outputs of AND gates 1607Q and 1608P are applied in common to the negative input of summer 1609. Thus, the output of summer 1609, which is applied to conductor 946, at any instant of time may have a positive or a negative polarity, depending upon whether the magnitude of the signal applied to its positive input exceeds that applied to its negative, or vice versa.

As previously described, search gate 943 is enabled during each priming frame, during each tau-track frame and during the fifth and last of the five consecutive time frames of a data and angle track. When enabled, search gate 943 forwards the signal on conductor 946 through conductor 947 to cell feeder bus 1610 of search file 948.

Counter 1611, which has a count capacity of 173 bits including a home position and 172 count positions, is operated in response to 1 MHz clock spikes applied thereto over conductor 906 when AND gate 1612 is enabled in response to the setting of flip-flop 1613. Flip-flop 1613 is set in response to each probe control signal applied thereto over a conductor of cable 938.

Thus, when enabled, counter 1611 successively enables in order each of the 172 range cell AND gates 1614-1 . . . 1614-172. In response to counter 1611 being switched from its 172 count position to its 173 count position (the latter being its home position), a reset spike is applied to flip-flop 1613 over conductor 1615. Counter 1611 then remains disabled until flip-flop 1613 is again set by the next occurring probe control signal on the aforesaid conductor of cable 938.

As each of AND gates 1614-1 . . . 1614-172 is enabled in turn, the positive or negative signal, if any, on cell feeder bus 1610 at that instant is applied to that one of storage capacitances 1616-1 . . . 1616-172 corresponding to the then enabled range cell AND gate 1614-1 . . . 1614-172. The storage capacitance of each one of the 172 range cells accumulates all the signals applied thereto during the 100 time slots forming a time frame. Thus, at the end of a time frame, the charge on the storage capacitance of any range cell is equal to the algebraic sum of all the incremental signals applied thereto during the previous 100 time slots of that time frame.

The respective outputs of storage capacitances 1616-1 . . . 1616-172 are applied to the input of target detection and designation block 952 over corresponding conductors 951-1 . . . 951-172.

TARGET DETECTION AND DESIGNATION BLOCK 952

Figure 17:
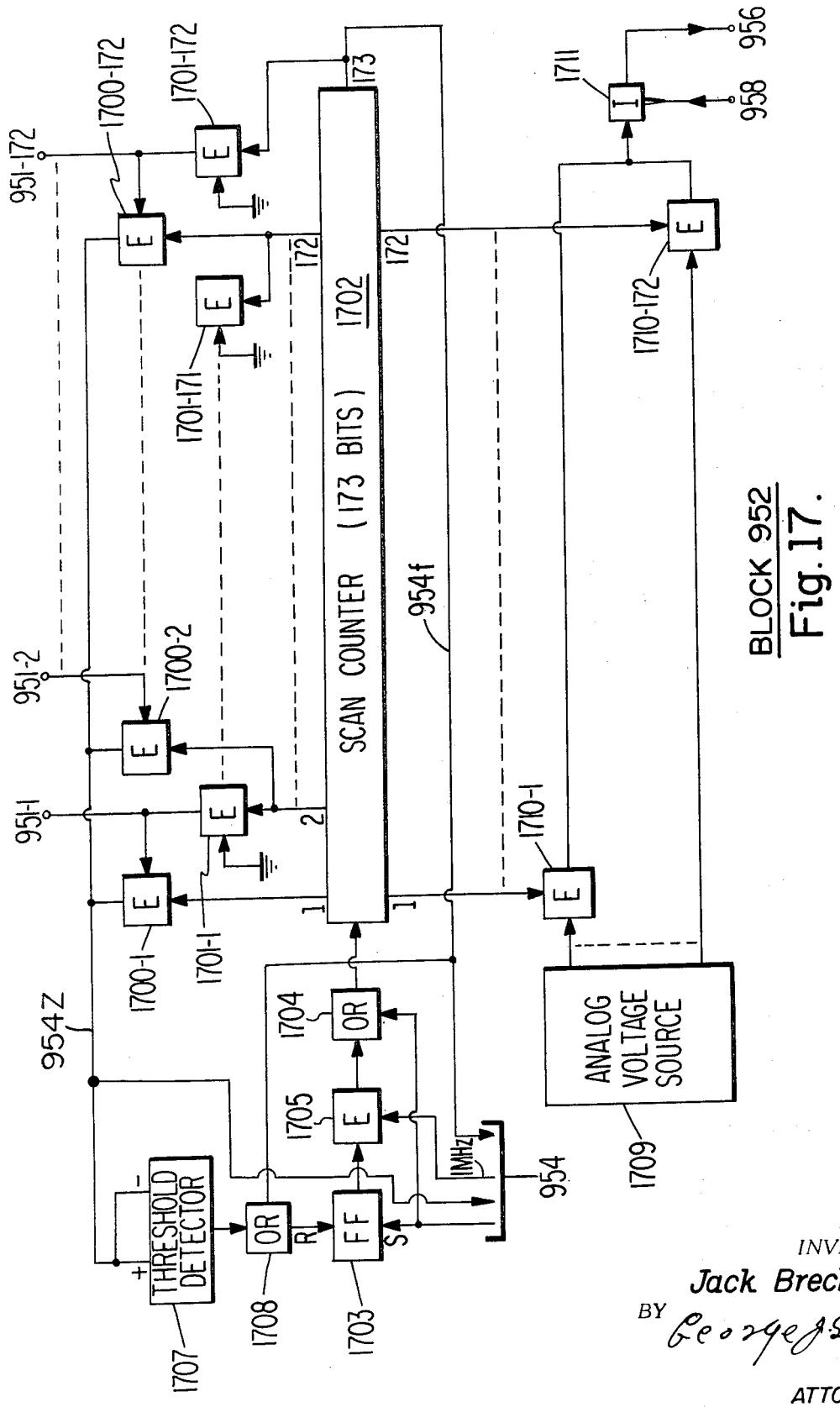
FIG. 17 is a block diagram of block 952 of FIG. 9B.

Referring now to FIG. 17, which shows an embodiment of target detection and designation block 952, each of the set of conductors 951-1 . . . 951-172 is coupled to the signal input of a corresponding one of a set of target detection AND gates 1700-1 . . . 1700-172, and is also coupled to the output of a corresponding set of dumping AND gates 1701-1 . . . 1701-172. The signal input to each of the dumping AND gates is connected to a point of reference potential.

Scan counter 1702 has a count capacity of 173 bits (172 counts corresponding to the 172 range cells and a home position at count 173).

It will be noted that a tau-track frame always succeeds a preceding frame in which the search file has been filled or refilled, since this preceding frame is either a priming time frame, the fifth of the five consecutive time frames of a data and angle track or a previous tau-track frame. Therefore, programmer 908 applies a start signal to one of the conductors of cable 954 at the initiation of each tau-track, which start signal is applied as a search input to flip-flop 1703 and as an input to scan counter 1702 through OR gate 1704. Prior to the application of this start signal, the count registered in scan counter 1702 is either the home position count of 173 (if the preceding time frame was a priming time frame) or that of the range cell corresponding to the target which has been most recently tau-tracked. In any case, in order to either begin or continue the scan without detecting the previous target, it is necessary that counter 1702 be stepped one count in response to the start signal itself. This is accomplished by applying the start signal directly to scan counter 1702 through OR gate 1704.

The setting of flip-flop 1703 by the start signal enables AND gate 1705 and permits 1 MHz clock spikes on a second conductor of cable 954 to be applied through AND gate 1705 and OR gate 1704 to the input of scan counter 1702, causing scan counter 1702 to be stepped at 1 microsecond counter intervals. The registration of any count between 1 and 172 by scan counter 1702 is effective in enabling the corresponding one of the set of target detecting gates 1700-1 ... 1700-172 and at the same time enabling the immediately preceding one of dumping gates 1701-1 ... 1701-171. (Dumping gate 1701-172 is enabled in response to scan counter 1702 registering a 173.) The effect of this is to cause the accumulated charge of the corresponding range cell applied to the enabled target detecting gate over the corresponding one of conductors 951-1 ... 951-172 to be applied to target detection bus 954Z. At the same time, the accumulated charge on the immediately preceding range cell storage capacitance, which has already been scanned by target detection bus 954Z, is dumped by the enabled one of dumping gate 1701-1 ... 1701-172.

At any instant of time, the voltage on target detection bus 954Z may vary from some maximum negative value through zero to some maximum positive value. A positive value exceeding a predetermined threshold is an indication of hits from a detected bird which is transmitting direct return signals. Similarly, a negative signal on conductor 954Z exceeding a predetermined threshold is an indication of hits from a detected bird transmitting inverted returns. (As discussed in connection with FIG. 11, the signal on conductor 954Z is fed back to timing control signal generator and selector logic 1103 to effect either a direct or a reverse connection between the input P and Q domain conductors and the output P and Q domain conductors of cable 939 coupled to each of blocks 942, 955 and 961 in accordance with the zone-indicating positive or negative polarity of the signal on conductor 954Z.) If the absolute magnitude of the signal on target detection bus 954Z is below the absolute value of the predetermined positive and negative thresholds, the signal is rejected as constituting either fruit or other noise. Therefore, conductor 954Z is applied to both the positive and negative inputs of threshold detector 1707, which produces an output therefrom only in response to the absolute value of the signal on conductor 954Z exceeding a predetermined absolute threshold level.

The output from threshold detector 1707 is applied through OR gate 1708 as a reset input to flip-flop 1703, thus disabling AND gate 1705 and preventing further counting by scan counter 1702.

If no target is detected, scan counter 1702 will proceed until it reaches its home position count of 173. In response thereto, a signal is applied through conductor 954f and OR gate 1708 to reset flip-flop 1703. Further, the signal present on conductor 954f, which indicates the end of a run, is fed back through cable 954 to programmer 908, where it is utilized in the manner previously described in connection with FIG. 11.

Analog voltage source 1709 applies a set of analog voltages manifesting the respective ranges covered by each of the 172 range cells to signal inputs of a set of range voltage AND gates 1710-1 ... 1710-172. In accordance with the count registered in scan counter 1702, each of the set of range voltage AND gates will be enabled in sequence. Therefore when threshold detector 1707 detects a target corresponding to a certain count position, causing scan counter 1702 to be disabled in this certain count position, the range voltage from source 1709 corresponding to this certain count position is applied through the then enabled one of the range voltage gates and through normally enabled inhibit gate 1711 to conductor 956.

The analog voltage on conductor 956 is employed in tracker 955 for generating an acquisition range gate for acquiring a track target. Once, the track target is acquired within the range gate, tracker 955 returns an inhibit signal over conductor 958 to gate 1711, thereby disabling gate 1711 and removing the range voltage from conductor 956. However, so long as scan counter 1702 remains in the aforesaid certain position thereof, the analog range voltage corresponding thereto is applied as an input to gate 1711. Therefore, should tracker 955 ever lose the target, causing the inhibiting signal on conductor 958 to be removed, the analog range voltage will again be forwarded to conductor 956 for reacquisition purposes.

RANGE, RANGE RATE AND TAU-TRACKER AND COMPUTER 955

Figure 18:
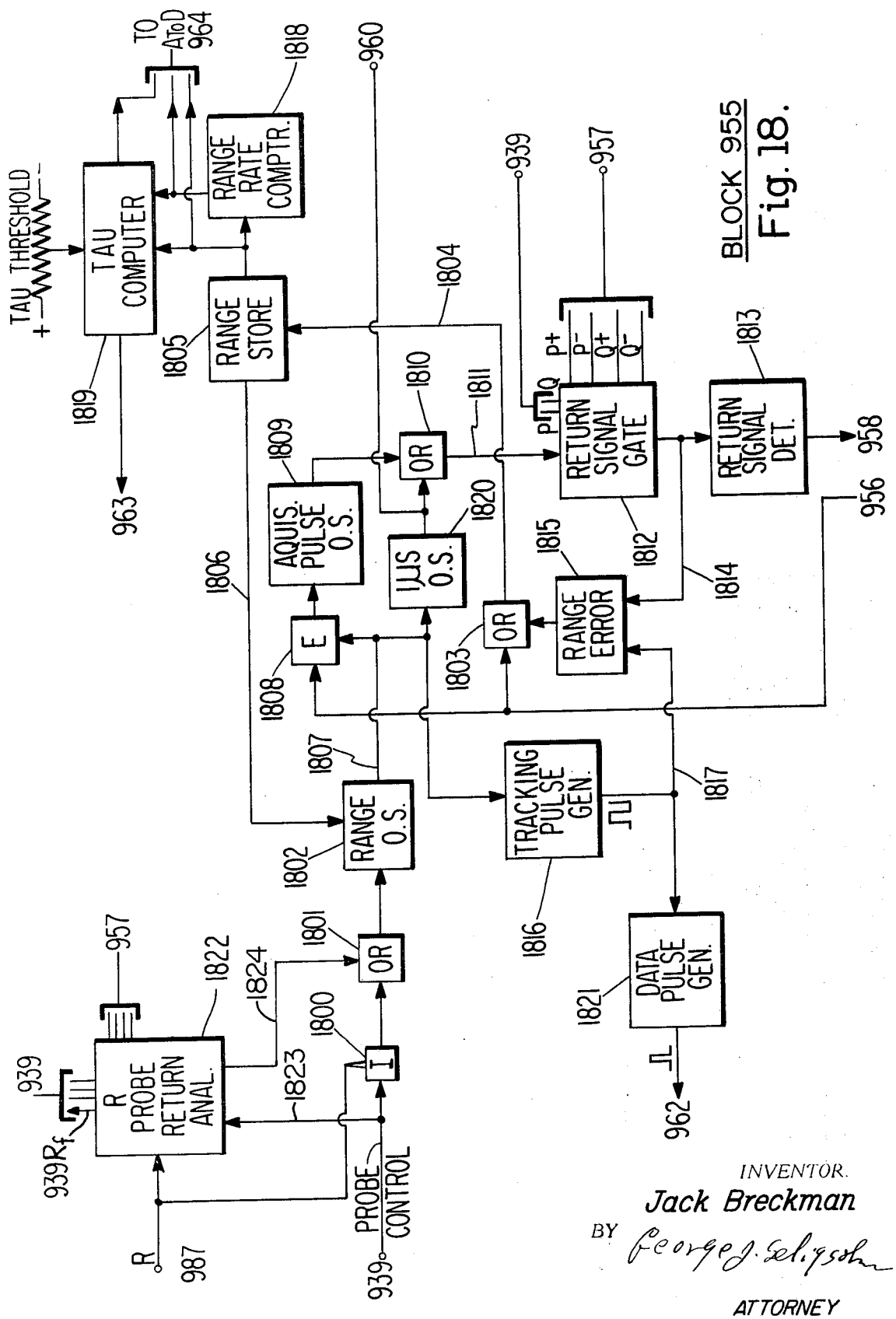
FIG. 18 is a block diagram of block 955 of FIG. 9B.

Referring now to FIG. 18, there is shown an embodiment of block 955.

FIG. 18 will first be discussed on the assumption that the CAS system is not operating in its R probe mode. In this case, probe control signals present on a conductor of cable 939, will be applied through normally enabled inhibit gate 1800 and OR gate 1801 and applied as triggering input to range one-shot multivibrator 1802. At the same time, the acquisition range voltage present on conductor 956 will be applied through OR gate 1803 and conductor 1804 to the input of range store 1805. Range store 1805 includes an integrating circuit, which may be an operational amplifier, which charges to a stored voltage level equal to that of the acquisition range voltage present on conductor 956. This stored voltage is applied as an output of range store 1805. Among other things, the output voltage of range store 1805 is applied over conductor 1806 as a time delay control to range one-shot 1802.

Therefore, range one-shot 1802 produces an output pulse on conductor 1807 a selected time delay after the application thereto of a probe control signal triggering input. This time delay is determined by the range selecting voltage level on conductor 1806, so that the time delay corresponds with a predetermined range. (Initially, this predetermined range corresponds with the range manifested by the range acquisition voltage on conductor 956).

The voltage on conductor 956 is also applied as an enabling input to AND gate 1808, so that the initial pulse applied to conductor 1807 is forwarded as a triggering input to acquisition pulse one-shot 1809. In response thereto, block 1809 generates a pulse having a duration appreciably greater than 1-microsecond (so that it corresponds to a range interval substantially larger than that of a single range cell.) The acquisition range pulse output from block 1809 is applied through OR gate 1810 and conductor 1811 as a range gating signal to return signal gate 1812. Gate 1812 has the four return signal conductors of cable 957 applied as an input thereto and further has the P and Q domain marking conductors of cable 939 applied as in input thereto. (These P and Q domain conductors are obtained from the output of block 1103 of programmer 908 shown in FIG. 11, rather than from the input P and Q conductors thereto from cable 939).

In response to a P domain, gate 1812 passes only P$^+$ or P$^-$ return signals which occur during the presence of the range gating pulse on conductor 1811. Similarly, in response to a Q domain, only Q$^+$ or Q$^-$ return signals which occur within the range gate are passed by gate 1812.

The output of gate 1812 is applied as an input to return signal detector 1813, which detects return signals passed by gate 1812. Assuming that detector 1813 has acquired the track target and, thus, produces a detected output on conductor 958, the range voltage on 956 is removed, in the manner previously described in connection with FIG. 17. However, range store 1805 continues to provide a range voltage to block 1802.

The output of return signal gate 1812 is also applied over conductor 1814 as a first input to range error block 1815.

The range delayed output pulse present on conductor 1807 is also applied as an input to tracking pulse generating 1816, which generates a split gate pulse, as shown, on output conductor 1817. This split gate pulse comprises a positive half of about 1-microsecond duration followed by a negative half of about 1-microsecond duration. The split gate pulse present on conductor 1817 is applied as a second input to range error 1815, which compares the time of occurrence of the return signal applied as a first input thereto with the split-gate pulse applied as a second input thereto, and produces an output signal having a polarity manifesting whether the range gate is too early or too late and having a magnitude indicating the amount of the range error. The output of range error 1815 is applied through OR gate 1803 and conductor 1804 as an incremental input to range store 1805. In response thereto, the stored range voltage is modified to correct the range error which exists. In this manner, the output from range store 1805 continuously tracks the range of the target bird.

The output from range store 1805 on conductor 1806 is also applied as inputs to A to D converter 964, range rate computer 1818 and tau computer 1819.

It will be seen that the output from range store 1805 is an analog signal which varies in amplitude as a function of time in accordance with the changing range between the bird and the ship. Therefore, the range rate may be computed by block 1818 by merely differentiating the output of range store 1805 applied thereto. This differentiation is preferably accomplished by means of an operational amplifier. The output of range rate computer 1818 is applied as inputs to both analog to digital converter 964 and to tau computer 1819.

Tau computer 1819 employs an operational amplifier to divide the range applied as a first input thereto by the range rate applied as a second input thereto to obtain a quotient proportional to tau. Tau computer 1819 further includes a comparison circuit for comparing this computed value of tau with a tau threshold applied as a third input thereto. If the computer tau is below the threshold, a signal is applied to conductor 963, which is returned to programmer 908, and indicates, if a tau track has just taken place, that a data and angle track is required.

After the target has been acquired and the range voltage on conductor 956 has been removed, AND gate 1808 is disabled so that block 1809 no longer responds to a signal on conductor 1807. However, during the occurrence of each time slot after acquisition, the time-delayed pulse on conductor 1807, produced in response to a triggering input to block 1802 by each successive probe control signal, is applied as an input to 1-microsecond one-shot 1820, which produces in response thereto a 1-microsecond pulse. This 1-microsecond pulse is applied to conductor 960 for use in direction finder 959. In addition, the output of one-shot 1820 is applied through OR gate 1810, to be used as the range gating pulse in return signal gate 1812, in the manner previously described.

The split gate pulse appearing on conductor 1817 is applied as an input to data pulse generator 1821, which derives therefrom a very narrow pulse (a small fraction of a microsecond) occurring at the middle of the split tracking gate. This narrow data pulse is applied through conductor 962 for use in data bin 961.

If tracking of the target is ever lost, return signal detector 1813 will stop providing a signal on conductor 958. This, in the manner discussed previously in connection with FIG. 17, will cause a range voltage to be reapplied to conductor 956 so that the target may be reacquired.

Now the operation of block 955 in response to the CAS being in an R probe mode will be discussed.

In response to an R probe mode, an R mode signal is applied over conductor 987 to R probe return analyzer 1822 and as an inhibiting input to normally enabled gate 1800. Therefore, the probe control signal on a conductor of cable 939 is prevented from being applied to range one-shot 1802 through now disabled inhibit gate 1800 and OR gate 1801. However, the probe control signal is applied as an input to analyzer 1822 over conductor 1823. Further, P$^+$, P$^-$, Q$^+$ and Q$^-$ return signals on the four conductors of cable 957 are applied as an input to analyzer 1822. Cable 939 includes conductors for applying timing signals to analyzer 1822 as well as conductor 939R$_f$ for feeding back a control signal to programmer 908, as previously discussed in connection with FIG. 11.

Figure 19:
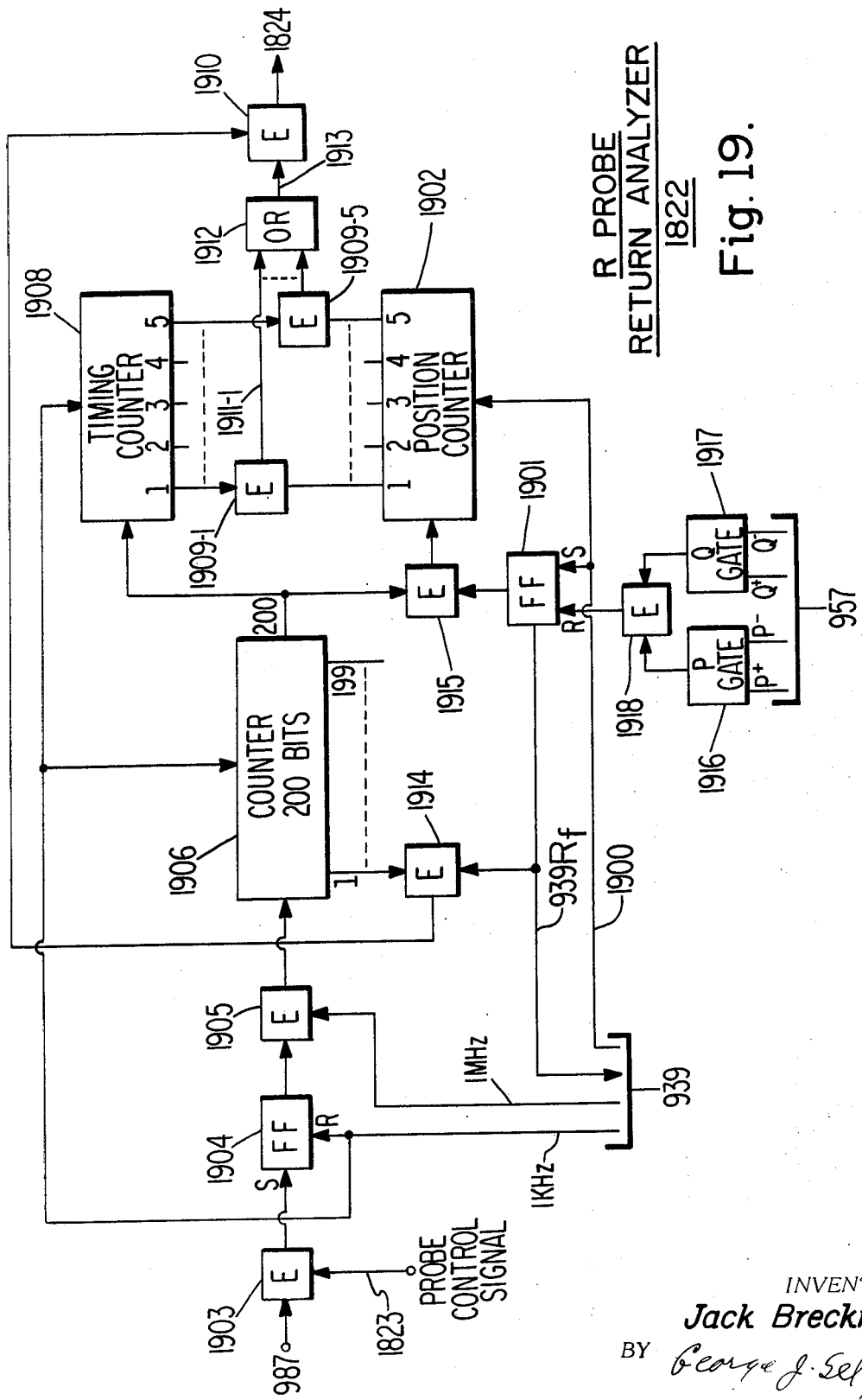
FIG. 19 is a block diagram of the R probe return signal anaylzer of FIG. 18.

Analyzer 1822 determines which, if any, of the sequence of five return signals transmitted by each of two slow-crossover birds, in response to the receipt of an R probe transmitted by the ship, results in the receipt of coincident P and Q return signals. With this information acquired, one of the two slow-crossover birds, selected by programmer 908 in the manner discussed in connection with FIG. 11, is tracked by applying, during each time slot, a properly offset trigger signal to range one-shot 1802 through conductor 1824 and OR gate 1801. The details of R probe return analyzer 1822 are shown in FIG. 19.

R PROBE RETURN ANALYZER 1822

Whenever programmer 908 switches from a tau-track mode to a data and angle track mode, a signal is applied to conductor 1900 of cable 939. This results in the setting of flip-flop 1901 and the resetting of position counter 1902.

In response to the occurrence of an R probe mode (which by necessity is also a data and angle track mode of the CAS) a signal will be applied to R mode conductor 987, thereby enabling AND gate 1903, and at the same time flip-flop 1901 will be in its set condition. Therefore, the application of the next-occurring probe control signal on conductor 1823 will result in the setting of flip-flop 1904. The setting of flip-flop 1904 will enable AND gate 1905, permitting 1 MHz clock spikes on a conductor of cable 939 to be applied through now enabled AND gate 1905 to the input of recycling counter 1906, which has a count capacity of 200.

At this time both timing counter 1908, which has a count capacity of five, and position counter 1902, which also has a count position of five, manifest a count of 1. Further, an individual one of a set of AND gates 1909-1 ... 1909-5 couples each pair of corresponding terminals of position counter 1902 and timing counter 1908. Therefore, initially AND gate 1909-1 will be enabled, causing AND gate 1910 to be enabled in response to the output of AND gate 1909-1, which is applied thereto through conductor 1911-1, OR gate 1912 and conductor 1913. However, so long as flip-flop 1901 is in its set condition, no signal is applied to conductor 939R$_f$. Therefore, AND gate 1914 remains disabled and no signal input is applied to AND gate 1910. Furthermore, with flip-flop 1901 in its set condition, AND gate 1915 is enabled.

Both the P$^+$ and the P$^-$ conductors of cable 957 are applied as inputs to P gate 1916. Similarly, the Q$^+$ and the Q$^-$ inputs of cable inputs of cable 957 are applied as inputs to Q gate 1917. The output of P gate 1916 is applied to the first input to AND gate 1918 and the output of Q gate 1917 is applied as a second input to AND gate 1918. Thus, AND gate 1918 acts as a coincidence detector for determining the simultaneous receipt of both P return signals and Q return signals.

Assuming that the first-occurring return signals from the two slow-crossover birds are different from each other, so that a P return is received from one bird and a Q return is received from the other bird, a coincident output from P gate 1916 and Q gate 1917 will occur during the first 200 bit period. In this case, both timing counter 1908 and position counter 1902 will remain in their respective count 1 positions, and AND gate 1918 will produce an output sometime during the first 200 bit period. In response to an output from AND gate 1918, flip-flop 1901 is reset. In response to the resetting of flip-flop 1901, a signal is applied to conductor 939R$_f$, indicating that resolution between the two birds has been achieved. The signal on conductor 939R$_f$ is returned to programmer 908, where it performs functions discussed in connection with FIG. 11. In addition, the signal appearing on conductor 939R$_f$, in response to the resetting of flip-flop 1901, enables AND gate 1914.

Under the assumed conditions, nothing happens until the next time slot. At the end of the current time slot, counter 1906, together with flip-flop 1904 is reset (timing counter 1908 is also reset, but under the assumed conditions has never moved from its reset condition). Although counter 1906, when reset, is in its number one count condition, no signal is applied to AND gate 1914. However, immediately in response to the occurrence of the next probe control signal, which results in the setting again of flip-flop 1904 and the enabling again of AND gate 1905, the first-occurring 1 MHz clock spike, which is applied to counter 1906 through now enabled AND gate 1905, will be applied to the signal input of now enabled gate 1914, where it will be forwarded as a signal input to AND gate 1910, thereby applying a control signal to conductor 1824 for application as a triggering signal to range one-shot 1802, in the manner previously described in connection with FIG. 18.

Assume now that the domains of the first return signals of the two slow-crossover birds are the same, so that AND gate 1918 does not produce an output during the first 200 bit period following a probe control signal. Since, under this assumed condition, AND gate 1915 is still enabled by flip-flop 1901 in its set condition, in response to the bit 200 applied to counter 1906 each of timing counter 1908 and position counter 1902 will be simultaneously switched from their respective 1 count positions to their respective 2 count positions, while counter 1906 will recycle. In this case, AND gate 1909-2, not shown, will be enabled, thereby maintaining an enabling input on AND gate 1910, in the manner previously described, since the outputs of the entire set of AND gates 1909-1 ... 1909-5 are applied as inputs to OR gate 1912. However, since AND gate 1914 remains disabled, no output is produced by AND gate 1910. However, if the second bit in the sequence of the two slow-crossover birds happens to be different, AND gate 1918 will produce an output to reset flip-flop 1901 during the time interval between 200 microseconds and 400 microseconds. Therefore, position counter 1902 will stop counting at the count of two. However, timing counter 1908 will continue to count until the end of the time slot, when it will be reset, along with flip-flop 1904. However, position counter 1902 will still remain in its number 2 count position during the next time slot. Therefore, in response to the probe control signal applied during the next-occurring time slot, AND gate 1910 will not be enabled until timing counter reaches count 2 thereof, after a delay of 200 microseconds, and then will not have a signal applied thereto until counter 1906 reaches count 1 thereof. At this time, a control signal will be applied over conductor 1824 to range one-shot 1802. This process will continue in each of the successive time frames of the data and angle track.

In the same manner as justed described, wherein the R probe return analyzer 1822 determines that the second return signals transmitted by the slow-crossover manifested different domains, and then, thereafter, applied a trigger signal over conductor 1824 to range one-shot 1802 exactly 200 microseconds after the occurrence of a probe control signal during a time slot, if the first difference in P and Q domains of the two slow-crossover birds should first occur in the third, fourth or fifth return signals, respectively, position counter 1902 will, as the case requires, reach its third, fourth or fifth count position before flip-flop 1901 is reset in response to AND gate 1918 achieving coincidence between the P domain and Q domain returns, thereby disabling AND gate 1915, enabling AND gate 1914 and feeding back a signal to the programmer 908 over conductor 939R$_f$. In any case, once P and Q coincidence signals are detected by AND gate 1918, the count position of position counter 1902 is frozen in the appropriate position to provide the correct time delay between the occurrence of a probe control signal in any time slot and the application of a trigger signal over conductor 1824 to track a selected one of the two slow-crossover birds.

As discussed earlier in connection with FIG. 11, relating to programmer 908, in response to the return of a signal over conductor 939R$_f$, indicative of the fact that flip-flop 1901 had been reset and that the position of the first-occurring coincident P and Q return signals in the sequence of five successive return signals transmitted by a bird in response to a received R probe signal has been determined, programmer 908 first selects that bird which is transmitting a P domain in the first-occurring coincident received P and Q domains for data and angle tracking. As mentioned in the discussion of FIG. 11, after the five consecutive time frames of the data and angle track of the P-domain slow-crossover bird, block 975 feeds back a signal over conductor 973f, which causes a successive five time-frame data and angle track of the Q-domain slow-crossover bird. Since each data and angle track takes 0.5 seconds, the two successive data and angle tracks will take 1 full second. During this second, position counter 1902 is not reset, so that it maintains the count position it obtained at the time flip-flop 1901 was reset and AND gate 1915 was disabled.

In the foregoing manner, it is possible to data and angle track each of the two otherwise unresolvable, slow-crossover birds.

DATA BIN AND ROLL AROUND MEANS 961

Figure 20:
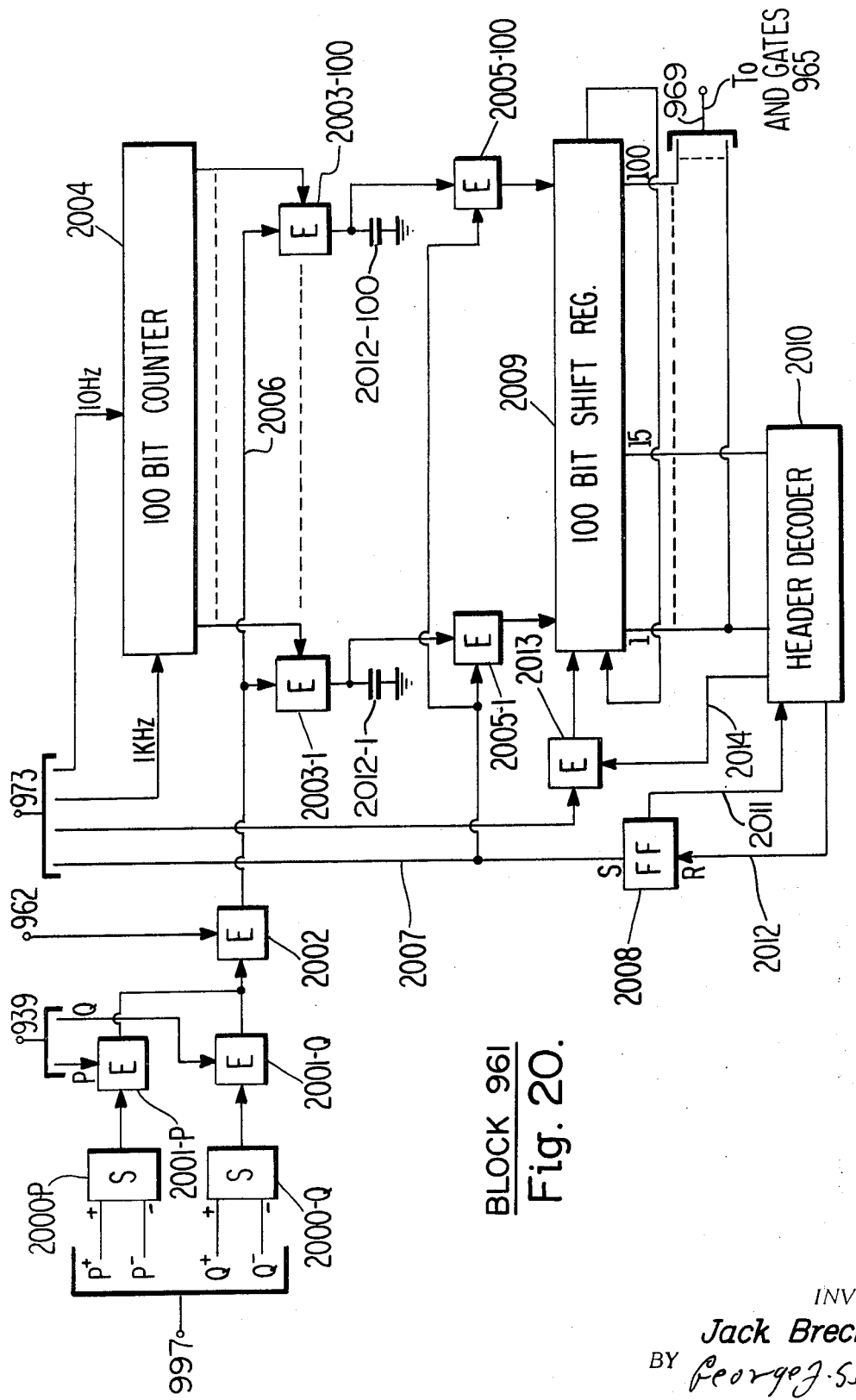
FIG. 20 is a block diagram of block 961 of FIG. 9B.

FIG. 20 shows an embodiment of data bin and roll around means 961.

The P$^+$ and P$^-$ conductors of cable 997 are applied, respectively, as positive and negative inputs to summer 2000P. The Q$^+$ and the Q$^-$ conductors of cable 977 are applied, respectively, as positive and negative inputs to summer 2000Q. The output of summer 2000P is applied as a first input to AND gate 2001P and the output of summer 2000Q is applied as a first input to AND gate 2001Q. The P domain conductor of cable 939 is applied as a second input to AND gate 2001P and the Q conductor of cable 939 is applied as a second input to AND gate 2001Q. (The P and Q conductors of cable 939 employed in block 961 are obtained from the output of block 1103 in FIG. 11, rather than from the input P and Q domain conductors to block 1103.)

The outputs of AND gates 2001P and 2001Q are applied in common as a first input to AND gate 2002. The data range gate on conductor 962 is applied as a second input to AND gate 2002. The output of AND gate 2002 is applied over data bus 2006 as a first input to each of a set of 100 data bit AND gates, 2003-1 ... 2003-100. 100 bit counter 2004 is stepped at the beginning of each time slot in response to a 1 KHz clock spike applied thereto over a conductor of cable 973. Counter 2004 is reset at the end of each time frame in response to a 10 Hz clock spike applied thereto over another conductor of cable 973. The outputs of counter 2004 are applied as second inputs to AND gates 2003-1 ... 2003-100.

The output of each of the 100 data bit AND gates is applied to an individual one of storage capacitances 2012-1 ... 2012-100 corresponding thereto. Therefore, any data bit applied to data bus 2006 from the output of AND gate 2002 during the millisecond period that a particular one of the set of data bit AND gates is open, will be applied to the storage capacitance corresponding to that particular data bit AND gate.

Since there are 100 bits in the data code, corresponding bits of the data code during two successive cycles will be applied to the same data bit storage capacitance. In order to reduce error, the storage capacitances are permitted to accumulate information for each of the five consecutive frames of a data and angle track.

At the termination of the fifth frame of a data and angle track, a signal is applied over conductor 2007 of cable 973 to set flip-flop 2008 and to enable each of the set of AND gates 2005-1 ... 2005-100. This results in the signals stored in each of the 100 storage capacitances being transferred to the 100 respective stages of shift register 2009. The outputs of the first 15 respective stages of 100 bit shift register are applied as inputs to header decoder 2010, which is enabled in response to an output signal from flip-flop 2008 applied as an input thereto over conductor 2011. If the respective binary values of the bits stored in the first 15 stages of shift register 2009 coincide identically with the binary values of the known header, the reset signal is applied immediately to flip-flop 2008 over conductor 2012. If they do not identically coincide, an enabling signal is applied to AND gate 2013 over conductor 2014. In response to AND gate 2013 being enabled, 1 MHz clock spikes are applied as shift pulses to register 2009, which is connected as a ring counter. Therefore, the 100 bits stored in shift register shift one stage each microsecond. This process continues until the binary values of the bits stored in the first 15 stages of shift register 2009 do coincide identically with the 15 bits of the header. When this happens, header decoder 2010 removes the enabling signal from conductor 2014 and applies the reset signal over conductor 2012. In response to flip-flop 2008 becoming reset, header decoder 2010 is disabled by the removal of the output signal of flip-flop 2008 on conductor 2011. The 100 bits of the data code are now arranged in the proper order.

It will be seen that the maximum time required to roll around the data code stored in shift register 2009 is only 99 microseconds. Therefore, if the opening of those AND gates 965 which are coupled to shift register 2009 via cable 969 is delayed until flip-flop 2008 is reset or for a short fixed period, such as a millisecond, it can be made certain that the roll-around of the data code is complete before the data code is read out.

DATA AND ANGLE TRACK GATES 942

Figure 21:
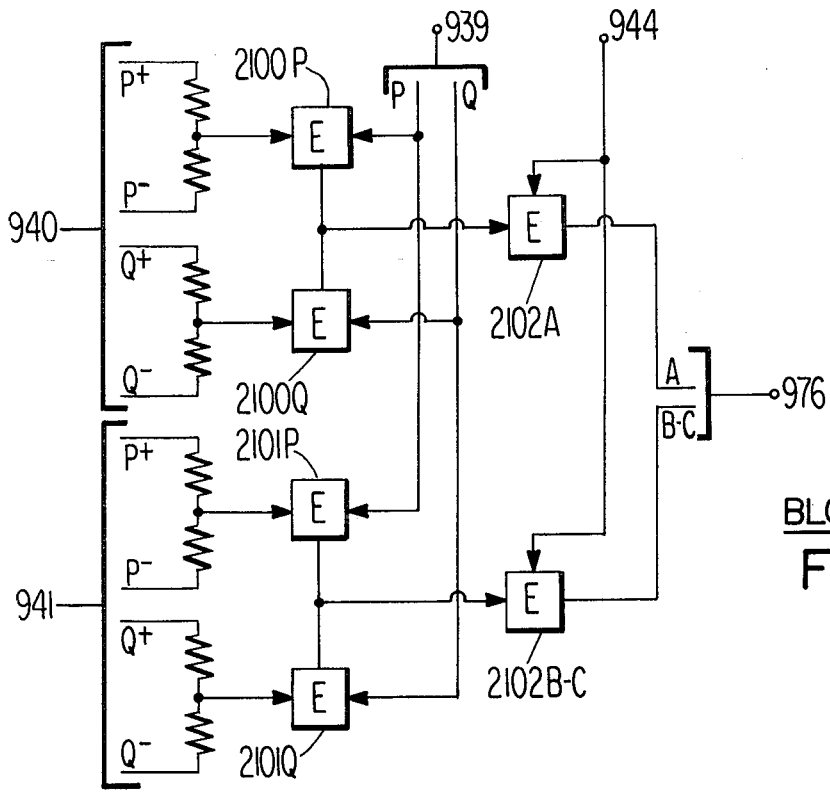
FIG. 21 is a block diagram of block 942 of FIG. 9A.

FIG. 21 shows the details of data and angle track gates 942. As shown, a signal input is applied to AND gate 2100P in response to the presence of an IF signal on one or both of P+ and P− conductors of A channel cable 940. A signal input is applied to AND gate 2100Q in response to the presence of an IF signal on one or both of conductors Q+ and Q− of A channel cable 940. A signal input is applied to AND gate 2101P in response to the presence of an IF signal on one or both of conductors P+ and P− of B and C channel cable 941. A signal input is applied to AND gate 2101Q in response to the presence of an IF signal on one or both of conductors Q+ and Q− of B and C channel cable 941.

A P domain conductor of cable 939, obtained from the output, rather than the input, of block 1103 of programmer 908, is coupled to the enabling input of AND gates 2100P and 2101P. The corresponding Q domain conductor of cable 939 is coupled to the enabling inputs of AND gates 2100Q and 2101Q.

The outputs of A channel AND gates 2100P and 2100Q are coupled in common as a signal input to AND gate 2102A and the outputs of B and C channel AND gates 2101P and 2101Q are coupled in common as a signal input to B and C channel AND gate 2102BC. AND gates 2102A and 2102BC are enabled only during the time frames of a data and angle track in response to a control signal applied as an enabling input thereto over a conductor of cable 944. The output of AND gate 2102A is applied to an A conductor of cable 976 and the output of AND gate 2102BC is applied to a B and C conductor of cable 976.

It will be seen that during the occurrence of P domains, only P manifesting return signal IF frequencies are forwarded through to the P conductors of cable 976. It will be seen that during the occurrence of Q domains, only Q manifesting return signal IF frequencies are forwarded through to the Q conductors of cable 976.

DIRECTION FINDER 959

It can be shown that the relative bearing angle, $\beta$, in the wing plane of a CAS equipped ship, between the direction to a tracked bird and the heading of the ship, is given by the following equation:

(1) $\beta = \arctan(\cos\theta_C/\cos\theta_B) + 45°$ where $\theta_C$ is the angle in the wing plane of the ship between the direction to the tracked bird and the line connecting antennas A and C of either the top or bottom triad, as the case may be, and $\theta_B$ is the angle in the wing plane of the ship between the direction to the tracked bird and the line connecting antennas A and B of the top or bottom triad, as the case may be.

Direction finder 959, shown in detail in FIG. 22, utilizes the information applied thereto over channel A and channel B and C in the manner described in connection with FIGS. 13 and 21, to obtain a solution for the bearing angle to a tracked bird by employing novel analog computing techniques.

In particular, the IF frequency present on the A channel conductor of cable 976 is applied as an input to 90° lag 2200 and as a first input to multiplier 2201. 90° lag 2200 phase shifts the IF frequency applied as an input thereto by substantially 90°. The output of 90° lag 2200 is applied as a second input to multiplier 2202. The IF frequency present on the BC channel conductor of cable 976 is applied as a second input to multipliers 2201 and 2202.

The range gate present on conductor 960 is applied as a signal input to each of AND gates 2203B and 2203C. AND gate 2203B is enabled during alternate time slots in response to a B-select signal applied thereto over a conductor of cable 916 and AND gate 2203C is enabled during the remaining time slots in response to a signal applied thereto over the C-select conductor of cable 916.

The output of multiplier 2201 is applied as a signal input to both AND gates 2204B and 2204C. In a similar manner, the output of multiplier 2202 is applied as a signal input to both AND gates 2205B and 2205C. The output of AND gate 2203B is applied as an enabling input to each of AND gates 2204B and 2205B, while the output of AND gate 2203C is applied as an enabling input to both of AND gates 2204C and 2205C.

The respective outputs of each of AND gates 2204B, 2204C, 2205B and 2205C are applied to the respective inputs of corresponding integrating operational amplifiers 2206B, 2207B, 2206C and 2207C. The respective outputs of integrating amplifiers 2206B and 2207B are applied, respectively, as first and second inputs to first arctan circuit 2208B. In a similar manner, the outputs of integrating amplifier 2206C and 2207C are applied respectively as first and second inputs to second arctan circuit 2208C. The output of arctan circuit 2208B is applied directly as a first input to third arctan circuit 2209 and the output of arctan circuit 2208C is applied as a second input to arctan circuit 2209 through inverter 2210. The sum of the output voltage from arctan circuit 2209 and a preadjusted fixed voltage from voltage divider 2211 is applied as a signal input to AND gate 2212. AND gate 2212 is enabled in response to a timing signal applied thereto at the end of each time frame over a conductor of cable 973 and, in response thereto, forwards a signal input to analog digital converter 967 over conductor 2213. The arctan circuits are analog function generators.

Considering now the operation of the direction finder of FIG. 22, the output of each of multipliers 2201 and 2202, respectively, will include a DC component having a magnitude and polarity which is a function of the phase difference between the respective IF frequencies applied to its first and second inputs. The effect of AND gates 2203B, 2203C, 2204B, 2204C, 2205B and 2205C, which are inserted between integrating amplifier 2206B, 2206C, 2207B and 2207C, is to serially apply as inputs thereto a plurality of incremental DC signals obtained from either multiplier 2201 or multiplier 2202 during a plurality of different time slots of a time frame. Thus, at the end of a time frame, each of the integrating amplifiers will have accumulated an output which manifests in analog form, a predetermined angle with a high degree of confidence (a high signal-to-noise ratio). In particular, the relative value of the output of integrating amplifier 2207B, which is applied to the numerator input of block 2208B, with respect to the value of the output of integrating amplifier 2206B, which serves as a normalizing reference and is applied to the denominator input of block 2208B, manifests a value proportional to $\pi\cos\theta_B$. In a similar manner, the output of arctan circuit 2208C manifests a value equivalently proportional to $-\pi\cos\theta_C$.

Application of the output of arctan circuit 2208C to the numerator input of arctan circuit 2209 through inverter 2210 and the direct application of the output of arctan circuit 2208B to the denominator input of arctan circuit 2209, results in an output from arctan circuit 2209 which has a value proportional to the bearing angle $\beta$–45°. By adding an analog voltage from voltage divider 2211 which is equivalently proportional to 45° to the output voltage from arctan circuit 2209 the input to AND gate 2212 is made proportional to the relative bearing angle $\beta$.

At the end of a time frame, when the signal input to AND gate 2212, proportional to the relative angle $\beta$, has been determined with the greatest degree of confidence, a timing signal from cable 973 enables AND gate 2212 and permits the final input to AND gate 2212 only then to be forwarded to analog digital converter 967.

MISS-DISTANCE COMPUTER 971

Figure 23:
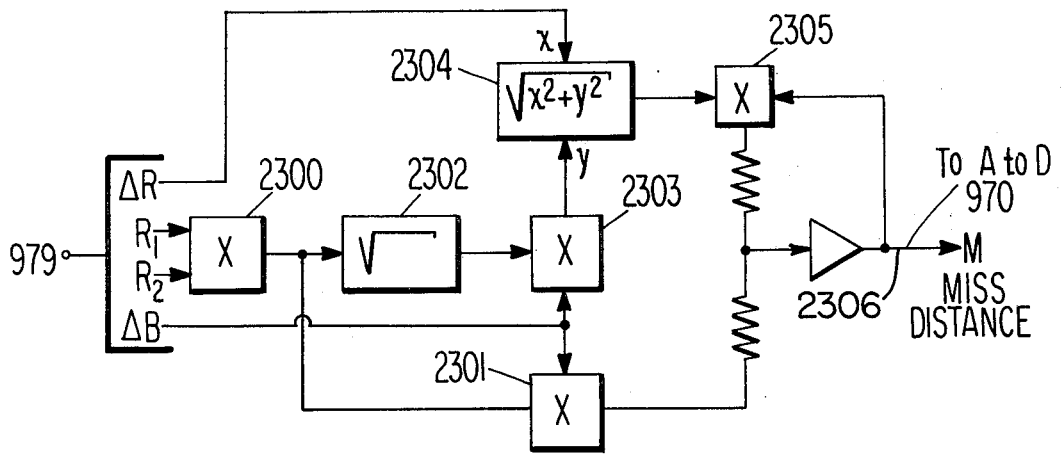
FIG. 23 is a block diagram of block 971 of FIG. 9B.

An embodiment of miss-distance computer 971 is shown in FIG. 23.

It can be shown that the miss-distance (a prediction of the closest approach to a ship of a projection of the bird in the wing plane of the ship) can be computed as a function of the range at the end of a given time frame, the range at the end of the preceding time frame, the difference in these two ranges, and the difference in the relative bearing angle determined at the end of each of these two time frames. Specifically, the miss-distance M is determined in accordance with the following equation:

$$(2) M = \frac{R_1 R_2 \Delta \beta}{\sqrt{(\Delta R)^2 + R_1 R_2 (\Delta \beta)^2}}$$

Miss-distance computer 971 is an analog computer which includes appropriate analog function generators for solving the above equation.

In particular, range $R_2$, the range at the end of a present time frame, and range $R_1$, the range at the end of the preceding time frame, both of which are stored in block 975, are applied in analog form from digital to analog converter 978 over conductors of cable 979 to first and second inputs of multiplier 2300. The output of multiplier 2300 is applied as a first input to multiplier 2301 and as an input to square-root function generator 2302. The output of square-root function generator 2302 is applied as a first input to multiplier 2303. The difference in bearing angle, $\Delta\beta$, is supplied as a second input to both multipliers 2201 and 2203. The output of multiplier 2302 is applied as a $y$ input through right-triangle hypothenuse solver function generator 2304. The difference in ranges $\Delta R$, between $R_2$ and $R_1$ is applied as an $x$ input to function generator 2304. The output of function generator 2304 is applied as a first input to multiplier 2305 with the sum of the outputs of multipliers 2301 and 2305 applied as an input to a high gain, operational amplifier, the output of which appears on conductor 2306. The output on conductor 2306 is fed back as a second input to multiplier 2305. Further, the output on conductor 2306, which manifests in analog form the miss-distance M, is applied to analog to digital converter 970.

TMS

As shown in FIG. 24, the only difference between the CAS and the TMS is that the information stored in block 975 is made use of in a track-while-scan to provide a CRT display of all aircraft which have been data and angle tracked and whose data remains in the track stores of block 975.

In particular, the stored information, as well as time control signals, in block 975 of the CAS, shown in FIGS. 9A and 9B, are applied over conductors of cable 2400 to track-while-scan 2402.

Track-while-scan equipment is well known in the art. Briefly, track-while-scan 2402 receives the range information, the range rate information, and certain portions of the data code information of each bird that has been data and angle tracked, and has such information stored in a track store assigned to that bird. Track-while-scan 2402 employs the range and relative bearing angle information about each of these birds to derive signals which are applied to CRT display 2403 over conductors of cable 2404. The CRT display is then capable of providing a PPI display of all the birds surrounding the ship which are being data and angle tracked (i.e., have a tau of 60 seconds or less). In addition, track-while-scan 2402 is capable of employing the range rate information and the variables employed in computing the miss-distance information applied thereto for each of these birds to move the display of each of these birds continuously in accordance with a computed speed and direction with respect to the heading of the ship. Thus, in a TMS, the pilot has before him a virtual radar display of all the birds surrounding him which have a tau of 60 seconds or less.

This information, along with such information as height difference, for each of the birds can be utilized by track-while-scan 2402 to provide automatic evasive maneuver control information which, in response to actuation by the pilot upon the occurrence of either an alert or alarm condition, controls the escape route of the ship to avoid a mid-air collision with an intruding bird in such a manner that any danger from this maneuver to either the ship or other surrounding birds is minimized.

Specifically, this is accomplished by track-while-scan 2402 applying all pertinent information about surrounding birds on a real time basis to automatic evasive maneuver control 2405 over conductors of cable 2406.

HOT-LINE GROUND-BASED RECEIVING EQUIPMENT

FIG. 25 shows an embodiment of hot-line ground-based receiving equipment, which is capable of receiving and processing hot-line information from a plurality of ships transmitting hot-line information thereto at the same time. This equipment would be part of an ATC facility.

Referring now to FIG. 25, it will be seen that the ground equipment for the hot-line is somewhat similar to portions of the airborne CAS equipment. However, it differs from the CAS equipment in that it need only receive hot-line carrier frequencies M and N. In addition, it differs from all airborne equipment in that it has no way of determining the actual range to a ship transmitting the M and N bits of a hot-line message from the time of arrival of such bits. However, successive bits from the same hot-line transmitting aircraft will arrive at approximately 1 millisecond time intervals, since they are transmitted at that rate and the aircraft's range from the ground station does not change very much in a 1 millisecond period.

Therefore, the ground equipment includes a programmer that divides each 1 second interval into 1,000 milli second intervals and applies both received M and N detected hot-line signals to a virtual range bus 2500. A 1,000 bit cyclically operated counter of ithe programmer, not shown, which is stepped every millisecond, directs all signals occurring during any 1 millisecond time slot into that one of storage cells 2501-1 . . . 2501-1000 whose corresponding AND gate 2502-1 . . . 2502-1000 is open during that time slot. It will be seen that the successive bits of a hot-line message transmitted by any ship at 1 millisecond intervals, will tend to accumulate in one particular storage cell (although there will be some smearing due to the changing range of the transmitting ship with respect to the ground station).

A target detector, target designator and target tracker, substantially similar to those shown in blocks 952 and 955 of FIG. 9B, scan the storage cells 2501-1 . . . 2501-1000 in sequence to detect a received target transmitting a hot-line message and then track that particular target for a sufficiently long time interval, such as 0.5 seconds, for a plurality of cycles of the hot-line data code message to be stored in data bins and, at the end of this interval, be read out and applied to track stores each with their individual readout alphanumeric display.

The blocks of FIG. 25 which perform functions substantially similar to particular blocks of FIG. 9B are included within dotted-line blocks identified with the corresponding block of FIG. 9B.

What is claimed is:

1. In a SECANT system, a station aboard any given aircraft comprising a first antenna mounted on the top of said given aircraft, a second antenna mounted on the bottom of said given aircraft, first transmitting means and first receiving means associated with said first antenna, second transmitting means and second receiving means associated with said second antenna, means for generating four sets of carrier-signal frequencies in which all the individual frequencies of all the four sets are different from each other, first means for dividing time into successive time slot periods, second means for assigning any given one of said time slots either one of two domains, third means for applying a probe signal to said first transmitting means once during each of certain ones of said time slots and for applying a probe signal to said second transmitting means once during each of other ones of said time slots, fourth means for employing a first frequency of said first set as the probe signal for said first transmitting means during those ones of said certain time slots assigned a first of said two domains, and for employing a second frequency of said first set as the probe signal for said first transmitting means during those ones of said certain time slots assigned a second of said two domains, fifth means for employing a first frequency of said second set as the probe signal for said second transmitting means during those ones of said other time slots assigned said first of said two domains and for employing a second frequency of said second set as the probe signal for said second transmitting means during those ones of said other time slots assigned said second of said two domains, sixth means responsive to the receipt by said first receiving means of a probe signal of said first frequency of said second set for transmitting as a return signal one frequency of said third set from said first transmitting means and responsive to the receipt by said first receiving means of a probe signal of said second frequency of said second set for transmitting as a return signal another frequency of said third set from said first transmitting means, seventh means responsive to the receipt by said second receiving means of a probe signal of said first frequency of said first set for transmitting as a return signal one frequency of said fourth set from said second transmitting means and responsive to the receipt by said second receiving means of a probe signal of said second frequency of said first set for transmitting another frequency of said fourth set from said second transmitting means, and eighth means for producing a first output in response to a time slot being assigned said first domain and the receipt by said first or second receiving means of said one frequency of either said third or fourth set or a time slot being assigned said second domain and the receipt by said first or second receiving means of said other frequency of either said third or fourth set and for producing a second output in response to a time slot being assigned said first domain and the receipt by said first or second receiving means of said other frequency of either said third or fourth set or a time slot being assigned said second domain and the receipt by said first or second receiving means of said one frequency of either said third or fourth set.

2. The station defined in claim 1, wherein said second means assigns said first or second domains to successive ones of said time slots in accordance with a truly random or pseudo-random code, and wherein said eighth means includes ninth means for accumulating a correlation signal proportional to the difference in the number of first-output time slots and second-output time slots which occur in a predetermined group containing relatively many of either said certain time slots or said other time slots, and target detection means responsive to said correlation signal exceeding a predetermined magnitude.

3. The station defined in claim 1, wherein said one frequency of said third set is selected from first and second frequencies of said third set and said other frequency of said third set is selected from third and fourth frequencies of said third set, and wherein said one frequency of said fourth set is selected from first and second frequencies of said fourth set and said other frequency is selected from third and fourth frequencies of said fourth set, data commutator means responsive to a cyclic binary data code having a given number of bits arranged in a predetermined sequence which is operated each successive time slot to choose in order each individual sequential binary bit of said data code, and ninth means responsive to a bit during any individual time slot manifesting a given binary value for selecting said first frequency of said third or fourth set respectively, as said one frequency thereof and for selecting said third frequency of said third or fourth set, respectively, as said other frequency thereof, said ninth means being responsive to a bit during any individual time slot manifesting a binary value opposite to said given binary value for selecting said second frequency of said third or fourth set, respectively, as said one frequency thereof and for selecting said fourth frequency of said third or fourth set, respectively, as said other frequency thereof.

UNITED STATES PATENT OFFICE
CERTIFICATE OF CORRECTION

Patent No. 3,803,608          Dated April 9, 1974

Inventor(s) Jack Breckman

It is certified that error appears in the above-identified patent and that said Letters Patent are hereby corrected as shown below:

Column 3, line 17, "a form a" should read -- a form of--
Column 3, line 34, "this line" should read --this party line--
Column 5, line 29, "band RF" should read --band of RF--
Column 6, line 26, "if" should read --is--
Column 7, line 51, "ship's signal" should read --ship's return signal--
Column 9, line 60, "104-1" should read --201-1--
Column 10, line 3, after "bursts", first occurrence, delete "of I.F." and insert "of I.F." after "bursts" second occurrence.
Column 14, line 24, "wind-plane" should read --wing-plane--
Column 15, line 4, "input RF" should be --input to RF--
Column 16, line 58, "2-microsecond" should be --1-microsecond--
Column 18, line 44, "outputs 230-these" should read --outputs of these--
Column 18, line 45, "232-2" should read --230-2--
Column 20, line 36, ""0.38" should read --"0"--
Column 22, line 67, "238-1" should read --238-2--
Column 27, line 25, "that" should be --than--
Column 28, line 60, "212-2" second occurrence, should read --214-2--
Column 29, line 36, "is" should read --in--
Column 29, line 52, "original" should read --ordinal--
Column 31, line 23, "Similarly, "1"" should read --Similarly, a binary "1"--
Column 34, line 54, "939" should read --938--
Column 38, line 1, "shoulder" should read --should--
Column 39, line 64, "gates s" should read --gates 965--
Column 42, line 21, "normal or 4" should read --normal 2 or 4--
Column 43, line 9, delete "The signal . . . five Q accumulators"
Column 43, line 13, after "signals" the line should read --produce coincident P and Q outputs.--
Column 46, line 12, after "being" delete "present"
Column 46, line 20, "939f" should read --939R$_f$--

UNITED STATES PATENT OFFICE
CERTIFICATE OF CORRECTION

Patent No. 3,803,608     Dated April 9, 1974

Inventor(s) Jack Breckman

It is certified that error appears in the above-identified patent and that said Letters Patent are hereby corrected as shown below:

Column 50, line 5, "change" should read --chance--
Column 52, line 58, "eminating" should read --emanating--
Column 53, line 30, "462-1" should read --452-1--
Column 59, line 49, "generating" should read --generator--
Column 61, line 52, delete, second occurrence of "inputs of cable"
Column 71, line 67 and Column 72, line 1, "transmitter" should be --receiver--
Column 72, line 11, "receiver" should read --transmitter--

Signed and sealed this 29th day of October 1974.

(SEAL)
Attest:

McCOY M. GIBSON JR.
Attesting Officer

C. MARSHALL DANN
Commissioner of Patents